US012809352B2

(12) United States Patent
Kozakai et al.

(10) Patent No.: US 12,809,352 B2
(45) Date of Patent: Nov. 24, 2026

(54) INFORMATION MANAGEMENT SYSTEM AND METHOD FOR AUTONOMOUS CONTROL OF MANUFACTURING PROCESS AND SERVICE

(71) Applicants: KABUSHIKI KAISHA TOSHIBA, Tokyo (JP); TOSHIBA DIGITAL SOLUTIONS CORPORATION, Kawasaki (JP); Toshiba Carrier Corporation, Kawasaki (JP)

(72) Inventors: Takafumi Kozakai, Tokyo (JP); Yasutaka Iyadomi, Fuji Shizuoka (JP); Tatsuki Shiraishi, Tokyo (JP); Shinsuke Iuchi, Yokohama Kanagawa (JP); Sachiko Kajimura, Tokyo (JP)

(73) Assignees: Kabushiki Kaisha Toshiba, Kawasaki (JP); Carrier Japan Corporation, Tokyo (JP)

( * ) Notice: Subject to any disclaimer, the term of this patent is extended or adjusted under 35 U.S.C. 154(b) by 505 days.

(21) Appl. No.: 18/469,321

(22) Filed: Sep. 18, 2023

(65) Prior Publication Data

US 2024/0004373 A1 Jan. 4, 2024

Related U.S. Application Data

(63) Continuation of application No. PCT/JP2022/007927, filed on Feb. 25, 2022.

(30) Foreign Application Priority Data

Mar. 19, 2021 (JP) ................................ 2021-045381

(51) Int. Cl.
*G05B 19/418* (2006.01)
*G16Y 10/25* (2020.01)
*G16Y 40/20* (2020.01)

(52) U.S. Cl.
CPC ........ *G05B 19/41835* (2013.01); *G16Y 10/25* (2020.01); *G16Y 40/20* (2020.01); *G05B 2219/31372* (2013.01)

(58) Field of Classification Search
CPC .... G05B 19/41835; G05B 2219/31372; G05B 17/02; G05B 2219/32366; G05B 19/418;
(Continued)

(56) References Cited

U.S. PATENT DOCUMENTS

2006/0116783 A1 6/2006 Aghili et al.
2015/0378339 A1* 12/2015 Ji ........................ H04L 63/1408 700/73

(Continued)

FOREIGN PATENT DOCUMENTS

CN 111823138 A 10/2020
EP 3 709 252 A1 9/2020

(Continued)

OTHER PUBLICATIONS

European Patent Office, Extended European Search Report in App. No. 22771051.4, 10 pages (Feb. 12, 2025).

(Continued)

*Primary Examiner* — Chad G Erdman
(74) *Attorney, Agent, or Firm* — Finnegan, Henderson, Farabow, Garrett & Dunner, LLP

(57) ABSTRACT

According to one embodiment, an information management system that autonomously controls a manufacturing process and equipment by diversifying a feedback loop in a CPS is provided. The embodiment is applied to an information management system that autonomously controls a manufacturing process and a service. A loop connection section connects a feedback loop of the cyber-physical system. An information acquisition section acquires specific information necessary for the manufacturing process and the service
(Continued)

from the feedback loop. An information analytics section analyzes the specific information. An autonomous operation control section autonomously performs the operation control based on an analytics result from the information analytics section.

31 Claims, 49 Drawing Sheets

(58) Field of Classification Search
CPC ........ G16Y 10/25; G16Y 40/20; G06Q 10/04; G06Q 2220/00; G06Q 10/06; G06Q 10/08; G06Q 10/10; G06Q 30/0201; G06Q 30/04; G06Q 40/00; G06Q 50/10; G06Q 50/04
See application file for complete search history.

(56) References Cited

U.S. PATENT DOCUMENTS

| | | | | |
|---|---|---|---|---|
| 2016/0179993 | A1* | 6/2016 | Maturana | G06F 30/20 703/7 |
| 2016/0182309 | A1 | 6/2016 | Maturana et al. | |
| 2018/0005118 | A1 | 1/2018 | Kapoor et al. | |
| 2018/0349265 | A1 | 12/2018 | Kashimoto et al. | |
| 2018/0356775 | A1 | 12/2018 | Harvey | |
| 2019/0102360 | A1 | 4/2019 | Sayyarrodsari et al. | |
| 2019/0370671 | A1 | 12/2019 | Martinez Canedo et al. | |
| 2020/0274701 | A1 | 8/2020 | Yuan et al. | |
| 2021/0110075 | A1 | 4/2021 | Dalloro et al. | |

FOREIGN PATENT DOCUMENTS

| | | | |
|---|---|---|---|
| JP | 2020-507157 | A | 3/2020 |
| JP | 2020-515963 | A | 5/2020 |
| JP | 2020-145672 | A | 9/2020 |
| JP | 2020-148359 | A | 9/2020 |
| JP | 2020-175339 | A | 10/2020 |
| JP | 2020-177580 | A | 10/2020 |
| WO | WO 2017/138620 | A1 | 8/2017 |
| WO | WO 2019/093386 | A1 | 5/2019 |

OTHER PUBLICATIONS

The State Intellectual Property Office of People's Republic of China, Office Action in CN App. No. 202280022567.1 (Jun. 30, 2026).

* cited by examiner

TA1

| | | Sensor | Sensor | Sensor | Sensor | Sensor |
|---|---|---|---|---|---|---|
| E9001 | ECP | SE1 | SE2 | | | |
| E9002 | ECP | | | SE3 | | |
| E9003 | ECP | | | | SE4 | SE5 |

INFORMATION MANAGEMENT SYSTEM AND METHOD FOR AUTONOMOUS CONTROL OF MANUFACTURING PROCESS AND SERVICE

CROSS-REFERENCE TO RELATED APPLICATIONS

This application is a Continuation Application of PCT Application No. PCT/JP2022/007927, filed Feb. 25, 2022 and based upon and claiming the benefit of priority from Japanese Patent Application No. 2021-045381, filed Mar. 19, 2021, the entire contents of all of which are incorporated herein by reference.

FIELD

Embodiments described herein relate generally to an information management system and method for autonomous control of a manufacturing process and a service, and relate to productivity improvement, automation thereof, and autonomous control, and more particularly, to an automated and autonomous control system utilizing digital modeling.

BACKGROUND

In recent years, a technology has been developed in which information (information regarding a physical space) regarding a manufacturing process, equipment, and the like on a manufacturing line of various objects (products, parts, and the like) is transmitted to a cyberspace using an Internet of Things (IoT) technology, and an environment of the physical space is digitally reproduced on the cyberspace. The digitally implemented cyberspace is also referred to as a digital twin. In addition, such an overall environment is also referred to as a cyber-physical system (hereinafter, referred to as CPS). Specifically, the physical space is constructed by, for example, a digital data processing apparatus including a transmission/reception apparatus, a computer, and a memory.

BRIEF DESCRIPTION OF THE DRAWINGS

FIG. 22 illustrates a basic configuration of an automated traveling robot/drone or the like.

DETAILED DESCRIPTION

Hereinafter, embodiments will be described with reference to the drawings.

In general, according to one embodiment, an object is to provide an information management system and method for autonomous control of a manufacturing process, equipment, and a service by diversifying a feedback loop (which may also be simply referred to as a control loop) in a CPS.

Further, an object of the embodiment is to provide an information management system and method for autonomous control of a manufacturing process, equipment, and a service, in which physical advanced technology data reflecting, for example, skills of a skilled person (who may be referred to as a master or a human) obtained in a certain physical space can be reflected in a cyberspace as cyber advanced technology data, and the cyber advanced technology data can be reflected in various other apparatuses and devices in the physical space.

Further, an object of the embodiment is to provide an information management system and method that are useful for preserving a global environment and have an autonomous control function with excellent compatibility and affinity with people.

According to an embodiment, an embodiment provides an information management system that autonomously performs operation control in a manufacturing process and a service.

The information management system comprises: a loop connection section that constructs a first feedback loop of a cyber-physical system; an information acquisition section that acquires specific information necessary for the manufacturing process from the first feedback loop; an information analytics section that analyzes the specific information; an autonomous operation control section that autonomously performs the operation control based on an analytics result acquired by the information analytics section.

Figure 1A:
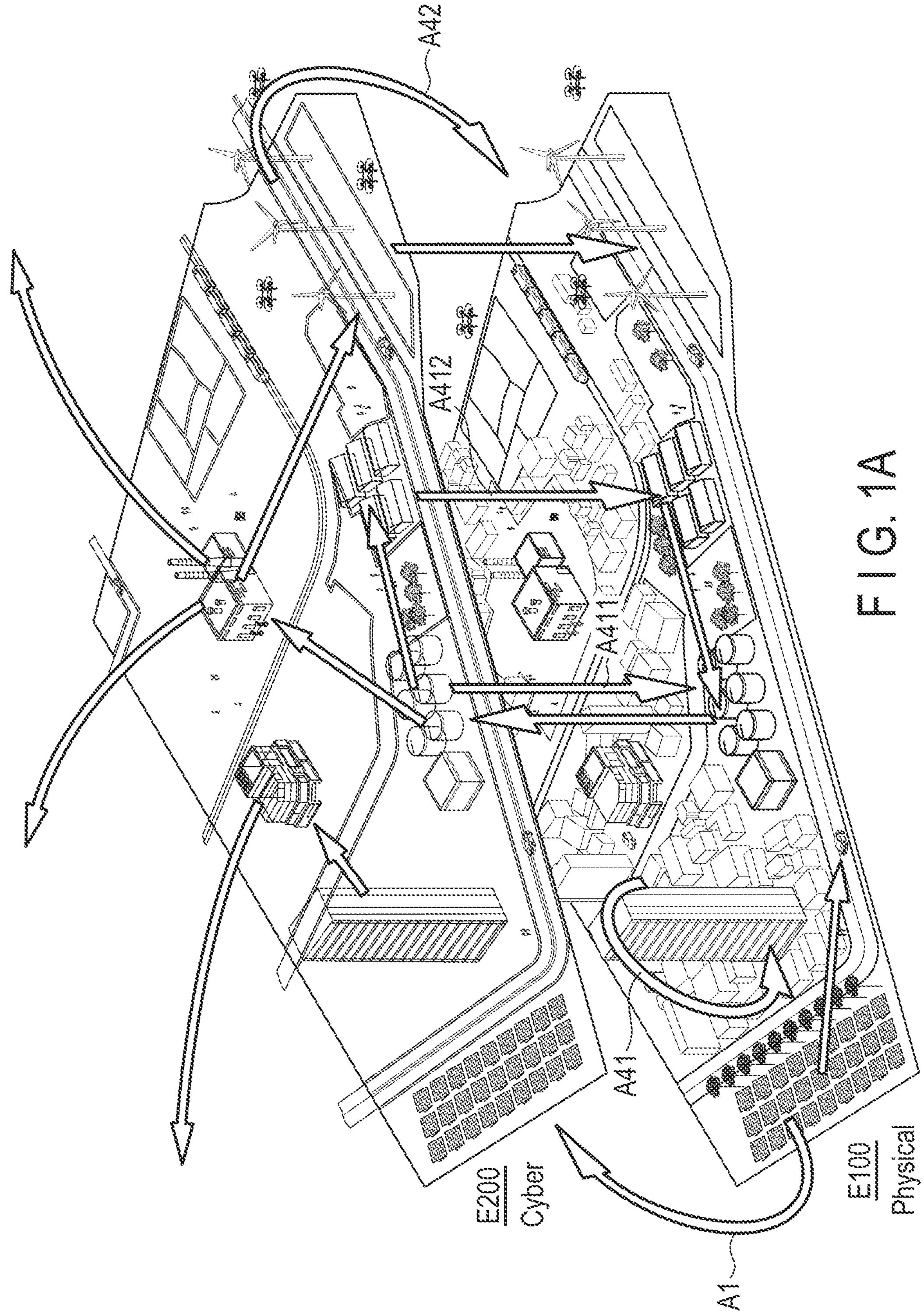
FIG. 1A is an explanatory diagram conceptually illustrating environments of a physical space and a cyberspace to which an embodiment of the present invention is applied.
Figure 1B:
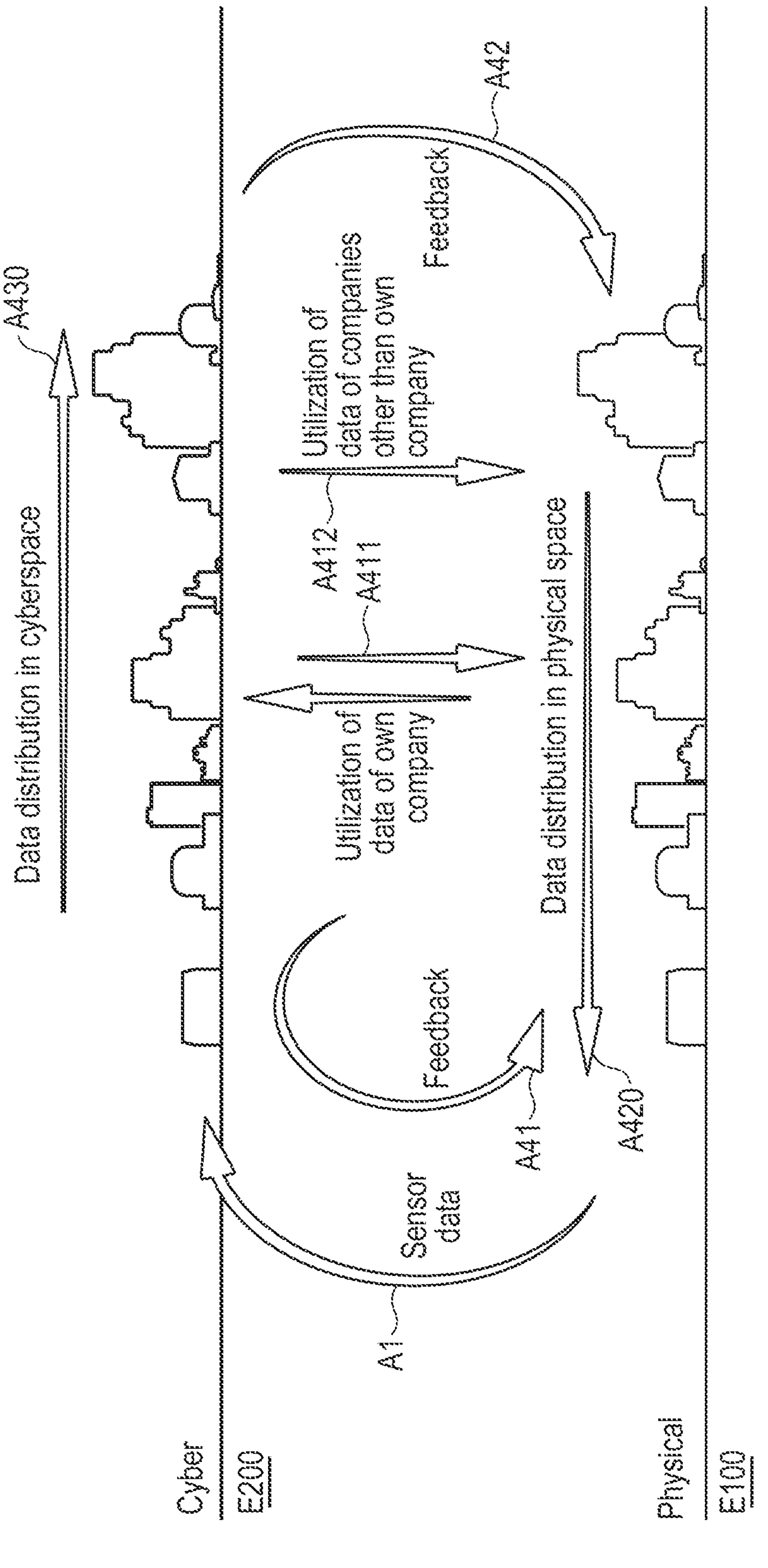
FIG. 1B is a conceptual diagram illustrating data system paths of sensor data, feedback data, and the like formed by the physical space and the cyberspace to which the embodiment of the present invention is applied.

FIGS. 1A and 1B illustrate outlines of a physical space (real world) E100 and a cyberspace (virtual world) E200 to which the present embodiment is applied. The physical space E100 has abundant business domain assets. Various types of sensing data A1 in the physical space are transmitted to the cyberspace E200 via a network. The cyberspace E200 recognizes and understands the sensing data A1, and generates analysis/prediction data and optimization/plan data based on the recognition and understanding. Then, control data is generated based on the analysis/prediction data and the optimization/plan data, and is fed back to the physical space E100.

Value creation is achieved in the physical space by the fed-back control data. In the physical space E100, there are abundant business domains to be monitored, controlled, and referred to. A system path of the sensing data and a system path of the control data are collectively referred to as a feedback loop.

Various industrial objects (parts, cars, drones, power plants, buildings, and the like), fluids (gases, liquids, combustion gases, other working fluids, and the like), services (sales, communications, transactions, images, sounds, and the like), and the like existing in the physical space E100 are formed in the cyberspace E200 in a digitized form. Therefore, in appearance, the cyberspace E200 is constructed with, for example, an information system including a large server or a server group in which a plurality of servers are aggregated and cooperate.

In the present specification, states in which a plurality of servers, a plurality of devices, and a plurality of feedback loops communicate and cooperate to perform, for example, control are collectively referred to as "cooperation". However, in the system according to the present application, a plurality of feedback loops may be connected to each other and perform a parallel operation or serial operation, and thus in this case, "cooperation" also includes the meaning of "linkage". Further, the feedback loop is not fixed in its nominal name, and may be referred to as a control loop, or may be referred to as a main feedback loop or a local feedback loop depending on a purpose or a place where the loop is formed. The feedback loop may also be referred to as a cyber-physical system (CPS) loop, an enterprise loop, or a public loop.

In addition, there are various kinds of feedback loops, and there are one that is newly formed, one that bundles existing feedback loops, and one that bundles an existing feedback and a new feedback. Furthermore, there is also a new or existing feedback loop in which a person (for example, a skilled technician, a doctor, a scientist, or the like) intervenes in the middle of the loop.

Various types of sensing data A1 are transmitted from the physical space E100 to the cyberspace E200. The control data generated in the cyberspace E200 based on the sensing data A1 is returned in feedback loops A41 and A42 flowing between the cyberspace E200 and the physical space E100. Furthermore, a feedback loop A411 that utilizes data (including sensing data) of an own company and a feedback loop A412 that utilizes data (including sensing data) of other companies excluding the own company are formed between the cyberspace E200 and the physical space E100. Examples of the data of the own company and other companies include data such as an adjustment value and a used material adopted by an experienced technician in manufacturing. The data of the feedback loops A411 and A412 can be used not only as data regarding manufacturing but also as data for a service field (sales price balance control information between a plurality of products, control information regarding manufacturing in a use aspect (in a state of being used by an end user after product shipment) and the like). The types of the feedback loops A41 and A42 and the feedback loops A411 and A412 may be referred to as vertically integrated types. A quantum key distribution (QKD) technology may be adopted for some or all of the feedback loops A41 and A42 and the feedback loops A411 and A412.

Data distribution A420 (see FIG. 1B) between business types in various industries is also performed in the physical space E100, and data distribution A430 (see FIG. 1B) is similarly performed in the cyberspace E200. A type of control based on the data distribution A420 and the data distribution A430 may be referred to as a horizontally integrated type. In addition, the QKD technology may be adopted for some or all of the data distribution A420 and the data distribution A430.

In the cyberspace E200, it is preferable to use the world standard time. In this case, for example, instantaneous power consumption and the like can be easily compared between business types.

Figure 2A:
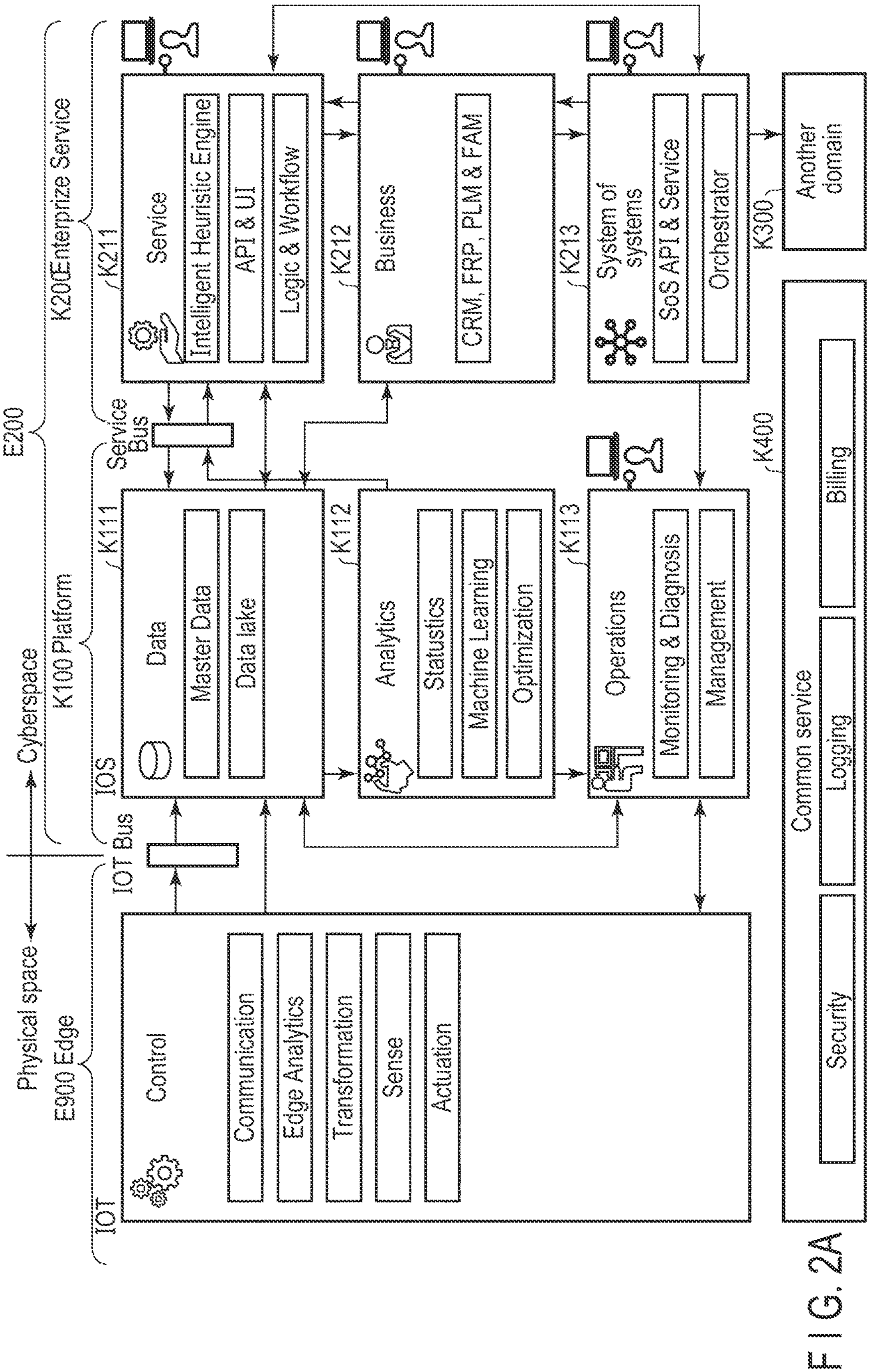
FIG. 2A is an explanatory diagram illustrating system blocks of a globalized cyberspace E200.

FIG. 2A is an explanatory diagram illustrating system blocks of a system in the physical space E100 and the globalized cyberspace E200. An edge computer (which may also be referred to as a gateway or apparatus) E900 in the physical space E100 includes a control section (Control), and the control section has a communication function (Communication), an edge analytics function (Edge Analytics), a transformation function (Transformation), a sensing function (Sense), and an actuation function (Actuation).

The cyberspace E200 includes a platform (Platform) K100 and an enterprise service (Enterprise Service) K200. Furthermore, another domain K300 that cooperates with the enterprise service K200 is provided. In addition, as a common service function K400 common to the edge computer E900, the platform K100, and the enterprise service K200, there are a security function (Security) for securing security for communication and data, a registration function (Logging) for storing data, a program, and the like, and an accounting/bookkeeping/payment function (Billing) related to charging and costs. Furthermore, the common service is positioned as a connection section that forms a feedback loop between the physical space and the cyberspace.

The platform (Platform) K100 roughly includes a data section (Data) K111, an analytics section (Analytics) K112, and an operation section (Operations) (corresponding to a control section E503) K113.

The data section (Data) K111 includes master data and a data lake, and facilitates handling of data. The master data includes data collected from an edge, and data such as specifications of the edge and a use environment, a design drawing, a maintenance history, and the like.

The analytics section (Analytics) K112 includes a statistics section (Statistics), a machine learning section or deep learning section (referred to as an artificial brain (Artificial Intelligence; AI)), and an optimization section based on the above-described various data. Further, the operation section (Operations) K113 includes a monitoring and diagnosis section (Monitoring & Diagnosis) and a management section (Management). That is, the operation section (Operations) K113 performs feedback control for an edge computer E900 according to a result of data analysis by AI, for example. Information for the control may be any information as long as it is information for changing a control state of the edge computer E400, and may be, for example, information for causing the edge computer E900 to perform communication, analysis in the edge computer E400, state change, sensing, operation instruction, and the like. The autonomous operation section K113 may be referred to as autonomous operation control.

The edge computer E900 transmits data collected from IoT devices and the like to the platform K100. In addition, feedback data and instruction data (control information) from the platform K100 are received. Then, the control information is provided to the IoT device or another apparatus to be controlled. By intermittently performing such an operation, a feedback control loop based on a time-series change in sensor data collected from the IoT devices is constructed.

By forming the feedback loop (which may also be referred to as the CPS loop) between the cyberspace E200 and the physical space E100 as described above, it is possible to achieve a large number of advantages such as improvement in efficiencies of various works, improvement in safety, and environmental load reduction. Furthermore, by controlling each of the edge computers E900 of many businesses as described above, the effect thereof is spread to the entire society.

The enterprise service (Enterprise Service) K200 includes a service section (Service) K211, a business section (Business) K212, and a system-of-systems section (System of Systems) K213. Then, the service section (Service) K211 has an intelligent heuristic engine, an application program interface (API) and user interface (UI), and a logic and workflow function. The business section (Business) K212 has related functions with customer relationship management (CRM), enterprise resource planning (ERP), and product lifecycle management (PLM) & enterprise asset management (EAM). The system-of-systems section (System of Systems) K213 has an application interface and service (SoS API & Service) function between systems, and an integration function for a desired form (orchestrator). The entire system-of-systems section (System of Systems) K213 or the orchestrator may also be referred to as an integration control section or an autonomous operation control section.

The enterprise service (Enterprise Service) K200 may communicate the data and analysis result accumulated in the platform to a person in charge of management. The person in charge of management (or a skilled person) can inspect a state of the CPS loop based on human detection, and can manually change, adjust, or switch the state based on the inspection.

For example, in the service section (Service) K211, the person in charge of management inspects and audits the CPS loop based on human detection as an expert, and confirms whether or not the system is normally operating. In addition, the person in charge of management performs inspection, audit, and the like of the CPS loop, and determines occurrence of an abnormality and an external attack based on detection as an expert. When the abnormality of the CPS loop is detected, the person in charge of management may perform troubleshooting for the CPS loop via the service section K211 or by another method.

The business section K212 cooperates with other core systems such as CRM (sales support or customer management function), ERP (customer contact enhancement function), PLM (product lifecycle management function) and EAM (equipment asset management function), and transmits and receives data. The system-of-systems section K213 is a system section that can integrate a plurality of system groups having different lifecycles, for example. For some systems included in the plurality of system groups, management methods and operation methods are independently designed. The systems may also be geographically distributed. The system-of-systems section K213 can perform overall control of the plurality of systems as described above. For example, a large number of CPS loops included in each system can be identified and collectively recognized. In addition, the system-of-systems section K213 can construct a new CPS loop as one system by data accumulated in the platform K100 and analytics (analysis). For example, the system-of-systems section K213 can receive work information from the edge computer E900 and feed back analytics information obtained as a result of the work to the edge computer E900 via a new CPS loop. The function in this case is valid, for example, when cooperating as an additional work system or a periodic maintenance work system.

The system-of-systems section K213 has flexibility in a case of handling a plurality of feedback loops. For example, a second feedback loop may be added to a first feedback loop to bundle a plurality of feedback loops. In this case, the second feedback loop can be added to control data of the first feedback loop as control data (for example, a part of software or a parameter) from a second CPS different from a first CPS constructing the first feedback loop. Then, in a case where a control content of the second feedback loop is incorporated into a control content of the first feedback loop as a result of parallel control (cooperation) for a certain period of time, the second feedback loop is disconnected. However, the first feedback loop and the second feedback loop continuously operate in parallel in some cases depending on the control content. As an example, there is a system in which temperature control by the first feedback loop is sufficient if a temperature change is in a certain range, but strong cooling control by the second feedback loop is performed in a case where the temperature change exceeds the certain range.

In addition to the second feedback loop described above, the system-of-systems section K213 can make third and fourth feedback loops cooperate. In such a case, a loop passing through another domain K300 (a hub to be described later) is constructed.

The edge computer E900 and the platform K100 are connected via, for example, an IoT bus (IoT Bus), and the platform and the enterprise service are connected via a service bus (Service Bus). For the IoT bus, the service bus, the common service, and the like described above, the system-of-systems section K213 can mainly construct the connection section or a loop connection section. Then, the loop connection section includes a loop cooperation control section (software including AI), and has a function of newly constructing a feedback loop, making a plurality of feedback loops cooperate with each other, or releasing the feedback loop.

Figure 2B:
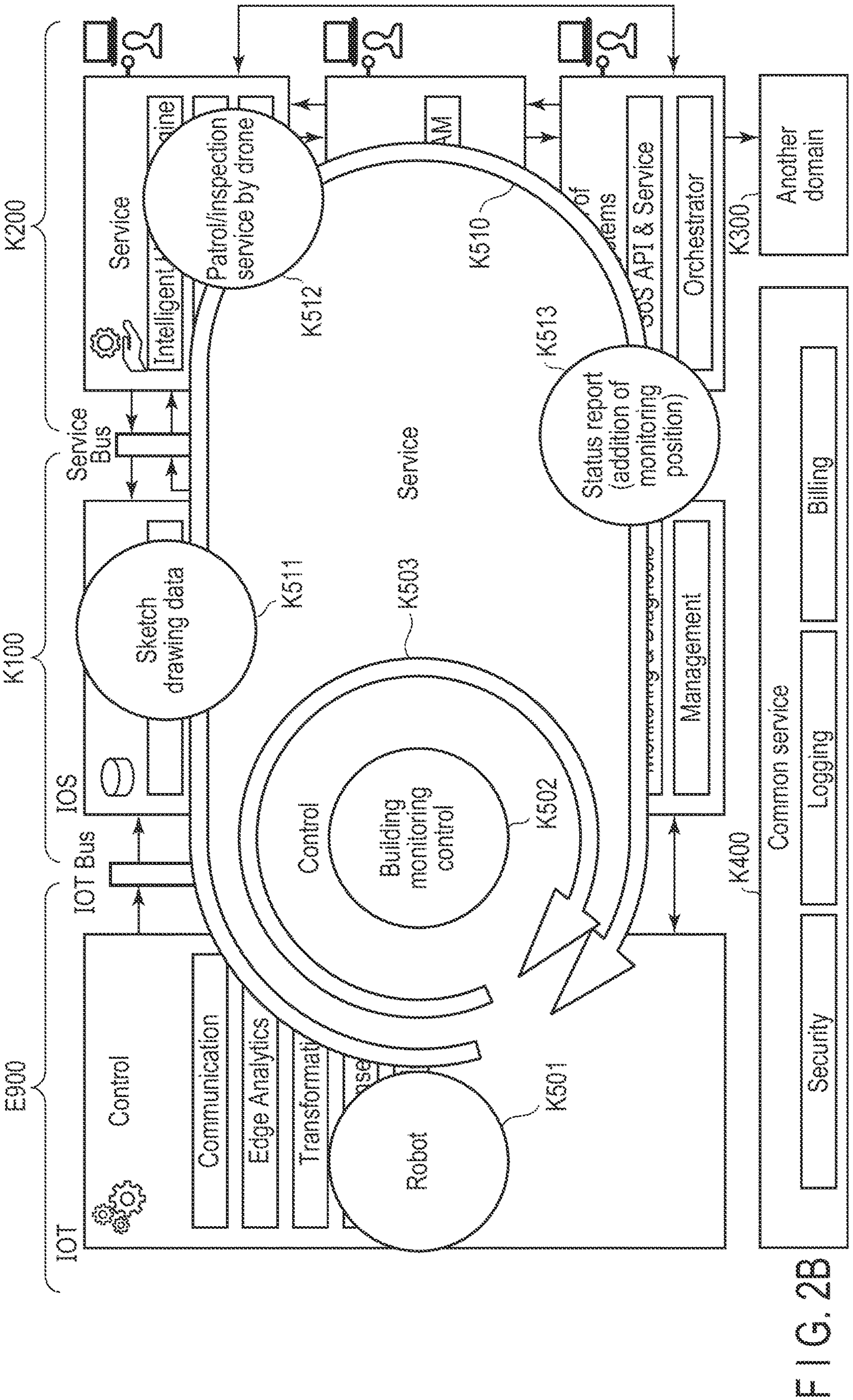
FIG. 2B is an explanatory diagram illustrating a first feedback loop (which may also be referred to as an enterprise loop) K503 and a second feedback loop (which may also be referred to as a public loop) K510 to describe an example of using the globalized cyberspace E200.

FIG. 2B is an explanatory diagram illustrating an example of using the globalized cyberspace E200. In this example, for example, it is assumed that a building is monitored using a robot K501. In the platform K100 in the cyberspace, a program for analyzing monitoring information from the robot K501 and controlling a building environment (an air conditioner, an illumination, or the like), building equipment (an escalator, an elevator, a door, or the like), and the robot K501 itself is deployed. As a result, the feedback loop (which may also be referred to as the enterprise loop) K503 that autonomously controls the environment and equipment and controls the monitoring function of the robot K501 is formed. Here, adjustment parameters for controlling the monitoring function of the robot K501 may include data of a master such as a skilled security guard. This is because the security guard who is familiar with a state of the building and a monitoring place may set a monitoring spot, a monitoring level, a monitoring angle, a monitoring illumination, and the like originally.

Furthermore, since the cyberspace E200 is globalized, the building owner can also request a patrol/inspection service section K512 (a contractor of another domain) including a drone from the sky, for example. At this time, the building monitoring system may cooperate with another different domain.

For this cooperation, for example, a document K511 including a sketch drawing or describing an inspection point of a building or a plant can be provided to the patrol/inspection service section (including the drone) K512. When the patrol/inspection by the drone ends, for example, the patrol/inspection service section K512 transmits a status report (analytics result) K513 to the edge computer E900. The analytics result is, for example, data for requesting addition of a monitoring position, or data for requesting addition (or reduction) of a monitoring robot or a surveillance staff. The service loop (which may also be referred to as the public loop) K510 is constructed by this circulation. The work at this time is led by, for example, the system-of-systems section K213 described above. This example is an example in which the drone is used in a case where the robot in the building is insufficient to monitor the building.

In the above example, loop cooperation control by at least the first feedback loop and the second feedback loop is applied to a control system that performs equipment management of a building. However, the technology of cooperation of the first and second feedback loops can also be effectively utilized in a case where an inspection or repair work for an infrastructure facility (a bridge, a highway, or the like), inspection or cleaning of a window glass outside a building, or inspection of topography of a mountain, a state of the river, or the like is performed regularly or at any time in an extended manner, in addition to the example of using the robot and the drone in the building monitoring work. The "extended manner" means that, unlike constant inspection (inspection using an IoT device permanently installed on the site), inspection for a blind spot (or an insufficiently inspected spot) in the constant inspection is performed. In addition, the extended inspection may be performed after a typhoon, at a season change, or the like. The feedback loop (the service loop or public loop) K510 illustrated here is an example, and the system enables various services. For example, a system that allows an airplane passenger or a vehicle passenger (at the time of commuting or traveling) to easily designate a health care period (months, days, time, or the like) and purchase an insurance can also be constructed. For example, the passenger selects an insurance company, a purchase date, a purchase time, insurance money, and the like in the column of designation information described in a boarding pass, and puts a purchase mark. Then, when the boarding pass is read by an optical reader at a boarding gate, a passenger name and an insurance content are automatically notified to an insurance company through the loop of the cyberspace, and the contract is established. The passenger and the insurance company need to make a contract for such temporary insurance purchase in advance. Examples of the type of the insurance include life insurance, injury insurance, and hospital insurance.

Figure 2C:
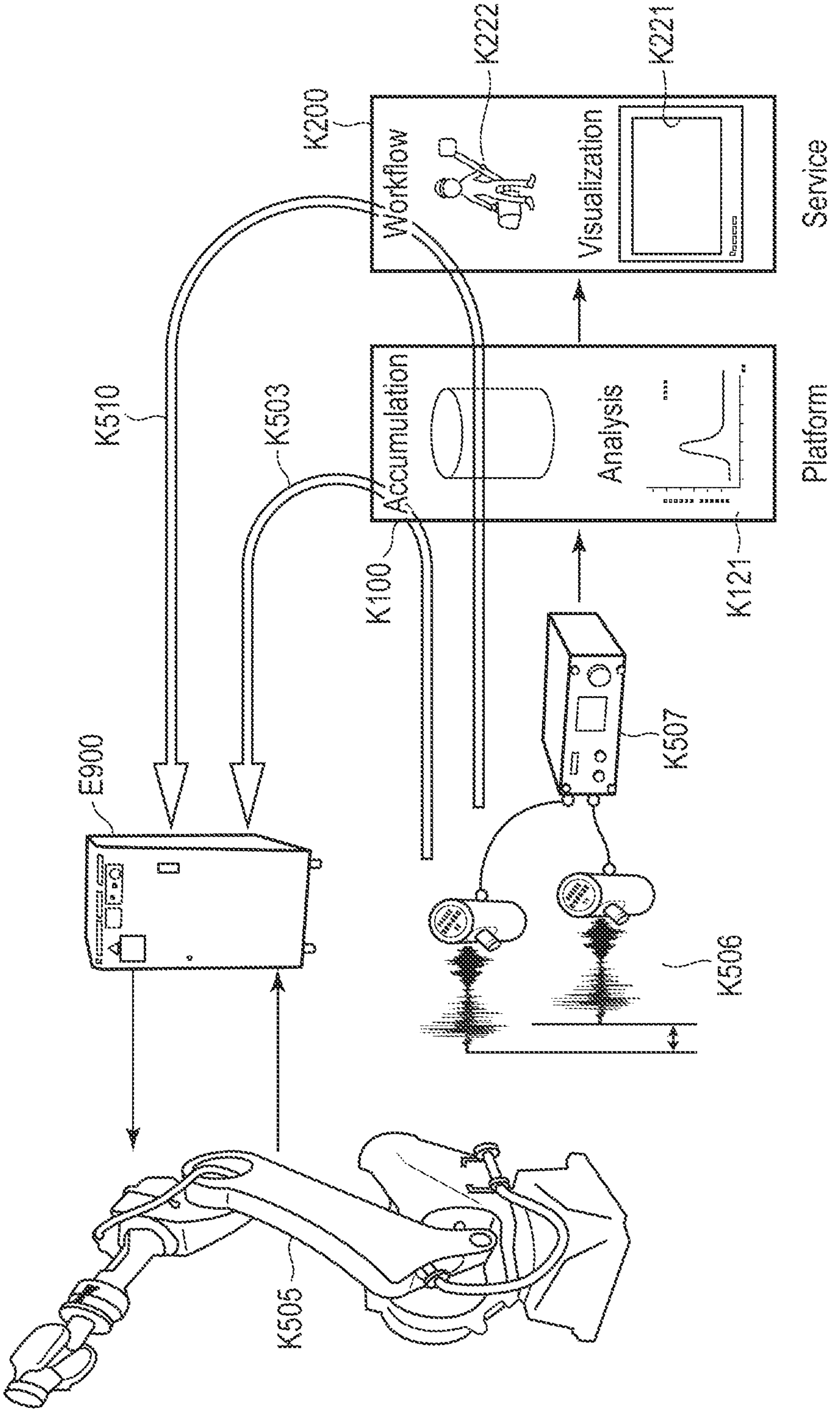
FIG. 2C is a diagram illustrating another example of the enterprise loop K503 and the public loop K510 in the globalized cyberspace E200.

FIG. 2C is a diagram illustrating another example of the feedback loop (which may also be referred to as the enterprise loop) K503 and the feedback loop (which may also be referred to as the public loop) K510. A basic program for controlling the robot K505 is stored in the edge computer E900. Furthermore, a sound generated based on the operation of the robot K505 is detected by an acoustic sensor K506, and an acoustic detection signal is digitized by an A/D converter K507 and analyzed by an analyzer (analytics device) of the platform K100 to generate analytics data K121.

The analytics result is returned to the edge computer E900 as the control data by the feedback loop K503, and is reflected in the autonomous control of the robot K500.

In addition, the analytics data K121 of the analytics result is visualized and displayed by a visualization section K221 of the enterprise service K200, and is evaluated by a skilled person (master) or a master AI that has learned the empirical rule of the skilled person (master). Here, when the skilled person or the master AI determines that the robot K505 is deteriorating or the time for failure is approaching (determination based on the empirical rule of the skilled person), the skilled person or the master AI emergently transmits the control signal K510 to the robot K505. As a result, a sudden accident or the like of the robot K505 itself or a factory including the robot K501 is prevented.

In the above example, the loop cooperation control by at least the first feedback loop and the second feedback loop is applied to a control system that controls a robot.

The above embodiment illustrated in FIGS. 2B and 2C describes an example in which the plurality of vertically integrated feedback loops described in FIGS. 1A and 1B cooperate with each other. That is, the edge apparatus E900 of the physical space E100, the platform K100 of the cyberspace E200, the service section K200 of the cyberspace E200, the first feedback loop K503 provided between the edge apparatus and the platform, and the second feedback loop K510 provided between the edge apparatus and the service section are included. Further, the information acquisition section K111 that is provided in the platform and acquires specific information via the first feedback loop, the information analytics section K112 that analyzes the specific information, the autonomous operation section K113 that causes the apparatus in the physical space to autonomously perform operation control and/or a service based on an analytics result obtained by the information analytics section, and the system-of-systems section K213 that is provided in the service section, receives detection information from the edge apparatus and/or information of the analytics result from the autonomous control section, and returns adjustment information regarding adjustment based on the detection information and/or the information of the analytics result into the edge apparatus via the second feedback loop are included.

Figure 2D:
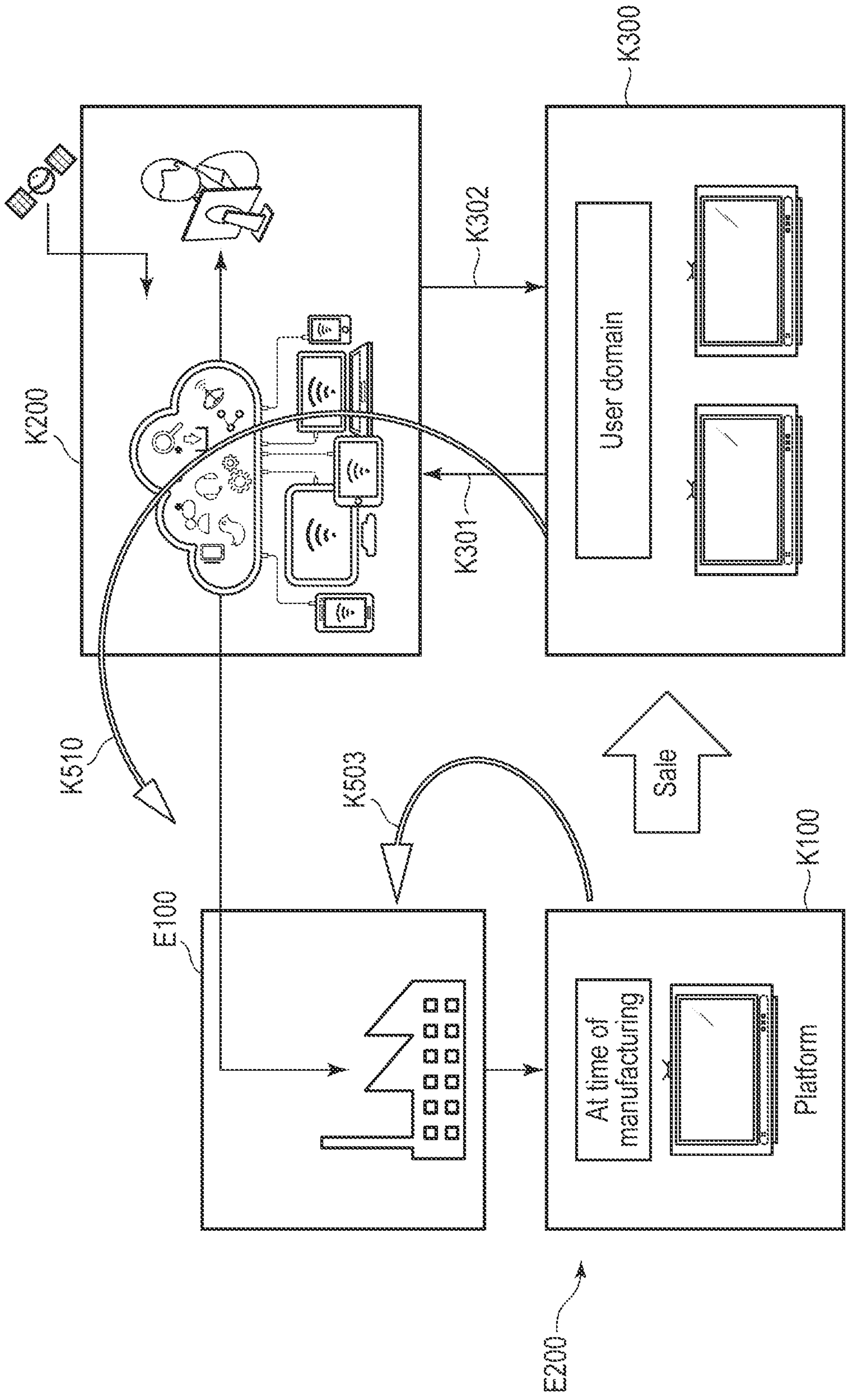
FIG. 2D is a diagram illustrating still another example of the enterprise loop K503 and the public loop K510.

FIG. 2D is a diagram illustrating another example of the first feedback loop (enterprise loop) K503 and the second feedback loop (public loop) K510. For example, it is assumed that a monitor is manufactured in a factory in the physical space E100. The feedback loop K503 is constructed from the platform K100 of the cyberspace E200 to an edge computer of the factory.

Here, the monitor shipped from the factory is sold and then used by a user, and a usage status is managed in the user domain K300. The usage status is uploaded, for example, as log data to a dedicated server (for example, the user domain K300) of a manufacturer. The user domain K300 can cooperate with the enterprise service K200, and, for example, data K301 indicating an API, the usage status, or the like is transmitted from the user domain K300 to the enterprise service K200. Action data K302 is transmitted from the enterprise service K200 in response to the data K301. Examples of the action data K302 include a special control method for the monitor and a restoration command.

Therefore, the enterprise service K200 can aggregate data such as a monitor function desired by the user. The data is fed back to the factory where the monitor is manufactured with a user's consent. A route at this time is the feedback loop (public loop) K510. The fed-back data can be used as reference data for a designer of the monitor at the factory.

That is, in the above embodiment, in the loop control by at least the feedback loop K503 (first feedback loop) and the feedback loop K510 (second feedback loop), the second feedback loop uses reference information from the user domain using the product produced in the factory.

Figure 2E:
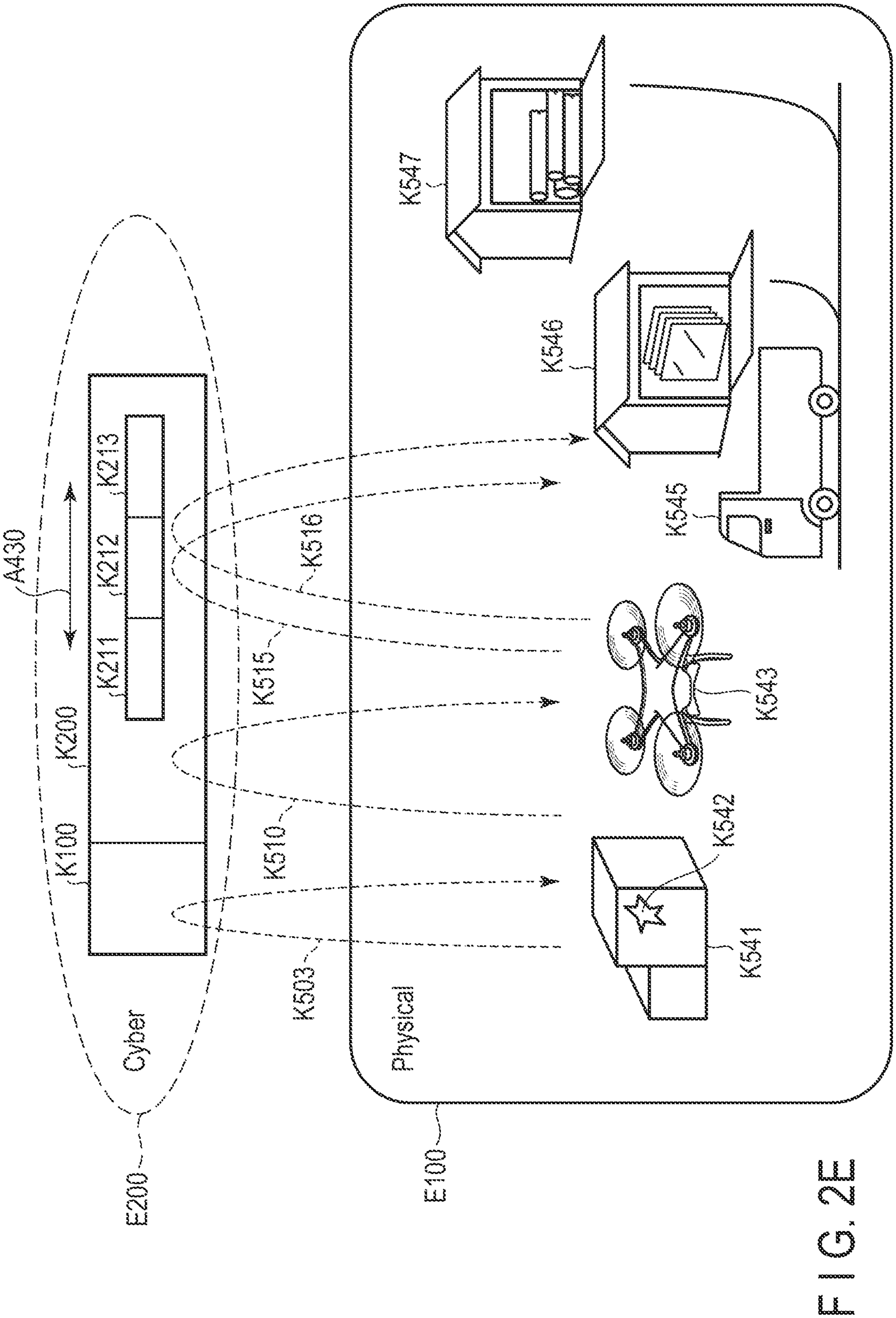
FIG. 2E is a diagram for describing an example of connection (which may also be referred to as cooperation or linkage) of a plurality of feedback loops.

FIG. 2E is another diagram for describing an example of connection (which may also be referred to as cooperation) of a plurality of feedback loops. The loop connection according to the present embodiment includes construction of a new feedback loop and connection or cooperation of a plurality of feedback loops. Therefore, autonomous (intelligent) loop connection implements the autonomous operation control in the manufacturing process/service. The loop connection includes a function of bundling loop groups, and there is a hub serving as a connection boundary between the loop groups. The loop connection section includes the loop cooperation control section.

As illustrated in FIG. 2E, for example, it is assumed that there is a factory management control apparatus that performs illumination management of a manufacturing line, elevator management, operation status management of the manufacturing line, floor cleaning robot management, product quality management, and the like in a factory (which may also be a building) K541. Sensor data acquired by the factory management control apparatus is transmitted to the platform K100 of the cyberspace E200 via the edge computer. The enterprise service K200 is also notified of various types of data (the analytics result or the like) in the platform K100.

Here, it is assumed that a water detection sensor (which may also be referred to as a monitoring camera) for a floor of the manufacturing line notifies the platform K100 that a puddle is formed on the floor. Then, the platform K100 constructs the feedback loop K503 as a result of the data analytics, and causes a floor cleaning robot to perform floor cleaning.

Furthermore, in this case, it is assumed that the analytics section of the autonomous operation control section of the platform K100 analyzes the amount of water in the puddle, the immediately previous weather information, and the like by AI, and determines that, for example, inspection outside the factory K541 is necessary. Then, determination information is transmitted from the platform K100 to the enterprise service K200. The service section K211 of the enterprise service K200 causes, for example, a drone K543 to make an inspection of a factory window or the like via the system of systems K213 based on a content of the determination information. As the control loop for this, the second feedback loop K510 for causing the drone K543 equipped with a camera to fly is constructed. Here, the construction means that the loop cooperation control section forming the loop connection section has operated.

It is assumed that it is detected that a window glass K542 of the factory K541 is broken and needs to be repaired as a result of the above inspection. Window glass breakage information is obtained by analyzing a captured image from the drone K543 by the autonomous operation control section of the platform K100.

As a result of the analytics, "window repair required" information is transmitted from the platform K100 to the enterprise service K200. The service section K211 of the enterprise service K200 constructs third and fourth feedback loops K515 and K516 for notifying a transporting vehicle K545 and a window glass store K546 based on the "window repair required" information. The construction here means that the loop cooperation control section of the loop connection section has further operated. At this time, the second feedback loop K510 is released. That is, the loop cooperation control section also has a function of releasing the feedback loop that has achieved its own purpose.

As described above, the system may connect a plurality of feedback loops or make the plurality of feedback loops cooperate with each other. The operation implements the autonomous operation control in the manufacturing process/service. The loop connection includes the function of bundling loop groups, and there is a hub serving as a connection boundary between the loop groups. In a case where a material such as a drain pipe is required, a feedback loop for notifying a plumbing contractor K547 is also constructed, if necessary.

The feedback loops K510, K515, and K516 described above are autonomously released when the original purposes are achieved. The feedback loop K510 for the inspection by the drone K543 ends, for example, when imaging of a landscape of a predetermined route given in advance (for example, data of an imaging area provided from the factory K541) ends. In addition, the feedback loops K515 and K516 constructed to procure a window glass, a pipe, and the like end, for example, when the transporting vehicle K545 arrives at the factory K541. Specifically, for example, a driver of the transporting vehicle K545 operates a mobile terminal (or an automated traveling vehicle or an automated traveling robot) to notify the edge computer of the store K546 of "start" and "end" at a time point when transporting of the window glass starts and at a time point when the transporting vehicle K545 arrives at the intended factory K541 and finishes predetermined work, whereby the feedback loops K515 and K516 end.

The above-described case is merely an example, and the idea of the feedback loop described above can also be applied to parts procurement, material procurement, and securing of human resources.

In addition, the above-described CPS is described in association with "manufacturing", but in the present specification, "manufacturing" also includes the meaning of "energy generation" in power generation control, for example. In addition, updating of a control program for an automobile (connected car) or a home electric appliance (a technology in which an automobile or a home electric appliance is constantly connected to the Internet and software is automatically updated, that is, a technology using over-the-air (OTA)) is also regarded as "manufacturing in the use aspect". In addition, a distribution process of a distribution center in which a large amount of freights is sorted and transported is also regarded as a part of the manufacturing process.

As described above, the CPS has flexibility that enables autonomous cooperation between various feedback loops. The "hub" in the CPS is described as a system that mediates connection (or cooperation) between the feedback loops (or feedback loop groups). Therefore, one having a role of relaying "connection" of the feedback loops (or feedback loop groups) in a timely and appropriate manner can be referred to as the "hub". As each feedback loop using the hub, there is also a loop that operates with an independent lifecycle. In addition, a concept of a boundary at which the different loops are connected (or constructed) is referred to as a "connection boundary" or a "boundary region". A hub of a network device also plays a similar role of mediating connection of a plurality of networks in the network world, but in the CPS, the network functions as the feedback loop.

Further, the second feedback loop, the third feedback loop, and the fourth feedback loop described above can pass through an overseas hub. For example, in a factory using an imported apparatus, the service can be received from an overseas manufacturer. In a case where a domestic manufacturing factory places an order for a manufactured part or the like, the order may be placed with the overseas manufacturer. Therefore, it is desirable to use the universal time in the cyberspace, but the universal time and the national time may be used together. A satellite communication unit may be used to exchange information overseas.

There are various forms in which a plurality of feedback loops cooperate with each other. For example, the information analytics section and the autonomous operation control section construct the first feedback loop as a first control loop for controlling a first control target that is the manufacturing process. In this state, the information analytics section and the loop cooperation control section may construct the second feedback loop as a second control loop for further controlling the first control target.

The information analytics section and the autonomous operation control section construct the first feedback loop as the first control loop for controlling the first control target that is the manufacturing process. In this state, the information analytics section and the loop cooperation control section may construct the second feedback loop as the second control loop for further controlling a second control target.

Furthermore, the information analytics section and the autonomous operation control section may bundle and continue the second control loop of the second feedback loop together with the first control loop of the first feedback loop. Alternatively, the information analytics section and the autonomous operation control section can temporarily bundle and continue the second control loop of the second feedback loop together with the first control loop of the first feedback loop, and release the second control loop of the second feedback loop under a predetermined condition.

Figure 2F:
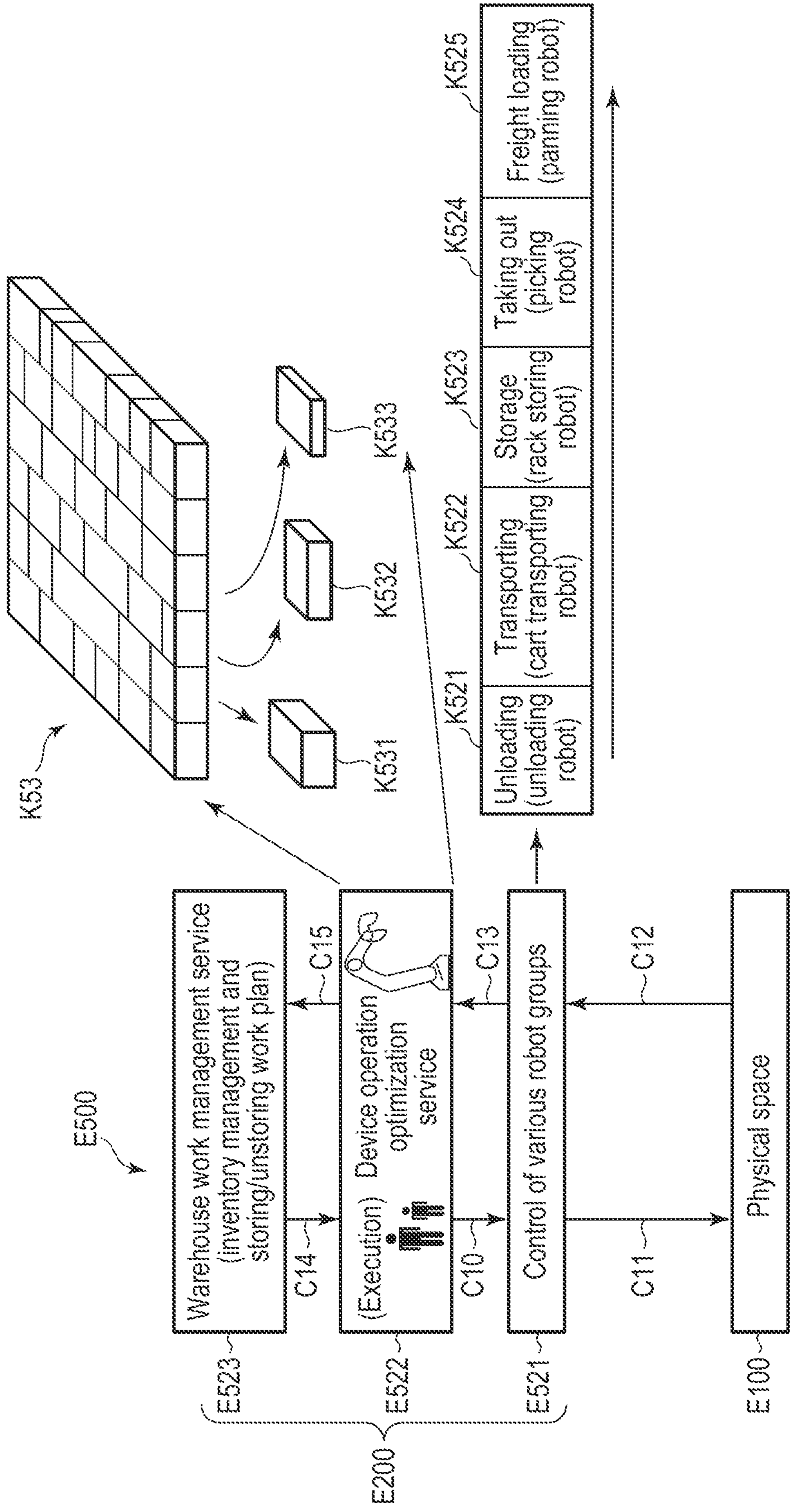
FIG. 2F is a diagram illustrating an example of a hierarchical structure of the cyberspace E200.

FIG. 2F is an explanatory diagram further illustrating a construction example of the cyberspace E200. This example is an example in which the cyberspace E200 is hierarchically configured to facilitate overall control.

The cyberspace E200 includes, for example, an autonomous control section E500 that controls a work robot of a distribution center. The autonomous control section E500 includes a first control section E521, a second control section E522, and a third control section E523 that are hierarchized.

The first control section E521 efficiently performs distribution work while exchanging information with a large number of robots existing in the physical space E100 by using feedback loops C11 and C12 (the vertically integrated type described in FIG. 1B).

Examples of the robot include an unloading robot K521 that unloads a freight from a truck or a rack, a cart conveying robot K522 that conveys an unloaded freight, a rack storing robot K523 that stores a conveyed freight in a rack, a picking robot K524 that takes out a freight from a rack, and a panning robot K525 that loads a freight taken out by the picking robot on a truck. As described above, the scene of controlling the plurality of robots is that the information analytics section and the autonomous operation control section construct a plurality of feedback loops as a plurality of control loops for controlling a plurality of control targets that are the manufacturing processes.

These robots K521, K522, K523, K524, and K525 are directly controlled by the first control section E521 that is a first tier. The second control section E522 receives a report C12 of a robot operation status from the first control section E521. Then, control data C10 for optimizing device (robot) operation is output. Examples of a freight K53 to be stored in the distribution center include various freights such as large and small freights, freights with various shapes, freights with various weights, and hard and soft freights. Therefore, the second control section E522 recognizes a freight by with an image, a barcode, a two-dimensional code, or a wireless sensor by using a camera, an optical sensor, an RFID, or the like. Then, the second control section E522 allocates a robot by setting a heavy freight or a freight requiring simple work as a freight K531 for robots. In addition, the second control section E522 determines a freight that is difficult for a robot to handle as the freight K532 for experienced workers or a freight K533 for new workers. The first control section E521 is notified of these determination results as control data C10. As a result, the unloading robot K521 moves to acquire the freight K532.

The second control section E522 notifies the third control section E523 of a work performance C15. The work performance C15 is a processing status (including the number of processed freights, a processed weight, and the like) of a freight carried into the distribution center. The third control section E523 performs stock management and storing/unstoring management in the distribution center according to the work performance C15. In a case where the third control section E523 analyzes the work performance C15 and determines that sorting work has progressed as planned, the third control section E523 notifies the second control section E522 by using control data C14 in such a way as to incorporate work such as storing/unstoring into a work procedure. For example, it is also possible to arrange many unloading robots in an unloading area, and it is also possible to notify a truck or the like waiting for entering the distribution center of an entry permission (storing permission) by telephone.

That is, in an information management system for distribution management of the distribution center described above, the first control section E521 receives data indicating a control state of each robot that performs each work such as unloading, transporting of a freight, storing of a freight, taking out of a freight, and loading of a freight from the edge computer arranged in the physical space, and performs feedback in such a way that each of the robots functions according to a set robot control program. The second control section E522 identifies a freight suitable for the work of the robot from among freights stored in the distribution center, and notifies the robot control program of information for causing the robot to perform unloading. Then, the third control section E523 receives information regarding a work performance via the notification data C15 from the first control section E521 and the second control section E522, and feeds back information for storing and unstoring management to the second control section E522 in order to perform freight stock management in the distribution center according to the work performance. As a result, efficient sorting processing and storing and unstoring processing are executed in the distribution center, and efficient use of power (environmental load reduction) is achieved.

In the CPS described so far, the feedback loop is mainly constructed using the loop connection section. The loop connection section may include or cooperate with the loop cooperation control section. Then, the loop cooperation control section constructs the feedback loops K503, K510, and the like. In this case, the loop cooperation control section uses various elements in the cyberspace E200. For example, in FIGS. 2B and 2C, the platform K100 is a construction element of the feedback loop K503, and the platform K100 and the enterprise service section K200 are construction elements of the feedback loop K510. Furthermore, in FIG. 2D, the platform K100 is a construction element of the feedback loop K503, and the platform K100, the user domain K300, and the enterprise service section K200 are construction elements of the feedback loop K510.

In each embodiment described above, an example in which the number of feedback loops K503 is one, and the number of feedback loops K510 is one is described for clarity. However, in an actual CPS, there may be a plurality of feedback loops (enterprise loops) K503 and a plurality of feedback loops (public loops) K510.

Therefore, the loop connection section that constructs the feedback loops K503, K510, and the like has the following functions and meanings. That is, the loop connection section can construct a new feedback loop between the cyberspace and the physical space in combination with the operation of the autonomous control section. In addition, the loop cooperation control section of the loop connection section can connect a plurality of feedback loops to each other. That is, as illustrated in FIGS. 2C, 2D, and 2E, a plurality of loops can be connected via the edge computer E900. Furthermore, the loop cooperation control section of the loop connection section bundles a plurality of loops (loop groups) and allows the presence of the hub serving as the connection boundary between the loop groups. The hub corresponds to, for example, the system-of-systems section K200 in the examples of FIGS. 2A and 2B, and corresponds to the system-of-systems section K200 and the user domain K300 in the example of FIG. 2D.

As described above, in the CPS, there are various kinds of feedback loops, and there are one that is newly formed, one that bundles existing feedback loops, and one that bundles an existing feedback and a new feedback. Furthermore, there is also a new or existing feedback loop in which a person (for example, a skilled technician, a doctor, a scientist, or the like) intervenes in the middle of the loop. For example, in a case where there is a person near a control target device, a feedback loop is constructed in which processing, a timing, or the like is also optimized in consideration of a relationship with an environment or status of a control target destination, such as a case where an operation of the control target device is performed after detecting a confirmation completion action of the person from the viewpoint of safety. As an example of a case of cooperation with an existing feedback loop, for example, in a case where there is a request to increase a set air-conditioning temperature for an air conditioning system of a lower feedback loop in the summer season according to a demand from an upper feedback loop (power company), an upper limit value is set when there is a worker, a patient, or a baby. The upper limit value is controlled in such a way that only necessary data is communicated in a timely manner as necessary from various industrial systems (factories: a production management system, hospitals: a system dedicated to a medical chart or a hospital staff such as a nurse, childcare centers: a physical condition management system, homes: an individual system in a smartphone, or the like) in other feedback loops. As described above, the CPS can freely use various feedback loops. For this reason, the CPS includes a feedback loop management section. The feedback loop management section may be set in data of the information acquisition section K111 of the cyberspace E200 or may be arranged in the information analytics section K112. Furthermore, the feedback loop management section may be arranged in an external server or a predetermined edge computer.

The feedback loop management section stores a plurality of pieces of feedback loop information. Each pieces of feedback loop information includes a header and labeling data (loop identification information) in the header. The labeling data is data for identifying the feedback loop. Further, a data storage section continuous to the header stores device information used to form the loop, device identification information of a controlled device that is a control target, a parameter necessary for the loop to control the controlled device, device identification information that is a control target, information regarding the lifecycle of the loop, owner information or right relationship information regarding data in the loop, permission information regarding data use, information indicating the presence or absence of personal information and a secret level of industrial data, and the like, and in a case where cooperation with another feedback loop is possible, the labeling data of the feedback loop is further included. In addition, there may be limit information of an operation period of the loop, usage price information, and the like. A feedback management section can also receive and manage newly formed feedback loop information. Furthermore, after the feedback loop is used, use performance data may be managed by the feedback management section.

Furthermore, the "limit information of the operation period" and/or the "parameter" of the feedback loop information may be input by a person (master). The data for identifying the feedback loop, the device information used to form the loop, the device identification information of the controlled device that is a control target, the parameter necessary for the loop to control the controlled device, the device identification information that is a control target, the information that can cooperate with another feedback loop, and the like may be referred to as attribute information of the feedback loop.

As the feedback loop information is managed by the feedback loop management section as described above, the CPS can be autonomously adapted to a wide variety of controlled devices and apparatuses. Therefore, in the CPS system, the loop cooperation control section is formed in a loop system path, the loop cooperation control section is constructed by cooperation of the loop connection section and the autonomous operation control section, and a new feedback loop can be formed in response to a new analytics result.

For the new feedback loop, information of an existing feedback loop may be used, or a feedback loop may be newly formed. Furthermore, a new feedback loop of an upper layer in which an existing feedback loop and a new feedback loop are bundled as a group may be formed. Furthermore, a plurality of existing feedback loops may be formed in a bundled state. These forms can be changed according to a status of a control target device or site. For example, in a case where a program for controlling the control target device is executed based on time-series data such as sensor information, it is also possible to make determination based on a relationship with time. For example, the processing to be executed is the same, but a timing for connecting the feedback loops may be different depending on the degree of urgency between a case of emergency and a case of no emergency.

Since the feedback loop management section exists as described above, the loop connection section and the autonomous operation control section have a loop search function of searching for the feedback loop information. The loop search function detects, for example, sensing data from a sensor and refers to a preset loop table. In the loop table, the loop identification information corresponding to a sensor that has transmitted the sensing data in advance is described. For example, in the example described in FIG. 2E, the feedback loop necessary for inspection by the drone is designated corresponding to a water leakage detection sensor. The loop table may be created in advance by the user or may be provided in advance by an administrator of the cyberspace E200.

Figure 3A:
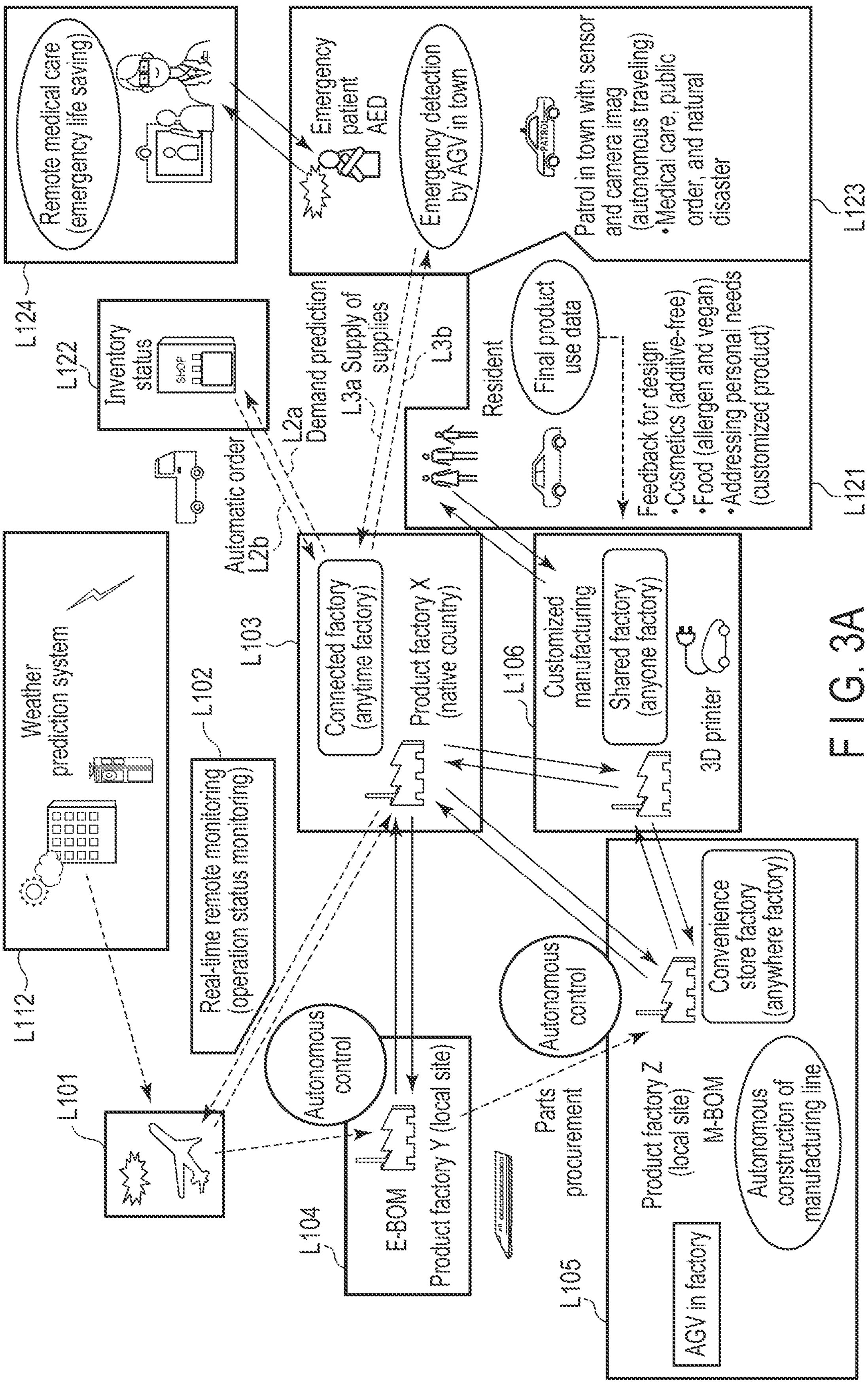
FIG. 3A is a diagram for describing that a feedback function of the cyberspace can be further diversified due to globalization of the cyberspace E200.

FIG. 3A illustrates an example in which, as the cyberspace E200 is globalized as described above, various services can be provided in various social aspects, and a mobile object used in the manufacturing process can be effectively utilized on the cyberspace.

For example, it is assumed that a first engine of an airplane L101 fails due to a bird strike. An operation status (flight status) of a fuselage of the airplane L101 is always monitored by a remote monitoring system L102 in real time. The remote monitoring system L102 notifies a connected factory (which may also be referred to as an anytime factory)

L103 in a country where the airplane L101 is manufactured. A pilot notifies a control tower of the status of the airplane L101.

Here, it is assumed that the pilot (captain) has reported that the plane can fly to an airport at a destination (local site) in the current state. In addition, it is assumed that the control tower has also permitted the flying. At this time, the pilot and the control tower also refer to information from a weather prediction system L112.

Then, the remote monitoring system L102 inquires of the connected factory L103 whether or not a factory or store of a design part necessary for repair or a manufactured part for replacement (for example, a composite part) is near the airport of the destination (local site). For example, the connected factory L103 makes an inquiry to a local product factory L104 that performs design and a product factory L105 that performs manufacturing. The local product factory L104 refers to an engineering bill of materials (E-BOM), and the product factory L105 checks a stock status based on data of a manufacturing bill of materials (M-BOM) and autonomously informs the connected factory L103 that the part for repair or the manufactured part for replacement (the composite part) is present or in short supply. The product factory L104 mainly performs design, and performs manufacturing by constantly monitoring whether or not there is any design defect or insufficiency in parts of a final product. The product factory L105 mainly performs manufacturing and assembly, and also manufactures a product designed in the product factory L104.

For example, in a case where the airplane L101 is to be repaired at an airport near the product factory L105, the connected factory L103 may instruct, for example, the local product factory L104 to deliver the part to the local product factory L105.

The product factory L105 may be a factory of a type that autonomously constructs the manufacturing line according to the part or composite part to be manufactured. This type of product factory L105 may be referred to as a convenience store factory (or an anywhere factory).

Furthermore, the connected factory L103 can effectively utilize a shared factory (which can also be referred to as an anyone factory) L106 that performs customized manufacturing.

The shared factory L106 can manufacture a custom-made part, and possesses a 3D printer and the like. In a case where the amount of manufactured parts from the product factory L105 is insufficient or manufacturing of some parts cannot be completed before the arrival of the airplane, the connected factory L103 performs the following procedure. That is, the connected factory L103 places a temporary order with the shared factory L106 and instructs the shared factory L105 to deliver the part. Manufacturing using a 3D printer reflects techniques of a master to be described later.

The shared factory L106 described above can exhibit a function convenient for a local resident. The local resident L121 can feed back evaluation of an apparatus or product being used to a designer or the like.

This is because, since the shared factory L106 enables customization, when there is a product design change request, the change request can be reflected in the product design. Furthermore, regarding cosmetics, the resident can transmit additive-free information to the shared factory L106 via Internet information, an SNS, or the like. In addition, regarding food, the resident can transmit information regarding allergen and vegan to the shared factory L106. In addition, the resident can utilize the shared factory L106 in a case where the resident wants to produce a customized product or the like (when the resident has personal needs).

In the cyberspace E200, for example, a management section L122 that comprehensively manages a stock status of a part or the like exists. The management section L122 can analyze a variation L2*a* in stock of the part and predict a demand. In a case where the stock is insufficient, for example, an order L2*b* for the part that may be insufficient can be automatically placed with the connected factory L103.

There may be an emergency patient in some regions or local areas. Even in such a case, a work vehicle of a container freight station (CFS) can supply necessary supplies upon receiving a notification from an emergency patient generation area L123 (L3*b*). For example, an automatic guided vehicle (AGV) traveling in town or a surveillance camera installed on a robot detect an emergency patient. An infrared sensor, a microphone, and a camera mounted on the robot acquires an image of the behavior or falling state of the emergency patient, and the state of the emergency patient is diagnosed by a diagnosis apparatus mounted on the robot. The diagnosis apparatus notifies the autonomous control section E500 of the cyberspace E200 of emergency diagnosis data, for example. In a case where an abnormal state in the area L123 is determined, the control section E503 for feedback in the cyberspace E200 can notify the connected factory L103 of the place or the situation, for example. Upon receiving the notification L3*b* from the area L123, the connected factory L103 can supply the supplies (for example, relief supplies, a medical tool for emergency treatment, an automatic external defibrillator (AED), and the like) (L3*a*).

The sensor, the microphone, the camera, and the diagnosis apparatus may be arranged at a plurality of predetermined positions in town. Furthermore, the diagnosis apparatus can also communicate with a remote medical institution L124. Through the communication, an on-site staff can receive advice from a doctor employed in the remote medical institution L124 when treating the emergency patient. In this case, the on-site staff can receive advice from the doctor employed in the remote medical institution L124 by using, for example, a virtual reality (VR) apparatus or an augmented reality (AR) apparatus. The VR or AR may be supplied from, for example, the connected factory L103.

Figure 3B:
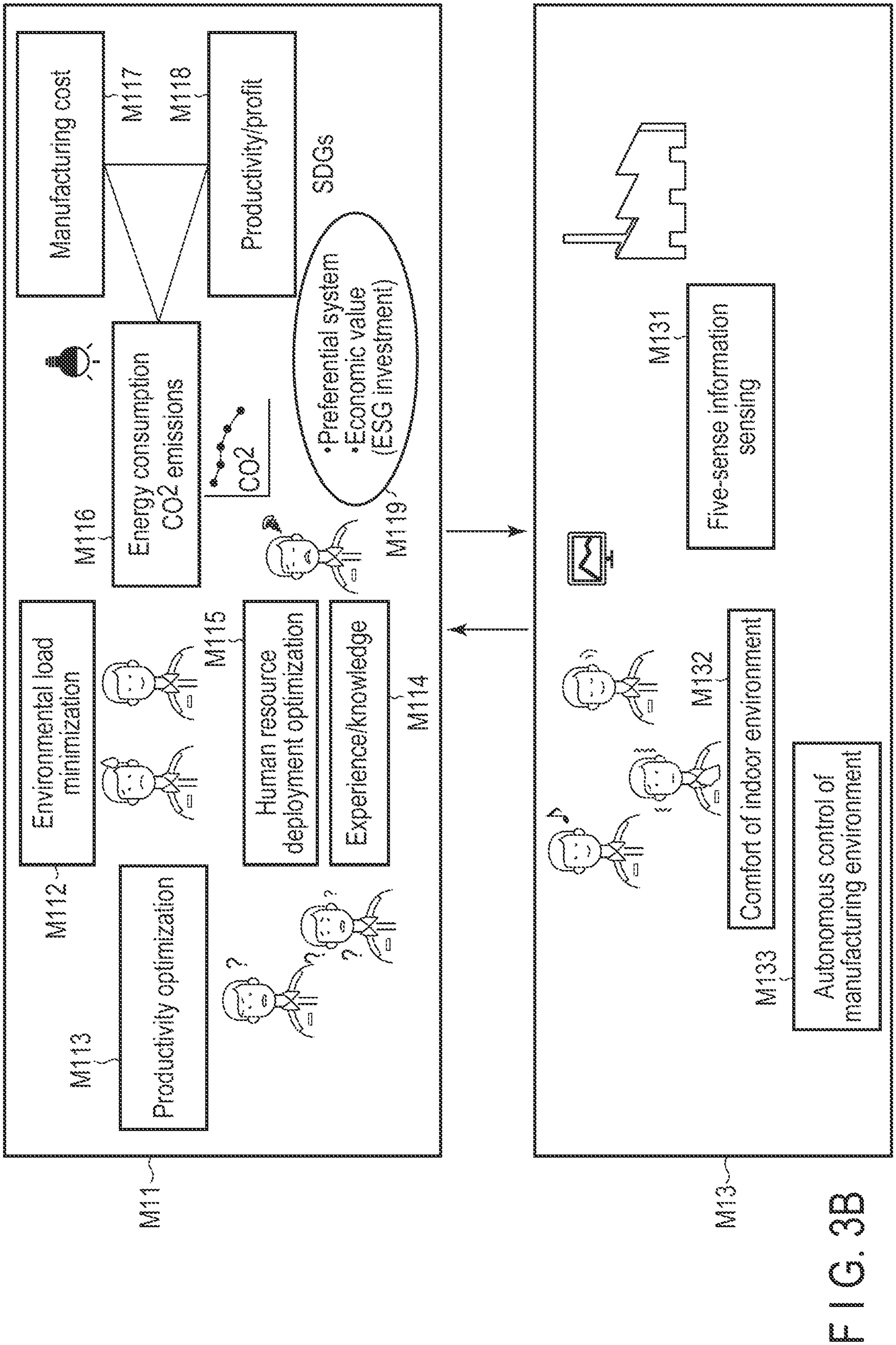
FIG. 3B is a diagram separately illustrating an achievement function M11 for a manufacturing space and an approach function M13 for the manufacturing space in order to describe an example of an effect which can be implemented by a cyber-physical system (CPS) in the cyberspace E200.

FIG. 3B is a diagram separately illustrating a purpose achievement function M11 for achieving a purpose in a manufacturing space and an operation function M13 for performing various operations in a work space (including a manufacturing space in a factory) in which a worker exists in order to describe effects achieved by the CPS in the cyberspace E200.

First, representative examples of the operation function M13 include a five-sense information sensing function M131, an indoor environment comfort function M132, and an autonomous manufacturing environment control function M133.

The five-sense information sensing function M131 refers to information from a wearable sensor of the worker, operation information of the worker, temperature adjustment information, and the like. The comfort function M132 is a function of adjusting, for example, an air conditioner, a blower, a humidity adjustment apparatus, or the like by autonomous control or the operation by the worker.

Further, the autonomous manufacturing environment control function M133 automatically performs autonomous control in such a way as to maintain the work space in a comfortable state according to the five-sense information of the worker and information based on the operation by the worker. In this case, the autonomous control does not simply respond to the five-sense information of the worker and the information based on the operation by the worker, but is performed in such a way as to satisfy various requirements of the purpose achievement function M11.

The purpose achievement function M11 includes an environmental load minimization function M112, a productivity optimization function M113, a worker experience/knowledge reference function M114, and a human resource deployment optimization function M115. In addition, an energy consumption calculation function (which may also be referred to as a carbon dioxide emission amount measurement function) M116, a manufacturing cost estimation function M117, and a productivity/profit estimation function M118 are provided.

Then, it is possible to create ideal plan information for optimizing productivity, selecting workers with abundant experience and knowledge, and deploying human resources to appropriate positions so that the energy consumption and manufacturing cost decrease, and the productivity and profit increase, and to notify a necessary worker of the plan information. As the worker, a local resident who is not currently in the factory may also be utilized as long as the local resident has abundant experience.

In a case where the ideal plan information is created as described above, in order to obtain the comfort of the indoor environment, the autonomous control does not simply respond to the five-sense information of the worker and the information based on the operation by the worker, but is performed in such a way as to satisfy various requirements of the purpose achievement function M11.

Therefore, for example, in a case where an expert who has abundant experience for a product to be manufactured is selected, there is a possibility that the expert is less sensitive to indoor heat as compared with an unexperienced person. The expert may be satisfied only by slightly lowering an air blowing amount or humidity. Alternatively, in a case where a production amount of the product to be manufactured is reduced (a result of referring to sales trend data), a burden on the worker is reduced, and there may be no need to lower the indoor temperature. As a result, it is possible to obtain a CPS capable of reducing energy consumption and reducing an environmental load.

Figure 4:
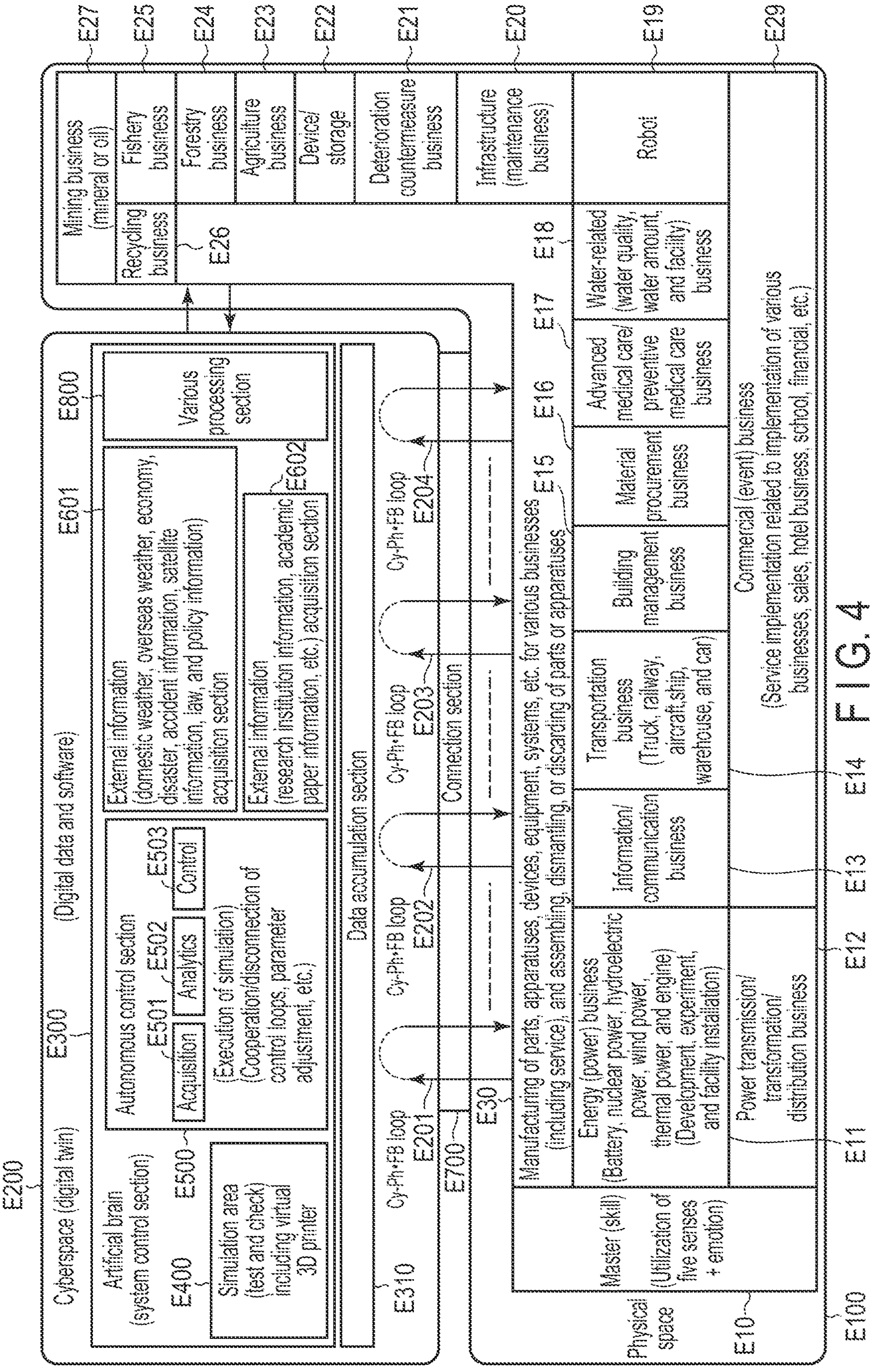
FIG. 4 is a diagram illustrating a physical space E100 (a lower side in FIG. 4) and the cyberspace E200 (an upper side in FIG. 4) together with more specific various businesses.

FIG. 4 illustrates the physical space E100 (a lower side in FIG. 4) and the cyberspace E200 (an upper side in FIG. 4) together with more specific elements (various businesses). The elements illustrated here are also representative, and not all the elements are illustrated.

<Physical Space>

The businesses include an energy (power generation) business E11. Examples of the business E11 include a battery manufacturing-related business, a nuclear power generation-related business, a hydroelectric power generation-related business, a wind power generation-related business (including an offshore wind power generation-related business), a thermal power generation-related business, an ocean power generation-related business, a geothermal power generation-related business, an autonomous hydrogen energy business, and a solar power-related business. Here, the related businesses in the present specification include related business of development, experiment, and facility installation related to the businesses. In addition, a prototype provider (or prototype department) may be included.

Further, there is a power transmission/transformation/distribution business E12 for supplying and distributing power to local areas. There is also an information/communication business E13. The information/communication business E13 includes related businesses of a long/short distance transmission apparatus and reception apparatus, antennas, satellite communication, and broadcasting.

There is also a transportation business E14 (for example, a truck, a railway, an aircraft, a ship, a warehouse, a work vehicle, a bulldozer, a tractor, an agricultural machine, and related businesses thereof). Furthermore, there are a building management business E15 (an elevator business, office illumination, an escalator, a multi-air conditioner business for buildings, or the like), a material procurement business E16, an advanced medical care/preventive medical care business E17, a robot E19, an infrastructure business E20, a deterioration countermeasure business E21, a device/storage business E22 (an in-vehicle/industrial power device, an in-vehicle digital IC, a hard disk-related storage, a semiconductor manufacturing apparatus, fine ceramics, or the like), an agriculture business E23, a forestry business E24, a fishery business E25, a recycling business E26, a mining business (oil, coal, or mineral) E27, and related businesses thereof.

Furthermore, there are also a business of manufacturing parts, devices, equipment, systems, and the like for the above-described various businesses, a business of assembling parts or devices, and a business E30 of dismantling or discarding parts, devices, and apparatuses. There is also a commercial (including events) business E29. Examples of the business E29 include a service implementation business that functions in relation to implementation of various businesses, a distribution business, a sales business, a hotel business, a school business, a financial business, a travel planning business, a business such as commercials, notifications/publications, and related business thereof. There is also a battery business.

In the present embodiment, in a case where a skilled person (who may also be referred to as a master) is involved in various businesses in the physical space E100, a skill (technique) E10 of the master is to be effectively utilized. In addition, also in aspects related to service businesses, it is possible to effectively utilize responsive treatment by a skilled person for supporting local areas and rescuing and saving people.

<Cyberspace>

The physical space E100 transmits sensor data obtained from sensors at various business sites, data such as programs (software) used in various businesses and control parameters to be used, and master skill data to the cyberspace E200 to construct a so-called digital twin. The cyberspace E200 includes a data accumulation section E310 that stores various data and programs (software).

The cyberspace E200 receives various data from the physical space E100 from a network via a connection section E700 (an IoT bus, a Service bus, the common service K400, and the like). A quantum key cryptography technology may be used in a part of or the entire data transmission path in the network. In particular, it is desirable to use the quantum key cryptography technology for a medical service business, a financial service business, and a public service business.

The cyberspace E200 includes AI (which may also be referred to as a system control section) E300. The AI (E300) uses data of the data accumulation E310. Furthermore, the cyberspace E200 has a feedback loop (cyber-physical feedback loops (hereinafter, referred to as Cy-Ph FB loops)

E201, E202, E203, E204 and the like are illustrated as representatives in the drawing) for each business. It is not necessary that one feedback loop is provided for one business, and a plurality of feedback loops may be provided for one business. The Cy-Ph FB loops E201, E202, E203, E204, and the like are formed between the cyberspace and various businesses, respectively, and implement a vertically integrated system path.

Since the Cy-Ph FB loops E201 and the like exist as described above, in a case where it is determined that there is a need to perform correction, addition, change, or the like on a program or control parameter of a control system of a certain business, the AI (E300) can execute the correction, addition, change, or the like via the Cy-Ph FB loop of the corresponding business. The AI (E300) can autonomously execute the correction, addition, and change as described later.

The AI (E300) includes the simulation area E400, the autonomous control section E500, a variation information acquisition section E601, and a research information acquisition section E602. The AI (E300) may be referred to as the system control section or artificial intelligence. The AI (E300) includes more processing functions (various processing sections E800). For example, there are a function for service business and space business processing, a function for connection processing with other domains, and a function for extending cooperation between the control loop and the feedback loop.

In the simulation area E400, a program for product manufacturing (corresponding to a design drawing) received from the physical space E100 via the AI (E300) and material information for manufacturing (including environment information) can be used as virtual prototype data, and a virtual prototype can be constructed by a virtual 3D printer.

The virtual prototype is, for example, digital image data. The administrator of the cyberspace can observe the digital image data with an image display apparatus, a CAD system, or the like. The administrator can also distribute the digital image data of the virtual prototype to a desired user.

In addition, the simulation area E400 can actually transmit the program for product manufacturing (corresponding to the design drawing) and the material information for manufacturing (including the environment information) as actual prototype data to the prototype provider (or prototype department) in the physical space. As a result, the prototype provider (or prototype department) can manufacture the actual prototype by using the possessed 3D printer or manufacturing equipment and the actual prototype data. Then, the prototype provider (or prototype department) can also perform inspection, experiment, and the like of the actual prototype.

Furthermore, the administrator of the cyberspace E200 can distribute the actual prototype data to a desired user, for example, a research institution or a business development seeker.

As described above, data is exchanged between the cyberspace E200 and the physical space E100. Therefore, for example, in the autonomous control section E500 of the AI (E300), there is a table including a business (identification data of a business department, a company, or the like) to be a target of exchange of prototype data and the type of the prototype data (identification data such as the design drawing). In addition, a fee for each data may be included. The table is created by the administrator of the cyberspace E200, and the administrator creates the table by entering a contract (confidentiality, use fees, or the like) with a user who uses the table.

It is a matter of course that the virtual prototype data and the actual prototype data provided by the simulation area E400 may include skill data generated by a master being involved in product manufacturing. Furthermore, the AI (E300) may prepare first prototype data including the master skill data and second prototype data that is not included as the virtual prototype data or actual prototype data, and an experimenter may compare the performance or quality of the first and second virtual prototypes or the first and second actual prototypes.

In the simulation area E400, for example, in the inspection of the prototype described above, strength calculation, measurement of a gravity center position, and the like can be performed.

For example, it is also possible to manufacture a prototype of a turbine used in a power generation business as an image (image data) using digital data, and perform the strength calculation, the measurement of the gravity center position, and the like. In such a case, in the system, the master skill data is transmitted together with the data transmitted from the physical space. Then, with the skill of the master, adjustment control parameters such as a distribution ratio of a plurality of metal materials, a weight, fine shape correction, a pressurization force during processing, and a temperature are corrected, and it is possible to create a high-quality turbine.

The autonomous control section E500 includes, for example, an information acquisition section E501 that acquires specific information (condition: IF) necessary for the manufacturing process from the Cy-Ph FB loop, an information analytics section E502 that analyzes the specific information, and an autonomous operation control section E503 (execution: THEN) that autonomously performs operation control based on the analytics result acquired by the information analytics section.

As described below, the specific information may include five-sense information and/or emotion information of a human. Therefore, by analyzing a correlation between the five-sense information and finish data (accuracy, characteristics, or the like) of the apparatus, product, and part, it is possible to predict the quality of the finish of the apparatus, product, and part based on the five-sense information.

In addition, it is possible to seek cooperation with a plurality of feedback loops. For example, as the feedback loops of a plurality of business related to each other cooperate with each other, it is possible to obtain the efficiency of the productivity of the product, the optimization of the production amount, the efficiencies of personnel deployment, and the like. As an example thereof, there is a relation between an adjustment feedback loop of a delivery amount of a part delivery business and a feedback loop for adjusting an assembling speed of an assembly business of assembling an apparatus by using the part. Therefore, in a case where the delivery amount is small, adjustment of the assembling speed, adjustment of the number of persons who perform the assembly, or adjustment of the power consumption amount can be performed. In this case, adjustment for decreasing the power consumption amount can contribute to the environmental load reduction by setting the feedback loop for performing the adjustment to a loop that immediately responds. The effect of reducing the environmental load becomes more effective as the number of adjusted feedback loops (the number of businesses) increases.

The specific information may be generated by analyzing data acquired from a biological sensor attached to a human. Further, the specific information may include at least one of renewable energy production information, consumption information, or environmental load information.

That is, by referring to any one or more of the renewable energy production information, the consumption information, and the environmental load information introduced from the outside, for example, the following feedback control can be performed.

By referring to the renewable energy production information received from the outside, it is also possible to adjust an increase or decrease in power consumption of the equipment of the own factory. For example, when the external renewable energy production amount increases, there can be surplus capacity in the power consumption of the equipment of the own company, and production increase control can be performed. If the external renewable energy production amount decreases, the power consumption of the equipment of the own company can be adjusted, and production decrease control can be performed.

Further, by referring to the product consumption information from the outside, it is possible to autonomously control the increase or decrease in production of the same product. For example, in a case where a consumption amount of a product A increases, it is possible to autonomously perform the production increase control at a ratio according to the share of the own company for the product A, and in a case where the consumption amount of the product A decreases, it is possible to autonomously perform the production reduction control at a ratio according to the share of the own company for the product A.

Furthermore, by referring to information regarding a load on the environment (environmental load information), it is possible to check chemicals used by the own company, materials used, parts used, and compare emissions, and the like with the environmental load information. It is possible to take measures to reduce the environmental load based on the result. For example, if a part or material used in the factory causes an environmental load, an alternative part or alternative material can be used. In addition, in a case where a part or material that causes an environmental load is discarded, it is possible to perform feedback control in such a way that a message of a discard processing method or a description, a mark, or the like of a waste collection destination is put on the part or material. The waste collection destination is, for example, a contractor that deals exclusively with plastic products.

Furthermore, the system can also perform trade-off control between the environmental load information (for example, the carbon dioxide emission amount or predicted emission amount) and environment information (the temperature, humidity, atmospheric pressure, or the like) of the worker (or master) in the factory. For example, when the temperature and humidity are high, the worker in the factory performs adjustment to intensify the operation of an air conditioner or the like. However, when the power consumption amount of the air conditioner or the like increases, the generated energy increases accordingly, and thus, the carbon dioxide emission amount may also increase. Therefore, in the system, it is possible to perform setting in such a way as to check the five-sense information of the worker or master, maintain an environment in which the worker can feel comfortable, and perform feedback control capable of minimizing the power consumption amount.

The plurality of feedback loops described above may also relate to the digital twin (digital double) constructed with the personal information. In a case of the digital twin constructed with the personal information and the feedback loop of the digital twin, it is possible to perform special control for an individual factory or workplace or a personal small factory or workplace. For example, it is possible to create a unique product (for example, work of applying artistic carving/shaping to a manufactured product). That is, it is also possible to perform feedback control in which a trademark, a company name, or the like of a client can be engraved in a case where a custom-made special pattern or deformation is applied to a basic product instead of applying a uniform pattern or deformation. Also in this case, the data of the skill of the master is effectively used. The user (the master or artist) who uses this loop adds, for example, a processing step of engraving on a surface and a parameter (coloring) to some steps of an original (or basic) manufacturing program in the physical space (the individual factory or workplace, or the personal small factory or workplace). Then, a change in processing step is recognized by the AI in the cyberspace, feedback control is performed for a manufacturing machine (for example, a 3D printer) in the physical space, and engraving and coloring are performed on the surface of the product to be manufactured.

Furthermore, the plurality of feedback loops can provide not only feedback (control or information provision) to the factory but also feedback (information provision) to the designer of the apparatus, part, or material. For example, it is possible to feed back, as feedback information, the personal information regarding the use of the apparatus or product, such as ease of maintenance and repair of the apparatus and ease of part replacement, to the designer. In addition, there are opinions on design, usability, safety, and the like of construction members (for example, staircases, handrails, and the like). In this case, examples of a route for acquiring the personal information from the outside include information such as the Internet information and the SNS responding to commercials. Furthermore, the route further includes information from a service center or a store that handles the apparatus or part.

Furthermore, the cyberspace E200 includes external information acquisition sections E601 and E602. The external information acquisition section E601 acquires, for example, change data of domestic weather, overseas weather, economy, disaster, accident, satellite, law, policy, and the like. Furthermore, the external information acquisition section E601 may have a function of taking in information on the Internet and the SNS as information regarding relevant elements in the physical space. The external information acquisition section E602 acquires, for example, data such as a paper published by a research institution or an academic paper.

The change data of domestic weather, overseas weather, economy, disaster, accident, satellite, law, policy, and the like can be used as follows, for example. It is possible to construct the feedback loop that autonomously performs switching/adjustment of a program (software), change/adjustment of the control parameter, and the like for the manufacturing line affected by the change in data of these items. For example, in a factory that manufactures a precision part such as a semiconductor based on notification data such as an earthquake and a strong wind, the level of airtightness in the factory may be adjusted, the manufacturing may be temporarily stopped, and the level of product sorting (defective product) may be switched.

In addition, the data such as a paper published by a research institution or an academic paper can be used as follows, for example. By referring to the contents and keywords of these papers, it is possible to autonomously correct a control parameter of the existing feedback loop and a material to be used. For example, in a case where an adhesive of a certain manufacturer is improved, the feedback loop can be used to change a command to use an old type of adhesive to a command to use a new type of adhesive. It is a matter of course that, before this change, it is also possible to verify the suitability (the use environment, the adhesion strength, or the like) of the new type of adhesive for a portion where the adhesive is to be used, by means of the simulation area E400. In addition, medical information can also be referred to in a medical institution. For example, when a meeting of doctors is held in a hospital, the latest medical information may be automatically transmitted to, for example, a monitor in a meeting room through the feedback loop and presented.

<Master Data/Apparatus Data>

Figure 5A:
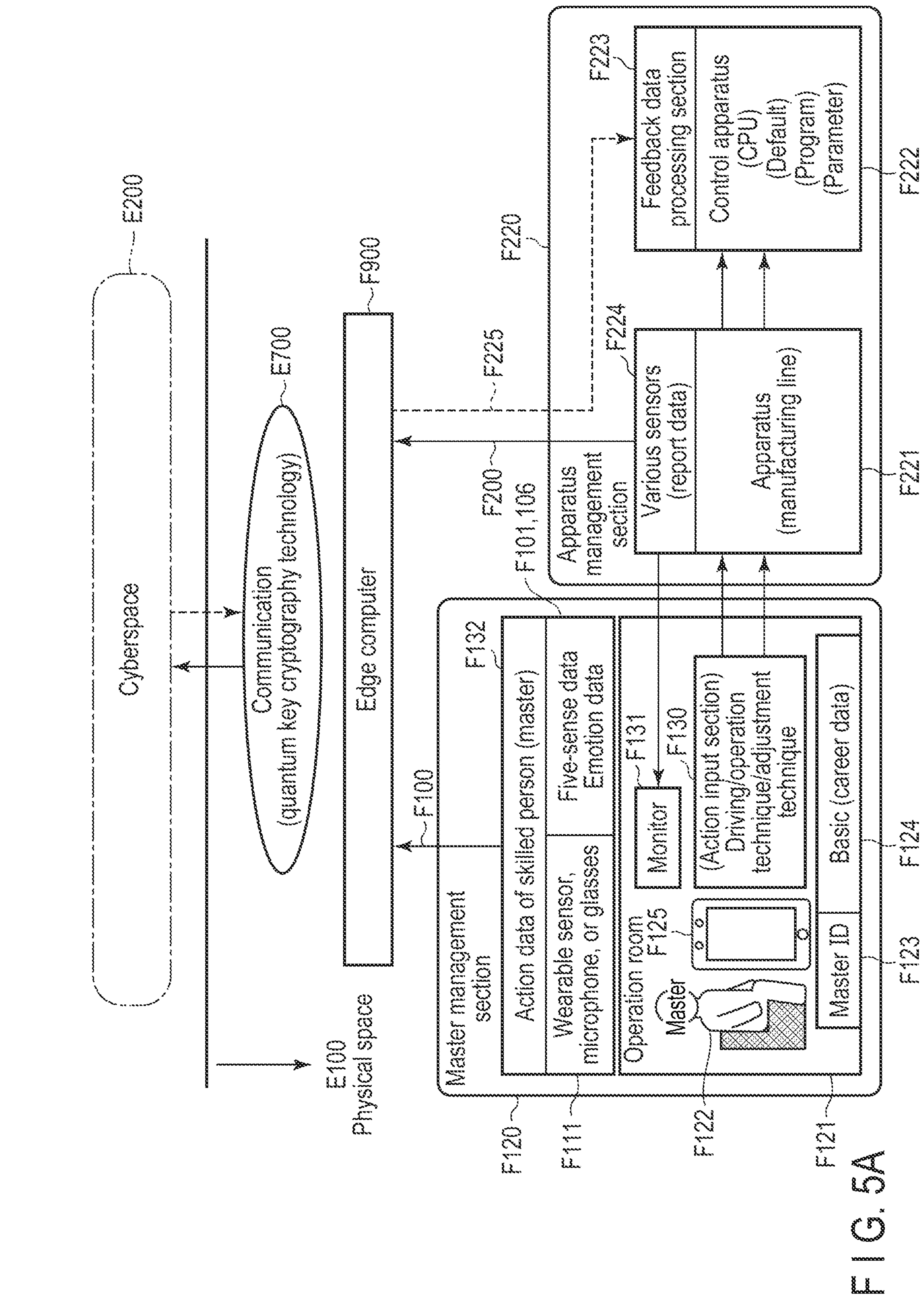
FIG. 5A is a diagram illustrating a type of master data F100 transmitted from the physical space E100 to the cyberspace E200 and a transmission system path thereof, and a transmission system path of apparatus data F200 acquired from various sensors F224 arranged in a manufacturing line F221.

FIG. 5A illustrates a type of master data F100 transmitted from the physical space E100 to the cyberspace E200 and a transmission system path thereof, and a transmission system path of apparatus data F200 acquired from various sensors F224 arranged in an apparatus (manufacturing line) F221. Hereinafter, it is assumed that the master data F100 is managed by a master management section F120 and the apparatus data F200 is managed by an apparatus management section F220. The master management section F120 and the apparatus management section F220 are a type of unit computer (or gateway) that cooperates with an edge computer F900. In each unit computer, data handled by the computer and a function controlled by the computer are visually represented.

The apparatus data F200 also includes operation data indicating an operation status of various instruments, devices, and the like in the manufacturing line, measurement/inspection data indicating a finish state of a manufactured object (the material/part/product, the apparatus, or the like), and the like.

The operation data indicating the operation status includes identification data of devices, apparatuses, parts, and the like, a movement position of an arm or the like, a movement speed, a rotation position, a rotation speed, and a rotation angle, a measurement temperature of a compressor and the like, a measurement pressure, power consumption, a remaining amount of fuel, imaging monitoring data, and the like. The operation data further includes amounts, weights, characteristic data, and the like of materials and the like used for manufacturing. The measurement/inspection data of the manufactured object includes measurement data such as a size, a thickness, a length, and a weight, test data obtained by testing movement of the manufactured object, image data of the manufactured object, and the like.

F225 indicates the feedback loop in which physical control is repeatedly performed from the cyberspace E200 with respect to the manufacturing line F221 of the physical space E100. Data of the feedback loop F225 is received by a feedback processing section F223 integrated with the manufacturing line F221 and is reflected in a control apparatus F222. The manufacturing line F221 normally exchanges data with the control apparatus F222 to perform product manufacturing control or system operation control. A local (or dedicated) feedback loop functions between the manufacturing line F221 and the control apparatus F222.

When initially set, the control apparatus F222 has a default program, control parameter, and the like in a memory, and the program is executed under the control of a central processing unit (CPU). However, a control content in the manufacturing process may be finely adjusted by adjusting, for example, a processing step of the program, changing or adjusting the control parameter to be used, and the like by the feedback loop F225. As a result, it is possible to improve the quality of the product, adjust the production amount of the product, temporarily stop the production, improve the production efficiency, and implement the change or the like.

A master (which may also be referred to as a worker) F122 can enter an operation room F121 in the factory and set self-information (master identification data F123 and basic data F124 (master career data, that is, data indicating the manufacturing line, apparatus, and the like operated by the master so far) by using, for example, a smartphone, a tablet personal computer (PC), or a personal computer F125 in a memory of an action input section F130. The master management section F120 may provide a reliability coefficient operated by the master F122 by referring to the self-information of the master. The reliability coefficient is updated to a reliability coefficient with high reliability by operating the equipment and accumulating operation performances. The operation performance is, for example, information obtained by accumulating correlation information between a plurality of workers (persons with less experience to persons with more experience) and evaluation values of the quality of products manufactured under the operation of each worker.

When the manufacturing line F221 starts operating, for example, image data indicating the operation state is acquired from a plurality of places in the manufacturing line F221 and displayed on a plurality of monitors F131. The master F122 operates an operator (a button, a lever, or a handle) or the like of the action input section F130 as necessary while watching the monitor F131 (or glasses having a display function). As a result, the skill of the master is reflected in the manufacturing process. For example, the temperature is adjusted up and down, the stop position of the conveyed part is adjusted, the amount of liquid (for example, a paint or a cleaning liquid) to be blown is adjusted, the amount of the material is adjusted, the conveying speed is adjusted, and the like. These pieces of action data F132 are transmitted to the cyberspace E200 as the master data F100. The above-described reliability coefficient may be included in the master data F100.

Furthermore, in accordance with the action data F132, the various sensors F224 detect various apparatus states and product states on the manufacturing line. The detection data is transmitted to the cyberspace E200 as the apparatus data F200. As the various sensors F224, various sensors that perform temperature measurement, pressure measurement, measurement of a position (a rotation position, a movement position, a vertical position, or the like) of an operation arm, vibration measurement, liquid amount detection, weight measurement, amount measurement, color detection, image detection, speed detection, acceleration detection, and the like are used.

Here, the master data F100 also includes five-sense data (which may also be referred to as five-sense information) F101 and emotion data (which may also be referred to as emotion information) F106. For example, a sensor output is used in a case where the five-sensor data F101 can be acquired by an odor sensor. However, in a case where the five-sensor data F101 cannot be acquired by the odor sensor, the master F presses various odor sensing buttons or inputs an uttered speech when the master F122 senses an odor, so that odor data is specified and collected based on the input data. For collection of the five-sense data F101 and the emotion data F106, a wearable sensor, a microphone, glasses including a sensor, or the like is used.

Figure 5B:
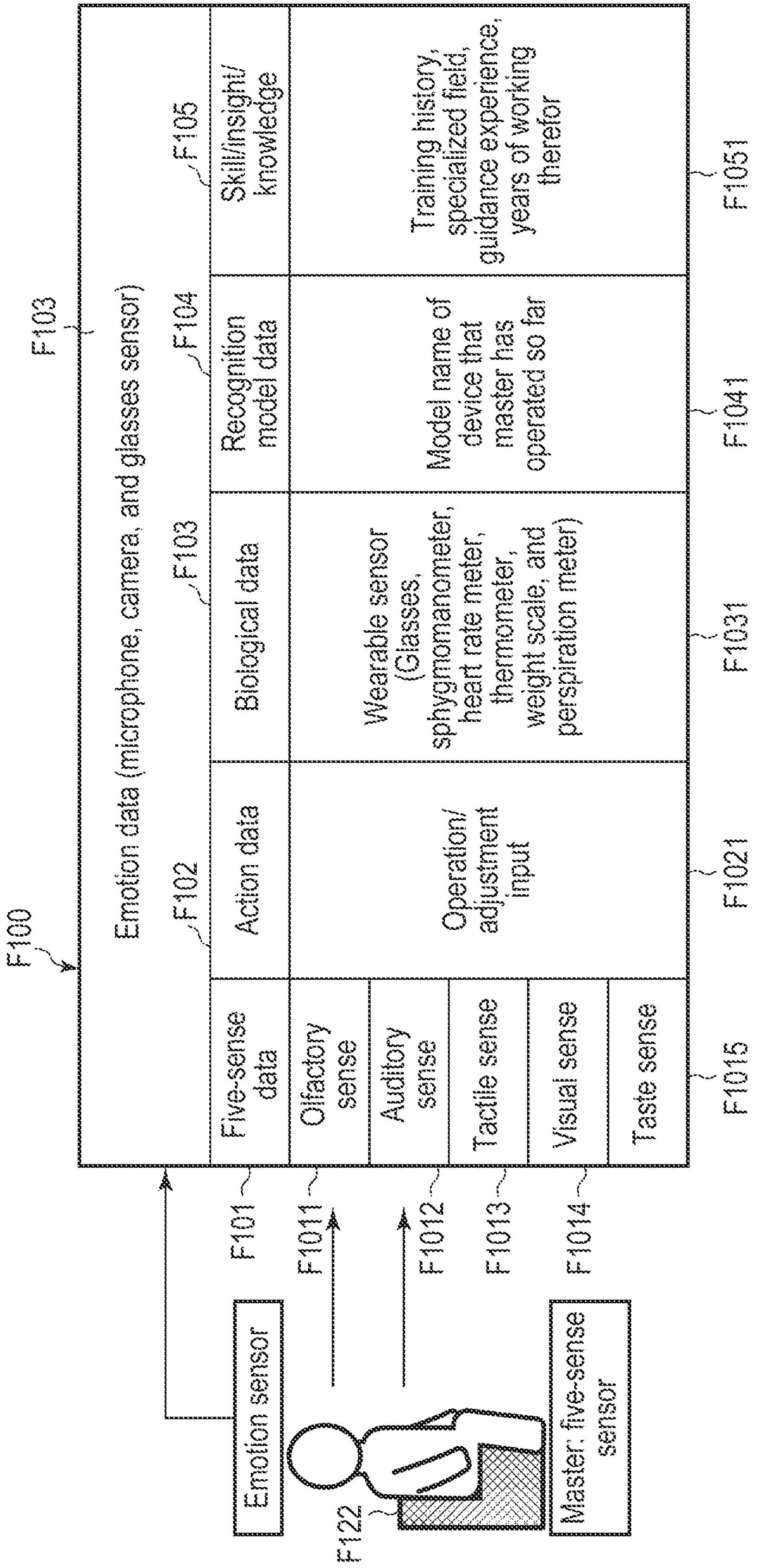
FIG. 5B is an explanatory diagram illustrating various types of master data F100 that can be acquired from a master E122 in a classified manner.

FIG. 5B illustrates various types of master data that can be acquired from the master E122 in a classified manner. The emotion data F106 is acquired from, for example, a microphone, a camera, a glasses sensor, or the like. The microphone transmits an utterance of the master E122 to an utterance analyzer. The utterance analyzer analyzes the utterance and analyzes the emotion of the master E122 according to the utterance content. The utterance analyzer interprets, as a negative utterance, "Oh, no.", "Oops, I failed.", and the like, and interprets, as a positive utterance, "Good, good.", "I like it.", "Go on, go on.", master's humming, and the like, for example. As a result, it is possible to distinguish whether the master E122 is in a negative mood or a positive mood.

The above-described emotion data has a correlation with the quality of the product manufactured in a time zone in which the emotion data is generated or the quality of characteristics of the product.

For example, a product corresponding to a time zone in which a negative utterance is made is often inferior in characteristics and performance to a product corresponding to a time zone in which a positive utterance is made. Therefore, acquiring and analyzing the emotion data is important for determining reliability of parts and products.

The five-sense data F101 include an olfactory sense, an auditory sense, a tactile sense, a visual sense, and a taste sense. For example, when the master feels these senses, the master operates buttons or levers corresponding to the senses, or performs a touch operation on displayed buttons (buttons corresponding to the senses) of the smartphone F125. Furthermore, the master can utter a speech through the microphone, and a speech recognition apparatus can interpret the speech and create the five-sense data. As a result, it is possible to acquire the five-sense data of the master E122.

For example, in operation of a water treatment apparatus, the master may feel a specific odor. There are *Bacillus* bacteria (hereinafter, referred to as *Bacillus*) as bacteria that suppress such odor. Since the *Bacillus* has an action of excreting an enzyme or an antibiotic having a lytic action and stopping the action of a sulfate reducing bacterium, excess sludge and odor can be suppressed.

Therefore, when the master sensitively senses the odor of a sludge tank of the water treatment apparatus, the master may put an activator for activating and proliferating the *Bacillus* into a water tank. At this time, the master operates, for example, a "presence-of-odor" operation button. In this case, button operation information and the input amount of the activator may be transmitted to the cyberspace as the master skill data (data of the input amount of the activator and the presence-of-odor operation button). In addition, data obtained by measuring the temperature of the sludge, the ambient temperature, the humidity, and the number of spores contained in the sludge at this time may be transmitted together to the cyberspace.

Furthermore, for example, in the manufacturing line for food (cookie, cake, or the like), it is often required to adjust the "olfactory sense", the "tactile sense", the "visual sense", the "taste sense", and the like by adjusting the temperature, the material, and the amount of moisture. Data obtained by such adjustment is transmitted to the cyberspace as the master data.

In addition, in a case where the status of an operating machine is grasped, it may be required to grasp the condition of the operating machine by the "auditory sense".

In addition, the master E122 may bring an ultrasonic generator or a vibration generator into contact with the operating machine, collect reflected sound with a microphone, and analyze the reflected sound with an analyzer. The analyzer can detect looseness of a screw, a crack or scratch of a body or steel frame, and the like according to characteristics of the reflected sound. When a crack, a scratch, or the like is detected, an image captured by a super-resolution camera may also be adopted. Therefore, there may be an operation apparatus such as an ultrasonic generator or a vibration generator in a room where the master E122 is. Although the relationship between the master E122 and the factory has been described, this technology can also be applied when inspecting and monitoring a state of an infrastructure structure.

Furthermore, the master data F100 also includes action data F102 representing an action of the master. The action data F102 is, for example, input data F1021 when the master 122 directly operates the operating machine. For example, in a case where a switch is turned on or off, a set of identification data of a corresponding operating machine, state data of the switch, a time when the operation is performed, and the like is handled as one unit of action data. In addition, in a case where the temperature or speed is adjusted, a set of identification data of a corresponding operating machine, set value data of the temperature or speed, a time when the operation is performed, and the like is handled as one unit of action data.

Furthermore, the master data F100 also includes biological data F103 indicating a biological state of the master. The biological data F103 is acquired from, for example, a wearable sensor F1031. Examples of the wearable sensor F1031 include a glasses-type sensor, a wristwatch-type sensor (including a sphygmomanometer, a heart rate meter, a thermometer, a microphone, or the like), a weight scale, a perspiration meter, and the like. The physical condition of the master can be known from the biological data F103 from the biological sensor, and a mission time and the like can be changed and set.

Furthermore, the master data F100 also includes recognition model data F104 and skill/insight/knowledge data F105. As described above, these pieces of data are self-data of the master. Examples of the self-data include the master identification data F123, the master career data, that is, data indicating a model name of the manufacturing line, the apparatus, or the like operated by the master so far, a training history, a specialized field, guidance experience, years of working therefor, and the like. As a result, grade data (corresponding to the reliability coefficient) may be added for the master. There may be a difference in product quality depending on the grade of the master. In particular, this is because a product manufactured when the master is in a negative emotion often has a significant difference in quality according to a difference in grade of the master. For example, a low-grade master produces a large number of products with poor quality when being in a negative emotion, and a high-grade master produces a small number of products with poor quality even when being in a negative emotion.

In addition, the skill/insight/knowledge data F105 may be adopted in a case of switching a program or in a case of switching a table of parameters used in the program according to experience of the master or the like. In particular, when there are a plurality of versions of the program, there may be compatibility between a device (for example, a robot) to be controlled and the program. In such a case, the master can switch the program and/or the table of the used parameters based on the accumulated experiences and achievements. In addition, in a case where the apparatus is changed, it may be necessary to switch the program even in a case where a surrounding environment of the apparatus changes. Furthermore, the program and the parameters may be switched for power saving in order to reduce the environmental load. Then, determination of such switching may be made according to the five senses of the master (skilled person).

<Utilization of Various Data in Physical Space>

Figure 6:
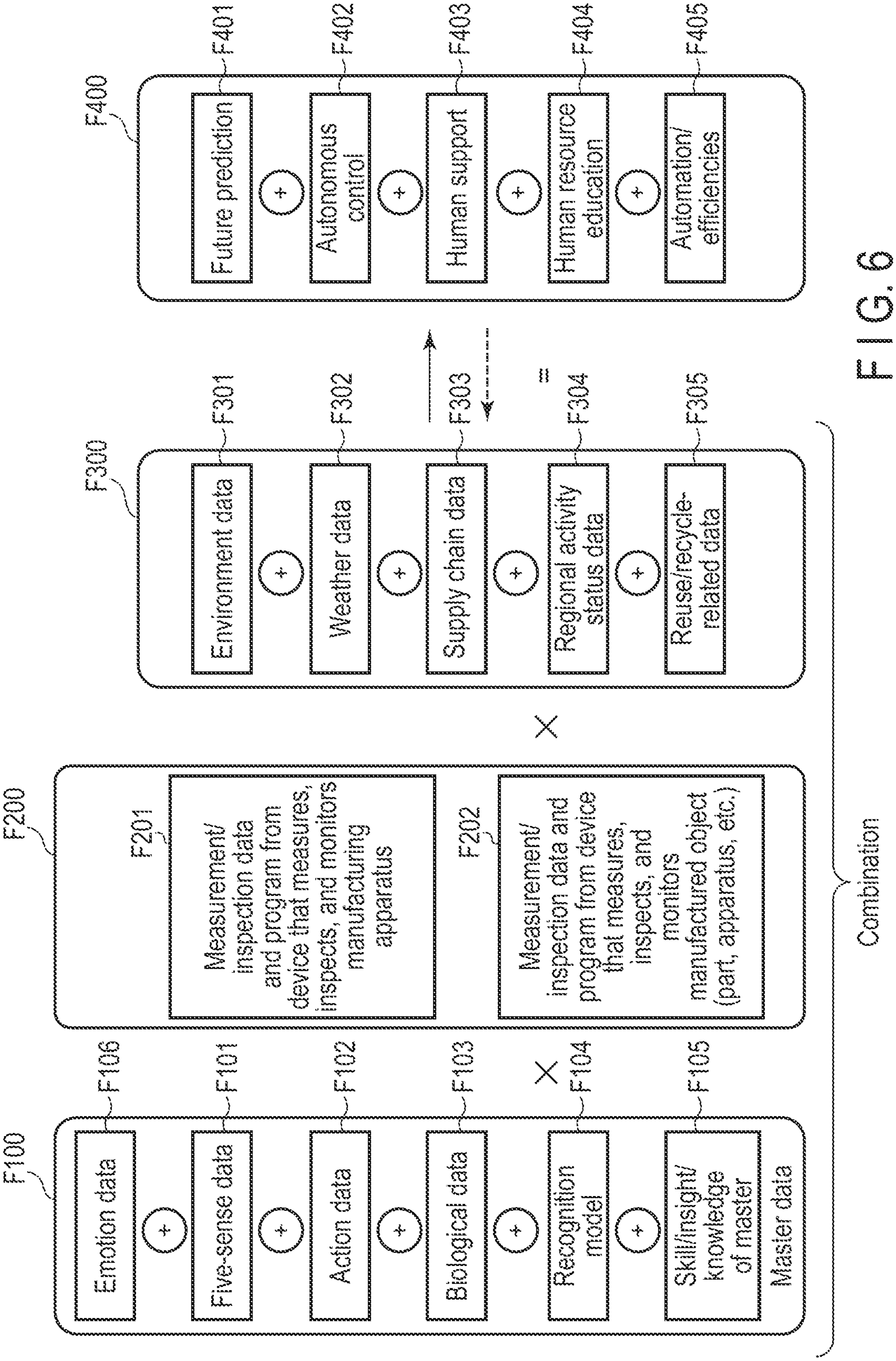
FIG. 6 is a data utilization block diagram illustrating various methods for utilization/analytics of data taken in from the physical space E100 to the cyberspace E200 and an effect obtained by the utilization/analytics.

FIG. 6 is a data utilization block diagram illustrating various methods for utilization of data taken in from the physical space E100 to the cyberspace E200 and an effect obtained by the utilization.

As described above, the master data F100 and the apparatus data F200 are transmitted to the cyberspace E200. Furthermore, acquired data F300 other than the master data F100 and the apparatus data F200 also exists in the cyberspace E200. It is a matter of course that, as described above, there is also acquired data acquired by the variation information acquisition section E601 and the research information acquisition section E602. Therefore, for example, the variation information acquisition section E601 may acquire the acquired data F300.

For example, the acquired data F300 is classified into types including, for example, environment data F301, weather data F302, supply chain data F303, data F304 indicating regional activity, and reuse/recycle-related data F305.

The environment data F301 is, for example, data regarding an environment (the temperature, the humidity, a dust density, the number of workers, the role of each worker, or the like) in the factory where the manufacturing line is present. The weather data F302 is, for example, a weather change in a region where the factory is present, a weather change (including earthquake information) of a related factory (for example, another factory of the same company or another factory manufacturing the same product or related products), and the like. Furthermore, the supply chain data F303 is status data indicating the amount of material, procurement, delivery, sales, consumption, or the like of a part, stock, a state of being shipped, a state of moving, or the like. The data F304 indicating the regional activity is data such as an increase or decrease in population in the region, distribution of age groups, momentum of commerce (the sale or tax payment status of a ship), or an activity budget input from a government office to the region.

The reuse/recycle-related data F305 is, for example, information obtained from a sensor of a dismantling business in the physical space E100. The dismantling business classifies various apparatuses for each part or product (composite part), and each part or product may be provided with an engraved mark or a mark such as "reusable" or "recyclable", together with identification data thereof. These pieces of information are read by a laser or an image recognition sensor and transmitted to the cyberspace E200 as the reuse/recycle-related data F305.

The above-described master data F100, apparatus data F200, and acquired data F300 exist in the AI (E300), and analytics data F400 can be obtained by combining and analyzing a part of these pieces of data.

The analytics data F400 can be reflected in the analysis/prediction data and the optimization/plan data. For example, the analytics data F400 can be utilized as data F401 for future prediction, data F402 for autonomous control, data F403 for human support, data F404 for human resource education, and data F405 for automation/efficiencies. The utilization processing is executed by the AI (E300), and the AI (E300) constantly monitors the master data F100, the apparatus data F200, the acquired data F300, and the like, and can autonomously perform data utilization and control when a predetermined condition is satisfied.

The following utilization as the data F401 for future prediction is considered.

For example, it is assumed that the action data F102 of the master changes according to the weather data, and the characteristics and quality of the manufactured object are affected by the change. Then, by monitoring a correlation between the weather data F302 and the action data F102 of the master, it is possible to predict the characteristics and quality of the manufactured object. According to the prediction, the autonomous control section can perform feedback control for quality ranking processing for the manufactured object in the manufacturing line or sorting work for the manufactured object in the manufacturing line.

The following utilization as the autonomous control data F402 is considered.

For example, it is assumed that there is a large change in data of a supply chain. Then, there may be factories experiencing delays or excess of the supply of parts and materials carried in by the supply chain. Therefore, the autonomous control data F402 can give a production reduction or increase command for the manufacturing line to a factory experiencing the delays or excess of the supply of parts and materials. It is a matter of course that the autonomous control data F402 also includes data indicating the correlation between the weather data F302 and the action data F102 of the master described above.

The following utilization as the data F403 for human support is considered.

For example, it is possible to instruct allocation of substitute personnel for the factory by referring to the regional activity status data F304. Furthermore, it is also possible to instruct or propose allocation of substitute personnel for the factory in an appropriate region (a commuter-friendly region) by referring to the number of personnel and personnel deployment data included in the environment data F301 described above.

The following utilization as the data F404 for human resource education is considered.

For example, in the system, the master data is accumulated in the data accumulation section E310 in the cyberspace. The AI (E300) can determine the identification information of the master data, the specialized field of the master, and the like. Furthermore, in the system, in a case where a new factory is newly established, for example, a designer of the factory can input a design drawing from the commercial business E29 to the cyberspace. As a result, the AI (E300) can also predict a factory requiring a master, the number of persons required, and the like.

Furthermore, the AI (E300) can also determine the aging (retirement age) or the like of the master from the number of experiences and the age in the master data accumulated in the data accumulation section E310. From such a determination and the above-described prediction, the AI (E300) can predict the number of skilled masters to be required in the future, and notify, for example, each factory, company, or educational industry of a request for human resource education by the master.

The following utilization as the data F405 for automation/efficiencies is considered.

The AI (E300) can compare and monitor manufacturing processes of a plurality of similar types of factories, compare and monitor similar processing processes, and compare and monitor production amounts. For this reason, the AI (E300) can determine the following. For example, in the second factory, there is a processing process in which assembling of a product is manually performed, and a large number of persons are required, and the production efficiency is poor.

However, in the first factory, assembling of a product is performed by a robot, a small number of persons is required, and the production efficiency is good. In such a case, if the robot is introduced into the product assembly process in the second factory, the robot control program can be autonomously provided to the second factory via the feedback loop. In addition, it is also possible to register surplus personnel in the data F403 for human support. Further, in a case of the future prediction data F401, as the product production efficiency of the second factory increases, future prediction data can be provided to a product transporting business (distribution).

As described above, the AI (E300) can utilize data of various types of businesses in the cyberspace to create a highly productive and efficient manufacturing process environment.

Figure 7A:
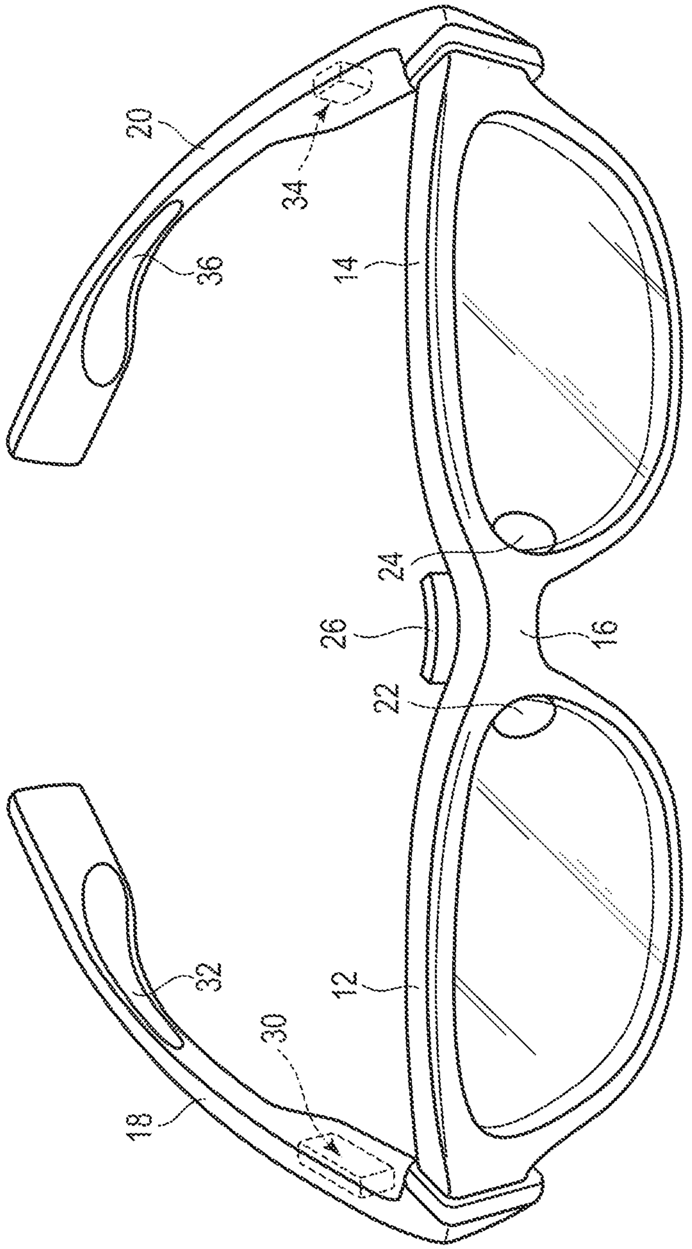
FIG. 7A is a view of an example of a glasses-type eyeball rotation detection apparatus according to an embodiment as viewed from the front.
Figure 7B:
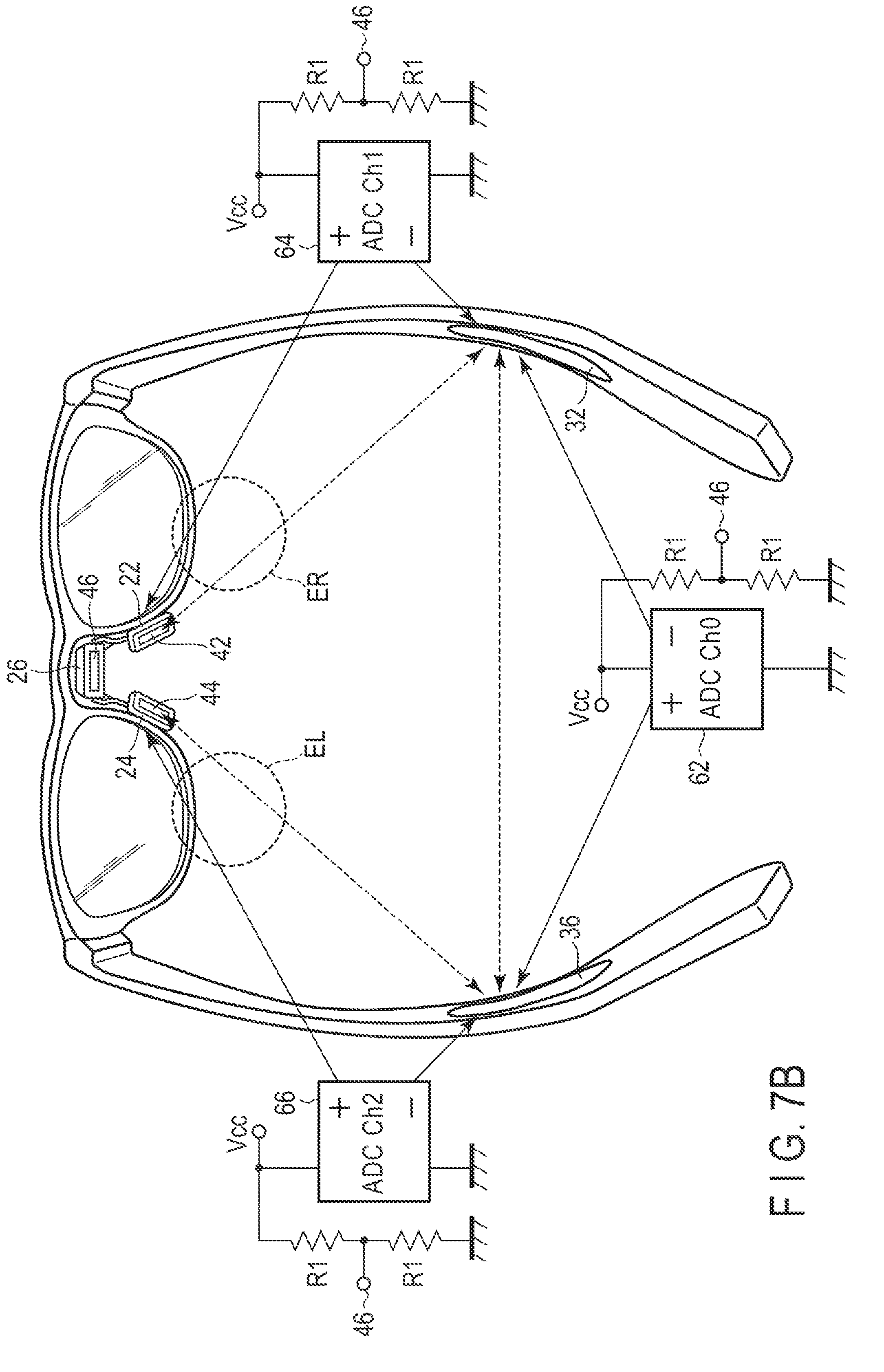
FIG. 7B is a view of the example of the glasses-type eyeball rotation detection apparatus as viewed from a rear upper side.
Figure 7C:
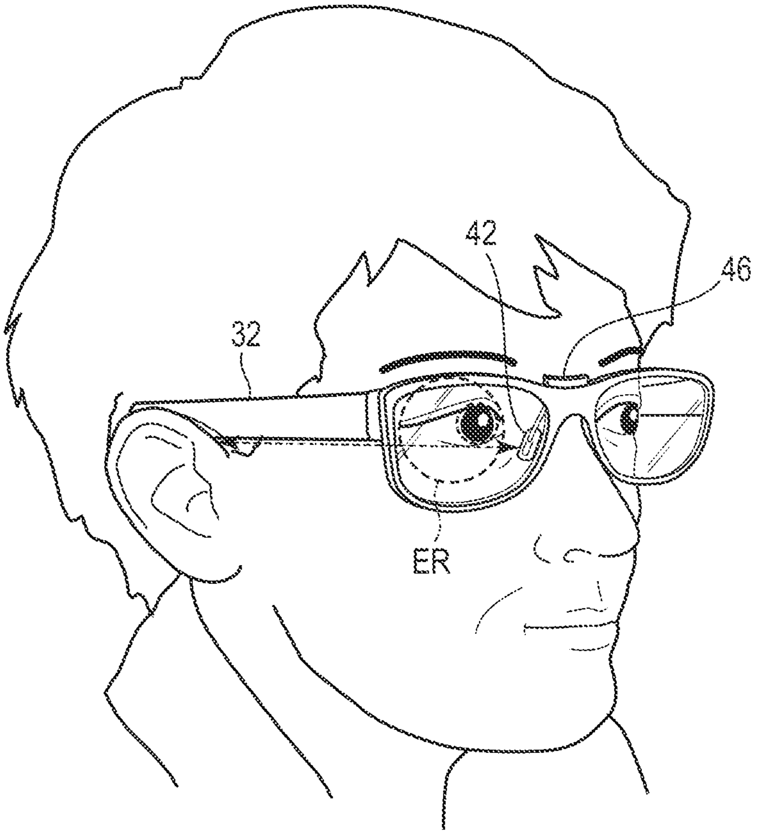
FIG. 7C is a view of a user wearing the example of the glasses-type eyeball rotation detection apparatus as viewed from a front right side.

FIGS. 7A, 7B, and 7C illustrate examples of the wearable sensor that obtains the specific information of the master, and here illustrate an example of glasses.

Basic information of an eyeball will be described. A diameter of an adult human eyeball is about 25 mm. A diameter of a human eyeball at birth is about 17 mm, and increases as the person grows. An interpupillary distance of an adult male is about mm. Therefore, many commercially available stereo cameras are formed with an interval of 65 mm. An interpupillary distance of an adult female is several mm shorter than that of a male. The eye potential is tens of mV. The eyeball has a positive potential on a corneal side and has a negative potential on a retinal side. This appears as a potential difference of several hundred μV (referred to as eye potential) when measured on the surface of the skin.

A rotation range of the eyeball (in a case of a general adult) is 50° or less to the left and 50° or less to the right in a left-right direction (also referred to as a horizontal direction), and is 50° or less to the bottom and 30° or less to the top in a top-bottom direction (also referred to as a vertical direction). An angle range in the top-bottom direction in which movement can be made by one's own will is narrow in the top direction. This is because there is a "bell's phenomenon" in which the eyeball rotates upward when the eye is closed, and thus the eyeball movement range in the top-bottom direction shifts upward when the eye is closed. A convergence angle (an angle at which line-of-sight directions of the right and left eyeballs intersect) is 20° or less.

An example of a configuration of an eyeball rotation detection apparatus will be described with reference to FIGS. 7A, 7B, and 7C. Although there are various forms of the eyeball rotation detection apparatus, an eyeball rotation detection apparatus in the form of eyewear will be described here. Examples of the eyewear include goggles and glasses (sunglasses are equivalent to glasses). Here, a glasses-type eyeball rotation detection apparatus will be described. FIG. 7A is a view of an example of the glasses-type eyeball rotation detection apparatus as viewed from the front, and FIG. 7B is a view of the example of the glasses-type eyeball rotation detection apparatus as viewed from a rear upper side. FIG. 7C is a view of a user wearing the example of the glasses-type eyeball rotation detection apparatus as viewed from a front right side.

An eyeball rotation type includes vertical rotation and horizontal rotation. The vertical rotation includes blinking, closing, winking, and the like. The horizontal rotation is roughly classified into slow eye movement in which the left and right eyeballs unconsciously rotate in the same direction, line-of-sight movement in which the left and right eyeballs consciously rotate in the same direction, and movement (convergence and divergence) in which the left and right eyeballs rotate in opposite directions. The convergence is that the line-of-sight directions of the right and left eyeballs intersect, and the divergence is that the line-of-sight directions of the right and left eyeballs diverge. The eye rotation is detected based on a change in eye potential. The eye potential can be detected by a difference between voltages from a pair of electrodes sandwiching the eyeball. A direction in which the eyeball is sandwiched may be any of the left-right direction, the top-bottom direction, and a front-rear direction, or may be an oblique direction. It is possible to detect blinking, closing, winking, and the like from the eye potential detected by the electrode pair arranged in such a way as to sandwich the eyeball in the top-bottom direction. It is possible to detect blinking, closing, winking, the slow movement, and the line-of-sight movement from the eye potential detected by the electrode pair arranged in such a way as to sandwich the eyeball from the top-bottom direction and the left-right direction. It is possible to detect the slow movement, the line-of-sight movement, and the convergence/divergence from the eye potential detected by the electrode pair arranged in such a way as to sandwich the eyeball in the front-rear direction and the left-right direction.

The glasses include a right frame 12, a left frame 14, and a bridge 16 connecting the frames 12 and 14. In a case where the user does not usually wear glasses, usual glass may be fitted into the right frame 12 and the left frame 14. In a case of configuring a product that detects the line-of-sight movement or the convergence angle change from the eye potential and applying the detection result, for example, a glasses-type wearable apparatus capable of performing AR display, instead of an apparatus only for detecting the eye potential, a liquid crystal panel or an organic EL panel for AR display may be fitted into at least a part of the right frame 12 and the left frame 14.

In the embodiment, in order to detect the convergence and the divergence, the electrodes are arranged in such a way as to sandwich the eyeball from front and rear positions that are in the same phase (same vector) with respect to the respective right and left eyeballs and from right and left positions that are in opposite phase (opposite vector) with respect to the respective right and left eyeballs, in the same plane.

In order to detect the eye potential of a right eyeball ER, a right temple electrode 32 is provided on the right side of the right eyeball ER, and a right nose pad electrode 42 is provided on a surface of a right nose pad 22 on the left side of the right eyeball ER, the surface coming into contact with the nose, as illustrated in FIG. 7B. In a plan view (FIG. 7B is regarded as a plan view), the right temple electrode 32 and the right nose pad electrode 42 are arranged in such a way that a line connecting the right temple electrode 32 and the right nose pad electrode 42 passes through the right eyeball ER.

In a front view (FIG. 7A is regarded as a front view), the right temple electrode 32 is provided on the left side of the right eyeball ER, and the right nose pad electrode 42 is provided on the right side of the right eyeball ER. The right temple electrode 32 and the right nose pad electrode 42 are arranged in such a way that the line connecting the right temple electrode 32 and the right nose pad electrode 42 passes through the right eyeball ER. In the front view, the right nose pad electrode 42 is provided slightly above the right temple electrode 32.

In a side view, the right temple electrode 32 is provided on the rear side of the right eyeball ER, that is, on the left side of the right eyeball ER in a right side view, and on the right side of the right eyeball ER in a left side view. The right nose pad electrode 42 is provided on the front side of the right eyeball ER, that is, on the right side of the right eyeball ER in the right side view, and on the left side of the right eyeball ER in the left side view. The right temple electrode 32 and the right nose pad electrode 42 are arranged in such a way that the line connecting the right temple electrode 32 and the right nose pad electrode 42 passes through the right eyeball ER.

FIG. 7C illustrates a state in which the line connecting the right temple electrode 32 and the right nose pad electrode 42 passes through the right eyeball ER in a front view, a plan view, and a side view of the head. The line connecting the two electrodes is not limited to the center of the right eyeball ER, and may pass through any portion of the eyeball. Although hidden by the face in FIG. 7C, the same applies to the left eyeball.

The right temple electrode 32 and the right nose pad electrode 42 that detect the eye potential of the right eyeball ER are arranged in such a way that the line connecting the right temple electrode 32 and the right nose pad electrode 42 passes through the right eyeball ER in any of the plan view, the front view, and the side view, and may also be arranged in such a way that the line connecting the right temple electrode 32 and the right nose pad electrode 42 passes through the right eyeball ER in at least one of the plan view, the front view, or the side view.

Similarly, in order to detect the eye potential of a left eyeball EL, a left nose pad electrode 44 is provided on the right side of the left eyeball EL in the plan view, for example, on a surface of the left nose pad 24 attached near a connection point between the left frame 14 and the bridge 16, the surface coming into contact with the nose, and a left temple electrode 36 is provided on the left side of the left eyeball EL, for example, at a portion of a left temple 20 resting on the ear. The left nose pad electrode 44 and the left temple electrode 36 are arranged in such a way that a line connecting the left nose pad electrode 44 and the left temple electrode 36 passes through the left eyeball EL.

The right temple electrode 32 and the left temple electrode 36 are line-symmetric with respect to a straight line (for example, a straight line extending from the center of the nose to the back of the head) orthogonal to the midpoint of a straight line connecting the right frame 12 and the left frame 14.

In the front view, the left nose pad electrode 44 is provided on the left side of the left eyeball EL, and the left temple electrode 36 is provided on the right side of the left eyeball EL. The left nose pad electrode 44 and the left temple electrode 36 are arranged in such a way that a line connecting the left nose pad electrode 44 and the left temple electrode 36 passes through the left eyeball EL. In the front view, the left nose pad electrode 44 is provided slightly above a second left electrode 42.

In the side view, the left nose pad electrode 44 is provided on the front side of the left eyeball EL, that is, on the right side of the left eyeball EL in the right side view, and on the left side of the left eyeball EL in the left side view, and the left temple electrode 36 is provided on the rear side of the left eyeball EL, that is, on the left side of the left eyeball EL in the right side view, and on the right side of the left eyeball EL in the left side view. The left nose pad electrode 44 and the left temple electrode 36 are arranged in such a way that a line connecting the left nose pad electrode 44 and the left temple electrode 36 passes through the left eyeball EL.

The right temple electrode 32 is provided over a side surface (in contact with the temporal region) and a lower surface (in contact with the base of the ear) of the right temple 18, and when the glasses are worn on the face, the right temple electrode 32 comes into contact with a region where terminal hair at the base of the ear is not grown due to the weight of the temple 18. The left temple electrode 36 is provided over a side surface (in contact with the temporal region) and a lower surface (in contact with the base of the ear) of the left temple 20, and when the glasses are worn on the face, the left temple electrode 36 comes into contact with a region where terminal hair at the base of the ear is not grown due to the weight of the temple 20. As a result, the right temple electrode 32 and the left temple electrode 36 are in close contact with the skin of the user, and the eye potential can be accurately sensed.

The left nose pad electrode 44 and the left temple electrode 36 that detect the eye potential of the left eye EL may also be arranged in such a way that the line connecting the left nose pad electrode 44 and the left temple electrode 36 passes through the left eye EL in at least one of the plan view, the front view, or the side view.

A forehead pad 26 that comes into contact with the forehead is provided on an inner side of the bridge 16, and a neutral electrode 46 is provided on a surface of the forehead pad 26 that comes into contact with the forehead. The neutral electrode 46 is an electrode for securing a neutral potential for eye potential detection, and comes into contact with the skin, for example, the forehead. The neutral electrode 46 is arranged in such a way that a distance between the neutral electrode 46 and the right temple electrode 32 is equal to a distance between the neutral electrode 46 and the left temple electrode 36, and a distance between the neutral electrode 46 and the right nose pad electrode 42 is equal to a distance between the neutral electrode 46 and the left nose pad electrode 44. The reason why the neutral electrode 46 is arranged at such a position is to perform convergence angle detection to be described later. This is because the convergence angle is detected based on a result of detecting horizontally symmetrical eyeball rotation when viewed from the front with respect to the respective right and left eyeballs. For example, in an electrocardiograph, a neutral potential is taken at a body part where an influence of the eyeball rotation can be ignored, for example, at the end of the right foot. By taking the neutral potential at a place at which the neutral electrode is somewhat affected by the eyeball rotation and which is equally affected by the right and left eyeballs, that is, at the center of the forehead, it is possible to equalize the influence of the eye potential that the neutral electrode receives from the respective right and left eyeballs.

The right temple electrode 32, the right nose pad electrode 42, the left nose pad electrode 44, the left temple electrode 36, and the neutral electrode 46 include a metal foil such as copper, a small metal piece, a metal ball such as stainless steel, a conductive silicon rubber sheet, or the like. Since these electrodes 32, 42, 44, and 36 are electrodes for detecting the eye potential as described later, they are also referred to as electrooculography (EOG) electrodes.

<EOG Signal>

As illustrated in FIG. 7B, a processing section 30 for detecting the eye potential is embedded in or externally attached to one temple, for example, at a portion of the right temple 18 close to the frame 12. A battery 34 for the processing section 30 is embedded in or externally attached to the other temple, for example, at a portion of the left temple 20 close to the frame 12. The processing section 30 may perform not only eye potential detection but also display control in the glasses-type wearable apparatus capable of performing AR display. The processing section 30 does not have to be embedded in the glasses and may be provided outside the glasses, and the glasses and the processing section 30 may be connected wirelessly or by wire. In this case, the battery 34 can be embedded in the processing section 30 and provided outside the glasses. In addition, functions of the processing section 30 may be divided into two, and only a first processing section that senses a signal from an electrode may be provided in the glasses, and a second processing section that detects the eye potential from a sensed signal and performs control according to the detection result may be provided outside the glasses. A mobile terminal such as a smartphone can be used as the second processing section. The second processing section is not limited to a mobile terminal or the like directly connected to the glasses, and includes a server or the like connected via a network.

A signal from the right temple electrode 32 is input to a negative (−) terminal of a first analog/digital (A/D) converter 62, a signal from the second temple electrode 36 is input to a positive (+) terminal of the first A/D converter 62, and a first EOG signal ADC Ch0 as a differential signal is output. Since the right temple electrode 32 and the left temple electrode 36 sandwich the eyeball in the left-right direction, the first EOG signal ADC Ch0 indicates the horizontal rotation of the left and right eyeballs.

A signal from the right temple electrode 32 is input to a negative (−) terminal of a second A/D converter 64, a signal from the right nose pad electrode 42 is input to a positive (+) terminal of the second A/D converter 64, and a second EOG signal ADC Ch1 as a differential signal is output. Since the right temple electrode 32 and the right nose pad electrode 42 sandwich the right eyeball in the top-bottom direction and the left-right direction, the second EOG signal ADC Ch1 indicates the horizontal rotation and the vertical rotation of the right eyeball.

A signal from the left nose pad electrode 44 is input to a positive (+) terminal of a third A/D converter 66, a signal from the left temple electrode 36 is input to a negative (−) terminal of the third A/D converter 66, and a third EOG signal ADC Ch2 as a differential signal is output. Since the left nose pad electrode 44 and the left temple electrode 36 sandwich the left eyeball in the top-bottom direction and the left-right direction, the third EOG signal ADC Ch2 indicates the horizontal rotation and the vertical rotation of the left eyeball.

Since the left and right positions of the two electrodes related to the second EOG signal ADC Ch1 and the left and right positions of the two electrodes related to the third EOG signal ADC Ch2 are opposite (the positive and negative sides (+/−) of the input of the A/D converter are inverted), it is possible to detect from waveforms of the second EOG signal ADC Ch1 and the third EOG signal ADC Ch2 whether the left and right eyeballs horizontally rotate in the same direction or in opposite directions.

Since voltage signals from the right temple electrode 32, the right nose pad electrode 42, the left nose pad electrode 44, and the left temple electrode 36 are weak, the influence of noise is large. In order to cancel the noise, a series circuit of resistors R1 and R2 is connected between a reference analog voltage Vcc (=3.3 V or 5.5 V) of the A/D converters 62, 64, and 66 and the ground (GND), and the neutral electrode 46 is connected to a connection point of the resistors R1 and R2. The resistors R1 and R2 have equal values, for example, 1 MΩ. The A/D converters 62, 64, and 66 can detect an analog voltage from 0 V (ground) to the reference analog voltage Vcc, and convert an input analog voltage into a digital value in a range of 0 V to 3.3 V based on the midpoint of a detectable range, for example, a voltage of ½ of 3.3 V (referred to as a midpoint voltage). Since the connection point of the resistors R1 and R2 is connected to a midpoint voltage end and the neutral electrode 46 is connected to the connection point of the resistors R1 and R2, the midpoint voltage of the A/D converters 62, 64, and 66 is the same as a human body voltage. As a result, the midpoint voltage of the A/D converters 62, 64, and 66 fluctuates in conjunction with the human body voltage, and the noise mixed in the voltage signals from the EOG electrodes 32, 42, 44, and 36 is not mixed in the digital values that are the outputs of the A/D converters 62, 64, and 66. As a result, a signal-to-noise (S/N) ratio of the detection of the eye potential can be improved.

Figure 8:
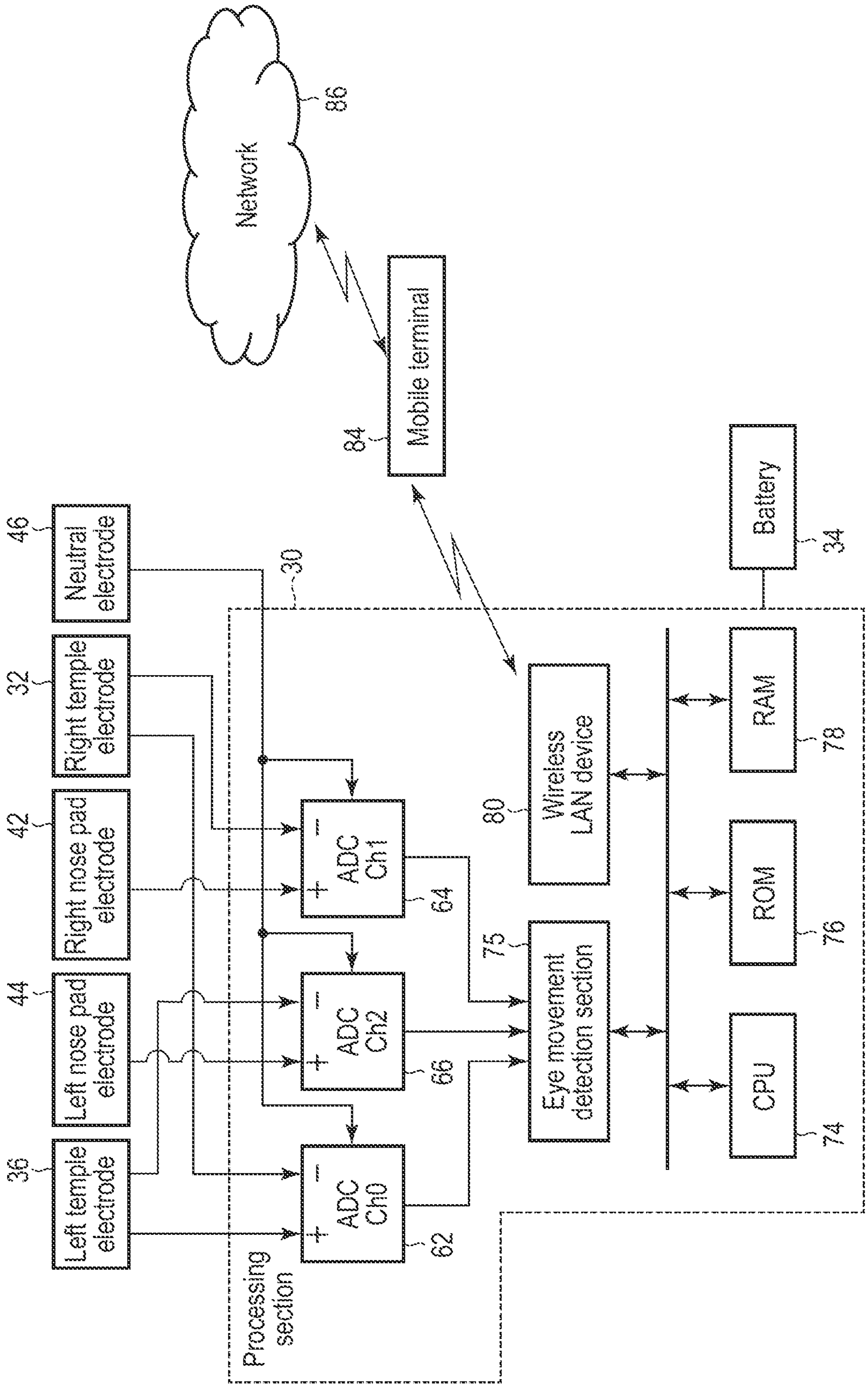
FIG. 8 is a block diagram illustrating an example of an electrical configuration of the eyeball rotation detection apparatus.

FIG. 8 is a block diagram illustrating an example of an electrical configuration of the eyeball rotation detection apparatus. The processing section may include the A/D converters 62, 64, and 66, and the A/D converters 62, 64, and 66 may be externally attached to the processing section 30.

The signal from the right temple electrode 32 is input to the negative (−) terminal of the first A/D converter 62, the signal from the left temple electrode 36 is input to the positive (+) terminal of the first A/D converter 62, and the first channel EOG signal ADC Ch0 is obtained. The signal from the right temple electrode 32 is input to the negative (−) terminal of the second A/D converter 64, the signal from the right nose pad electrode 42 is input to the positive (+) terminal of the second A/D converter 64, and the second channel EOG signal ADC Ch1 is obtained. The signal from the left nose pad electrode 44 is input to the positive (+) terminal of the third A/D converter 66, the signal from the left temple electrode 36 is input to the negative (−) terminal of the third A/D converter 66, and the third channel EOG signal ADC Ch2 is obtained.

A signal from the neutral electrode 46 is supplied to the midpoint voltage ends of the A/D converters 62, 64, and 66, and the midpoint voltage of the A/D converters 62, 64, and 66 is regarded as the human body voltage detected by the neutral electrode 46.

The EOG signals output from the A/D converters 62, 64, and 66 are input to an eye movement detection section 75 that detects the eye rotation (hereinafter, also referred to as eye movement). The eye movement detection section 75 may be implemented by hardware or software. In the latter case, a CPU 74, a read only memory (ROM) 76, and a random access memory (RAM) 78 are connected to a bus line, and the eye movement detection section 75 is also connected to the bus line. The eye movement detection section 75 is implemented by the CPU 74 executing a program stored in the ROM 76. A wireless LAN device 80 is also connected to the bus line, and the processing section 30 is connected to a mobile terminal 84 such as a smartphone via the wireless LAN device 80. The mobile terminal 84 may be connected to a server 88 via a network 86 such as the Internet. The eye movement detection section 75 can detect the eye potential based on the EOG signals output from the A/D converters 62 and 64, and can detect the horizontal rotation (the convergence and the divergence) of the left and right eyeballs, and the horizontal rotation (the line-of-sight movement) and the vertical rotation (blinking and closing) of the eyeballs from the detected eye potential. Furthermore, the eye movement detection section 75 can estimate various states (for example, a restlessness state due to lack of concentration, a concentrated state, a mentally stressed state due to tension, or a state of having difficulty in concentrating on tasks or work due to fatigue) of the user from the detected eye movement. Which type of eyeball rotation is detected and which type of state is estimated can be changed by changing the program executed by the CPU 74. The mobile terminal 84 may issue an instruction for the change.

Instead of the wireless LAN device 80, a communication device using a communication system such as ZigBee (registered trademark), Bluetooth (registered trademark) Low Energy, or Wi-Fi (registered trademark) may be used. A detection result (an eye movement detection result and a state estimation result) of the eye movement detection section 75 may be temporarily stored in the RAM 78 and then transmitted to the mobile terminal 84 via a communication device such as the wireless LAN device 80. Alternatively, the detection result of the eye movement detection section 75 may be transmitted to the mobile terminal 84 in real time. The mobile terminal 84 may store the detection result of the eye movement detection section 75 in a built-in memory (not illustrated) or may transfer the detection result to the server 88 via the network 86. The mobile terminal 84 may start some processing according to the detection result of the eye movement detection section may store the processing result in a built-in memory, or may transfer the processing result to the server 88 via the network 86. The server 88 may aggregate the detection results from many eye movement detection sections 75 and the processing results of many mobile terminals 84 to perform so-called big data analytics.

Figure 9:
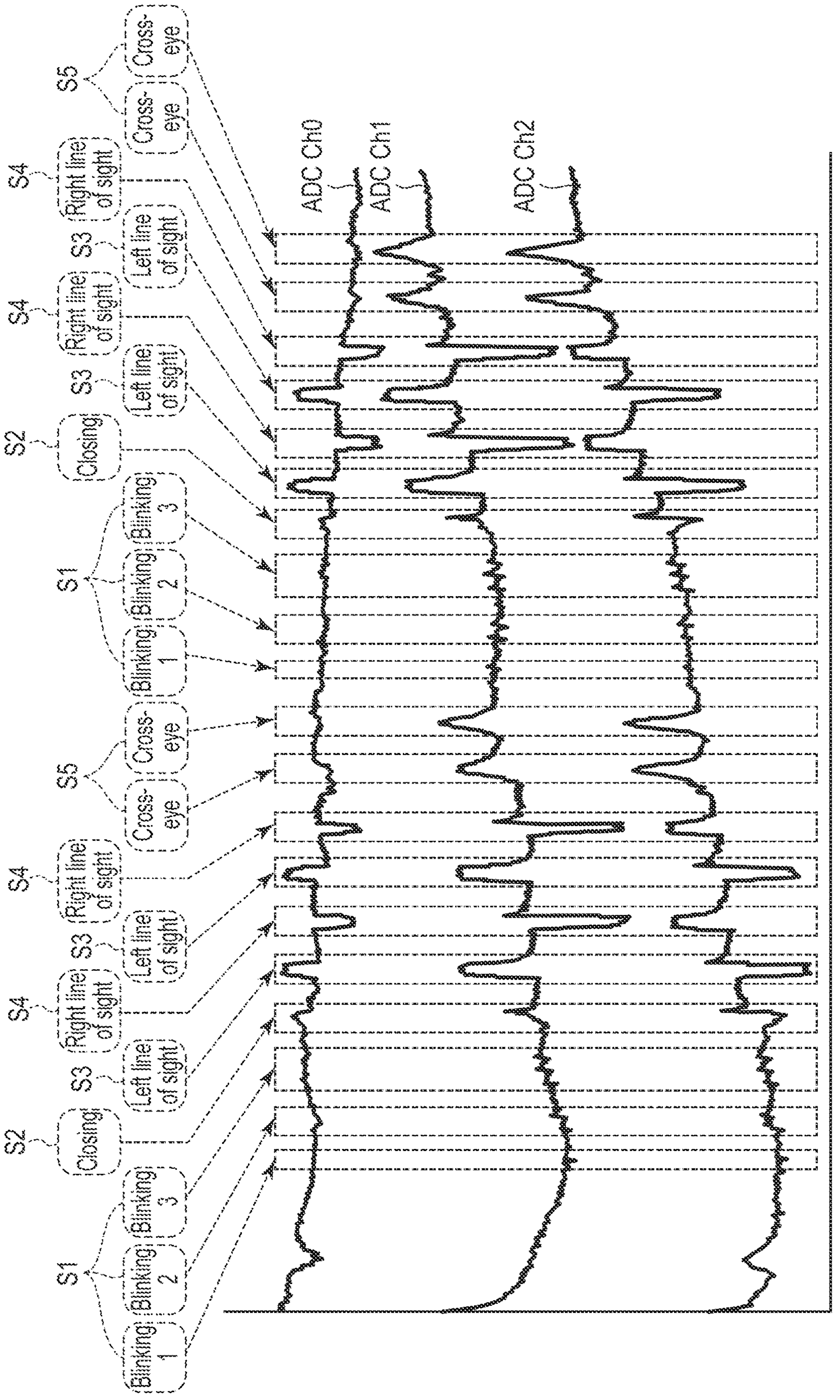
FIG. 9 is a diagram illustrating an example of waveforms of electrooculography (EOG) signals for various eye movements.

FIG. 9 illustrates an electrooculography (EOG) for describing an example of a relationship between various eye movements of the user and the EOG signals ADC Ch0, ADC Ch1, and ADC Ch2 obtained from the A/D converters 62, 64, and 66. The vertical axis represents sample values of the A/D converters 62, 64, and 66 (for example, 3.3 V, 24-bit A/D converter), and the horizontal axis represents time.

By analyzing the respective EOG signals ADC Ch0, ADC Ch1, and ADC Ch2 of blinking S1, closing S2, a left line of sight S3, a right line of sight S4, and cross-eye S5, it is possible to track a viewpoint on which the master is focused.

Figure 10:
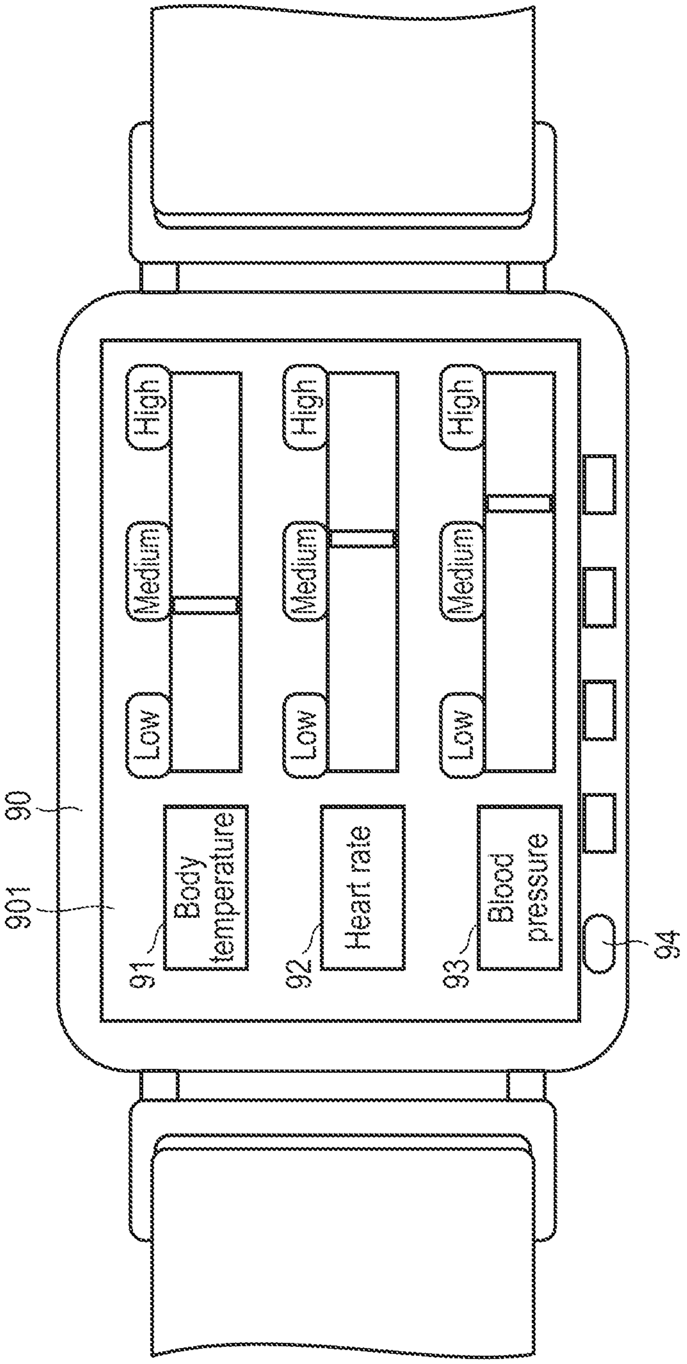
FIG. 10 is a view illustrating another example of a wearable sensor.

FIG. 10 illustrates a wristwatch-type wearable sensor 90. A main body portion of a wristwatch incorporates a thermometer, a heart rate meter, and a blood pressure meter. Then, names of a (master) body temperature 91, a heart rate 92, and a blood pressure 93 of a current user (master) are displayed on a display section 901, and measurement results thereof are displayed as bars next to the names.

The wearable sensor 90 may be provided with a microphone 94. The wearable sensor 90 also has a wireless communication function, and input data thereof is managed by the master management section F120.

It is desirable that a characteristic pattern of a detection output of the wearable sensor described above is specified through many tests according to a change in emotion of the user. Furthermore, uniqueness may appear in the characteristic pattern depending on the user.

Figure 11:
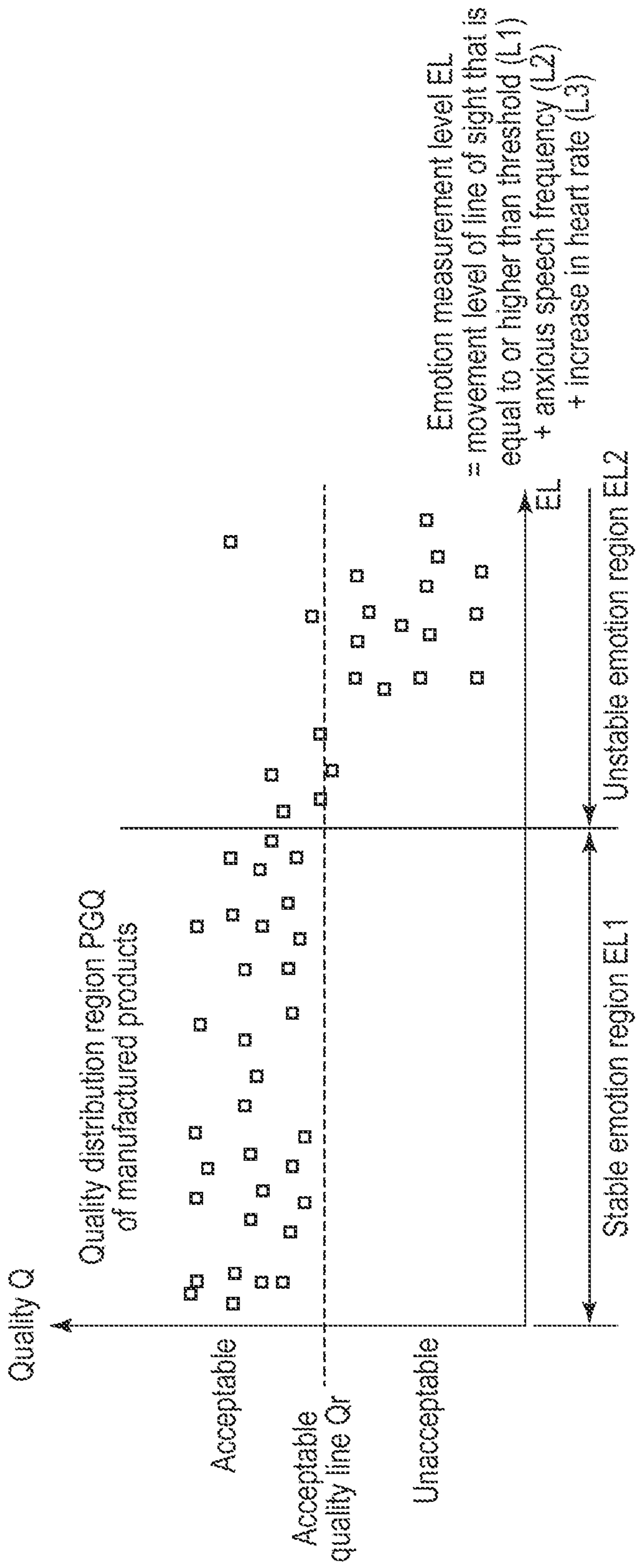
FIG. 11 is a diagram illustrating an example of a correlation between finish quality of a product and a change in emotion of a worker.

FIG. 11 illustrates distribution PGQ of a quality Q based on a quality inspection result of a product manufactured when an emotion of a certain master is stable and a quality inspection result of a product manufactured when the emotion of the master is unstable. In a region EL1 where the emotion of the master is stable, the product has a quality exceeding an acceptable quality line Qr, and in a region EL2 where the emotion of the master is unstable, the product often has a quality falling below the acceptable quality line Qr. The above-described work is performed, for example, when the worker (or master) operates a welding robot to weld and attach an arm to a housing being moved. When a joint strength between the housing and the arm is inspected, the joint strength of the arm manufactured when the emotion of the worker (or master) is unstable is weak.

In addition, similar results were obtained in a case where the worker soldered a terminal of a part to a wiring on a wiring board that was stopped on a belt conveyor for a certain period of time. When inspection of energization between the wiring and the terminal is performed, the number of defective products manufactured increases when the emotion of the worker is unstable.

Figure 12A:
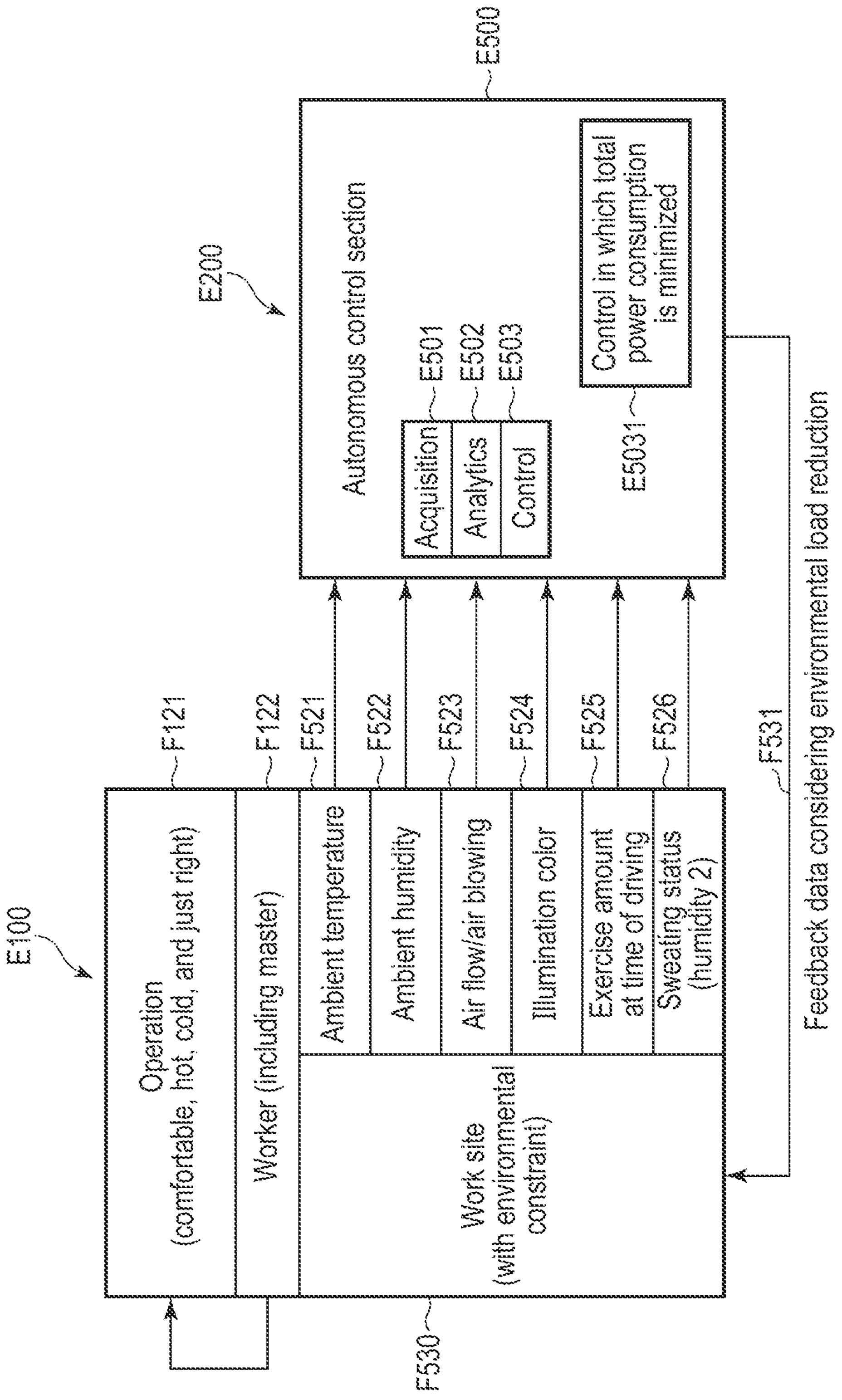
FIG. 12A is a diagram illustrating an example of a case of suppressing an environmental load by using a feedback loop in the CPS.

FIG. 12A illustrates an example of a case where the environmental load is suppressed in a case where a work environment of an office or the manufacturing line is made comfortable by using the feedback loop, for example.

Operating data, biological data, and the like associated with the action of the worker (or master) F122 are transmitted from the physical space E100 to the cyberspace E200. The worker enters the operation room F121 and can operate selection buttons such as a cold button, a hot button, and a just right (comfortable) button for the work site.

At a work site F530, an ambient temperature F521 is measured by a thermometer, and an ambient humidity F522 is measured by a hygrometer. In addition, an air flow or air blowing state (air volume/wind speed) F523, an illumination color F524, and the like of the work site F530 are also measured. Furthermore, an exercise amount (also referred to as calorie consumption) F525 and a sweating status (humidity) F526 of the worker F122 are also measured by the wearable sensor.

The measurement data is always read by the autonomous control section E500 of the cyberspace E200 and used as an element for creating control data (adjustment data) for an air conditioner, a blower, an illuminator, or the like. The autonomous control section E500 also stores default data and constraint condition data transmitted from the work site F530. The default data is, for example, data indicating values designated by a person in charge for an ambient temperature, an ambient humidity, an air blowing state (air volume/wind speed), an illumination color, and the like at the site when the manufacturing line is constructed. Further, the constraint condition data is data regarding constraints imposed by the person in charge on the ambient temperature, the ambient humidity, the air blowing state (air volume/wind speed), an upper limit and a lower limit of a change in illumination color, a color tone, and the like. This is because there are various limitations depending on the product manufactured on the manufacturing line.

It is assumed that the worker F122 feels hot and operates an instruction button for lowering the temperature at the site. Then, the autonomous control section E500 not only simply gives a temperature control command to the air conditioner via the edge computer at the work site, but also performs intelligent control by air blowing or humidity adjustment as follows. For example, even in a case where the air conditioner is not controlled to lower the temperature, the worker may not feel hot when air blowing is performed or the humidity is lowered. In addition, even in a case where the illumination color is changed from orange to white or blue, for example, the worker may not feel hot. Therefore, the autonomous control section E500 can perform the following determination and control.

For example, it is assumed that the number of air conditioners is large and the power consumption thereof is larger than the power consumption of a small number of other control devices (for example, blowers or humidity regulators in the work room). Alternatively, it is assumed that set power consumption for the air conditioner reaches an upper limit value when an operation output is increased more than that in the current state. In this case, the autonomous control section E500 sets a control state E5031 in which the total power consumption is minimized. That is, in a case where the worker F122 operates the instruction button for lowering the temperature, the autonomous control section E500 transmits a command for controlling the blower and/or the humidity regulator to the site.

By including the feedback loop as described above, the system contributes to the environmental load reduction.

Figure 12B:
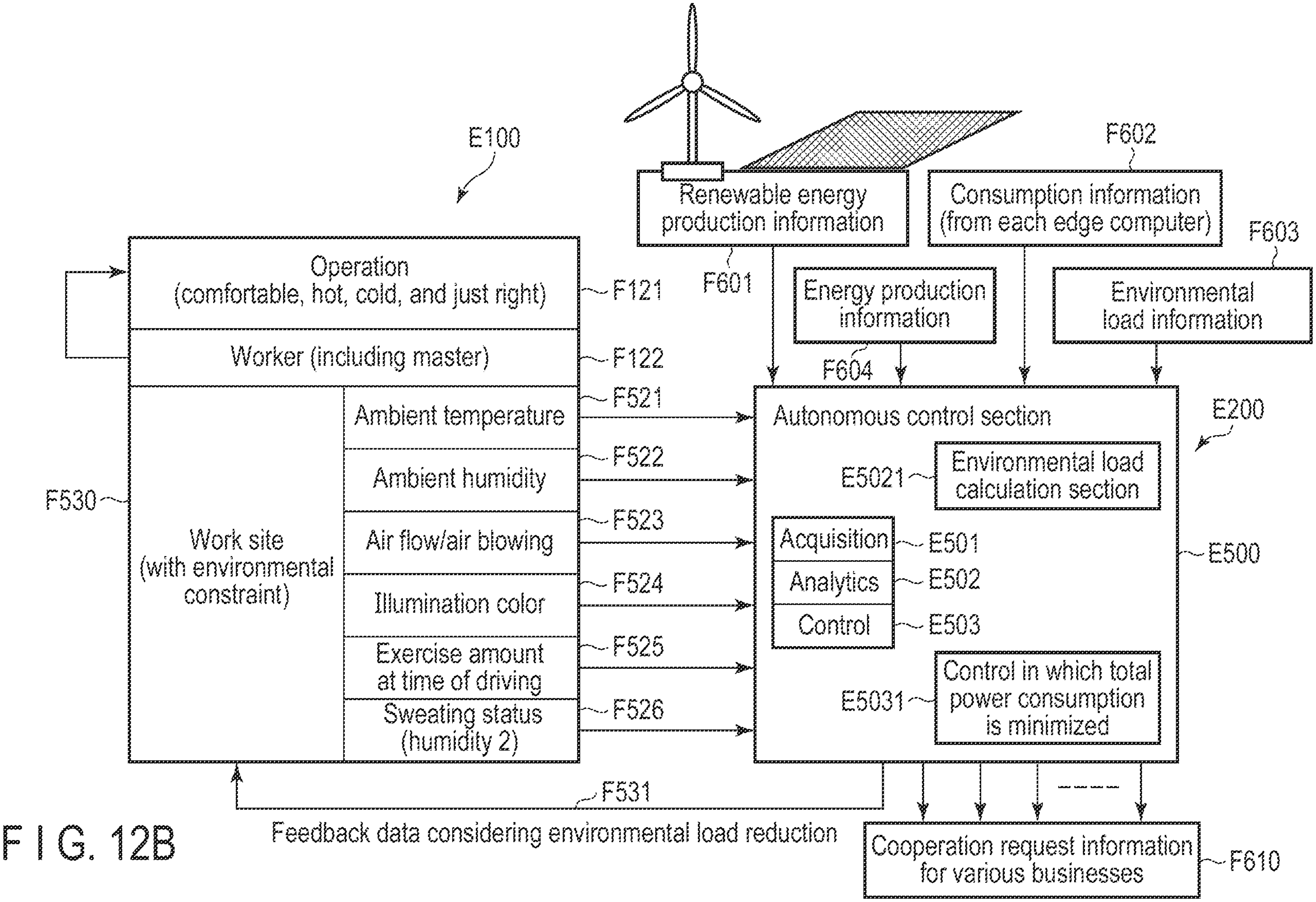
FIG. 12B is a diagram illustrating another example of the case of suppressing the environmental load by using the feedback loop in the CPS.

FIG. 12B illustrates another example of the case where the environmental load is suppressed in a case where a work environment of a business or the manufacturing line is made comfortable by using the feedback loop, for example. In this example, at least one of renewable energy production information F601 (information regarding wind power generation, solar power generation, or the like), consumption information (the power consumption amount of the factory or the office) F602, or environmental load information (carbon dioxide emission amount or the like) F603 is transmitted to the cyberspace E200 as the specific information. Energy production information F604 is also transmitted from the energy business E11. Each piece of information is transmitted via the edge computer of each business.

The autonomous control section E500 calculates the best power consumption (a state in which production and consumption are balanced at a certain ratio) by using overall actual power consumption and the actual produced power. In this case, an environmental load calculation section E5021 can request each business to increase or decrease a ratio of use of renewable energy in such a way that the environmental load can be comprehensively reduced as much as possible (the renewable energy is utilized as much as possible). Alternatively, a graph of the overall actual power consumption, a graph of the actual produced power, and a graph of the best power consumption are provided by image data. In addition, in a graph of power consumption of a business entity itself, a ratio of use of renewable energy of the business entity is presented. In a case where the ratio of use of renewable energy of the business entity may be further increased, it is recommended that an increment of the ratio of use is presented. Such information is fed back as cooperation request information F610.

By presenting such service information to each business entity, the cyberspace E200 can comprehensively reduce the environmental load.

Figure 12C:
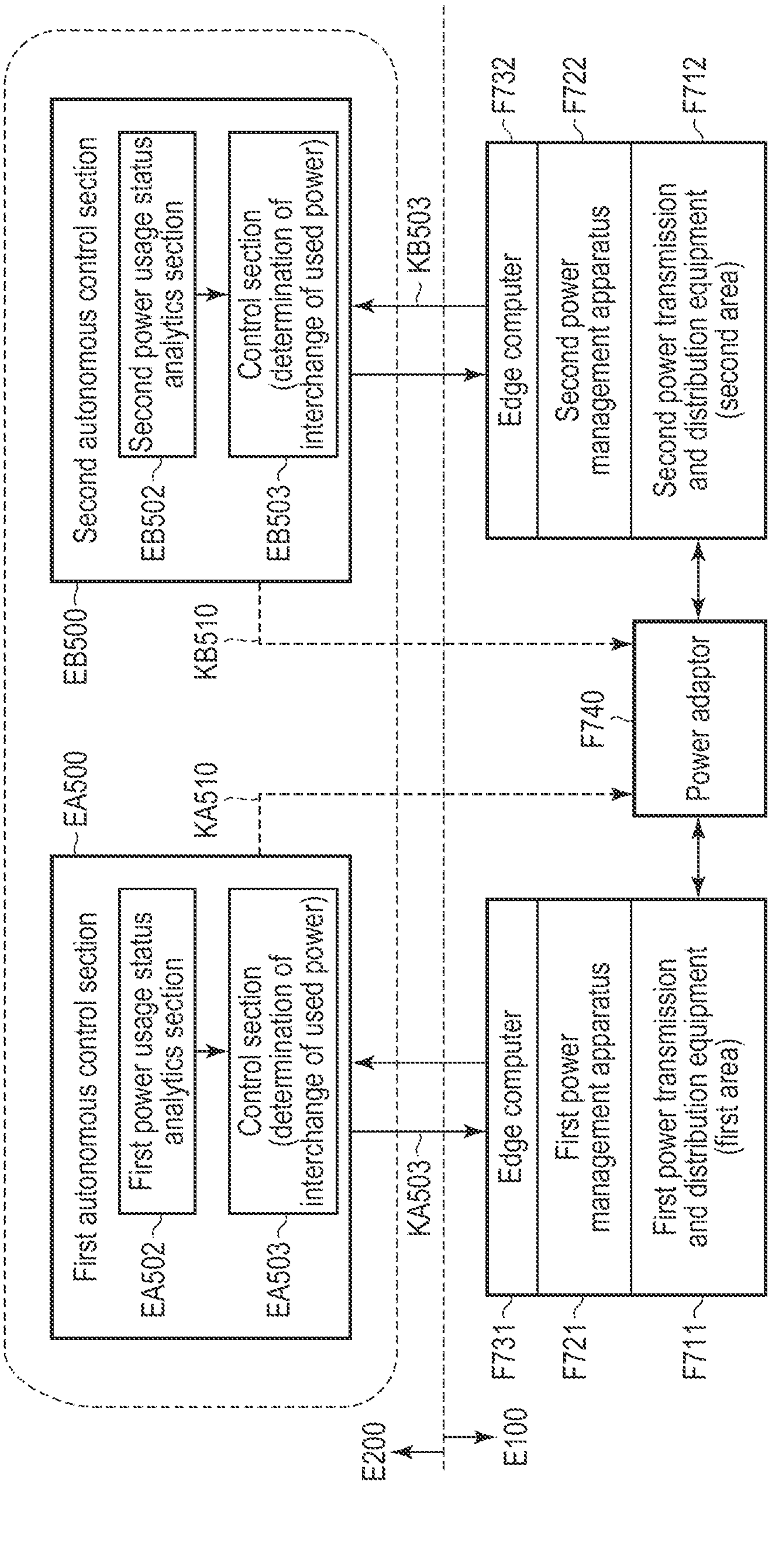
FIG. 12C is a diagram illustrating still another example of the case of suppressing the environmental load by using the feedback loop in the CPS.

FIG. 12C illustrates still another example of a case where the environmental load is suppressed by, for example, controlling a power usage environment of an electric power business using the feedback loop. First power transmission and distribution equipment F711, a first power management apparatus F721, and an edge computer F731 that notifies the cyberspace E200 of a usage status of first power are present in a first area of the physical space E100. In addition, second power transmission and distribution equipment F712, a second power management apparatus F722, and an edge computer F732 that notifies the cyberspace E200 of a usage status of second power are present in a second area of the physical space E100.

Further, there is a power adapter F740 used when the first power transmission and distribution equipment F711 and the second power transmission and distribution equipment F712 interchange power with each other. For example, the power adapter F740 can convert power of a first frequency into power of a second frequency in a case where the first power has the first frequency and the second power has the second frequency, and conversely, the power adapter F740 can convert the power of the second frequency into the power of the first frequency. In addition, a voltage and a current value can also be used for power conversion.

Meanwhile, a first autonomous control section EA500 of the cyberspace E200 includes a first power usage status analytics section EA502 that analyze a usage status of the first power, and a control section EA503 that generates feedback data for the edge computer F731 via a loop KA503 based on an analytics result of the first power usage status analytics section EA502. Further, a second autonomous control section EB500 of the cyberspace E200 includes a second power usage status analytics section EB502 that analyze a usage status of the second power, and a control section EB503 that generates feedback data for the edge computer F732 by using a loop KB503 based on an analytics result of the second power usage status analytics section EB502.

With the system described above, the control sections EA503 and EB503 can control the power adapter F740 to provide the first power to the second area or provide the second power to the first area. For example, in a case where the capacity of one of the first power and the second power is insufficient, it is possible to perform system control capable of receiving surplus power. At this time, control loops KA510 and KB510 are used. In addition, it is possible to perform control in such a way that renewable energy is used as much as possible as a whole according to a usage status of the renewable energy, and it is possible to reduce the environmental load. In the above example, an embodiment using the first power and the second power has been described. However, even in a case where third power and fourth power exist as power usage area, the above-described idea can be applied to the system.

In addition, it is a matter of course that the power management system of FIGS. 12A and 12B and management of the power transmission and distribution equipment of FIG. 12C can also be applied with the same configuration as in the case described with reference to FIGS. 2A to 2F. That is, the loop control section in the cyberspace may include the loop cooperation control section that constructs or releases a new feedback loop in response to a new analytics result of the autonomous operation control section.

Figure 13A:
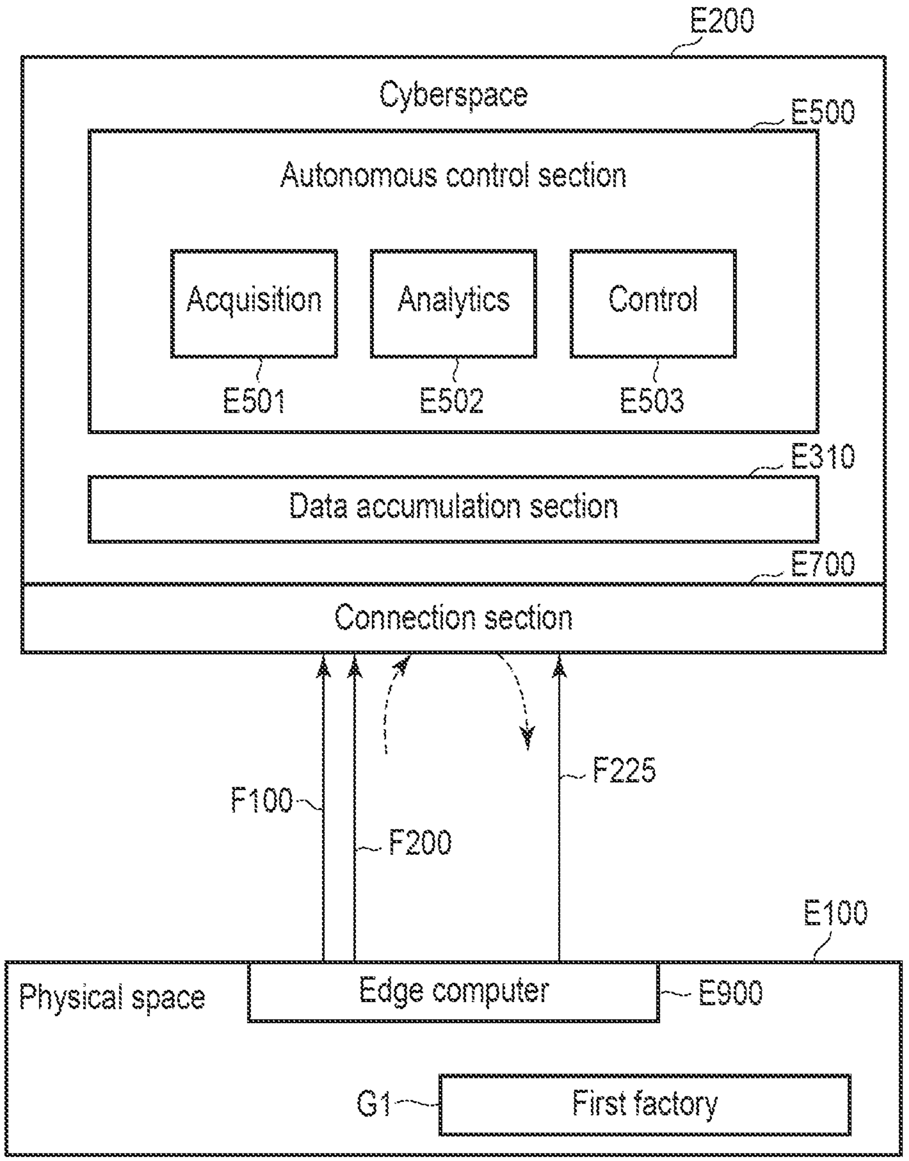
FIG. 13A is a diagram illustrating a basic usage example of the feedback loop between the cyberspace E200 and the physical space E100.

FIG. 13A illustrates a simple example in which a certain factory uses a feedback loop between the cyberspace E200 and the physical space E100.

A first factory G1 exists in the physical space E100. As described with reference to FIGS. 5A and 5B, the master management section F120 exists in the first factory G1, and the master data F100 is obtained from the master management section F120. The master data F100 is data effective for controlling, for example, the environmental load in the first factory G1 or improving the production efficiency or product quality. The master data F100 (for example, the self-information of the worker of the first factory G1) and the apparatus data F200 of the first factory G1 are transmitted to the cyberspace E200 and analyzed. In the analytics, it is determined whether or not there is data to be fed back to an apparatus in the physical space E100. For example, it is determined whether or not the product quality is improved when the master adjusts a control parameter that has been given to the apparatus so far. Here, not only the improvement of the product quality but also the production efficiency or the like is monitored. The production efficiency is, for example, determination as to whether or not the number of products per day is increased. In such a case, it is analyzed whether or not the master data contributes to the quality improvement and production efficiency, and the control parameter in factory data at that time changes.

Figure 13B:
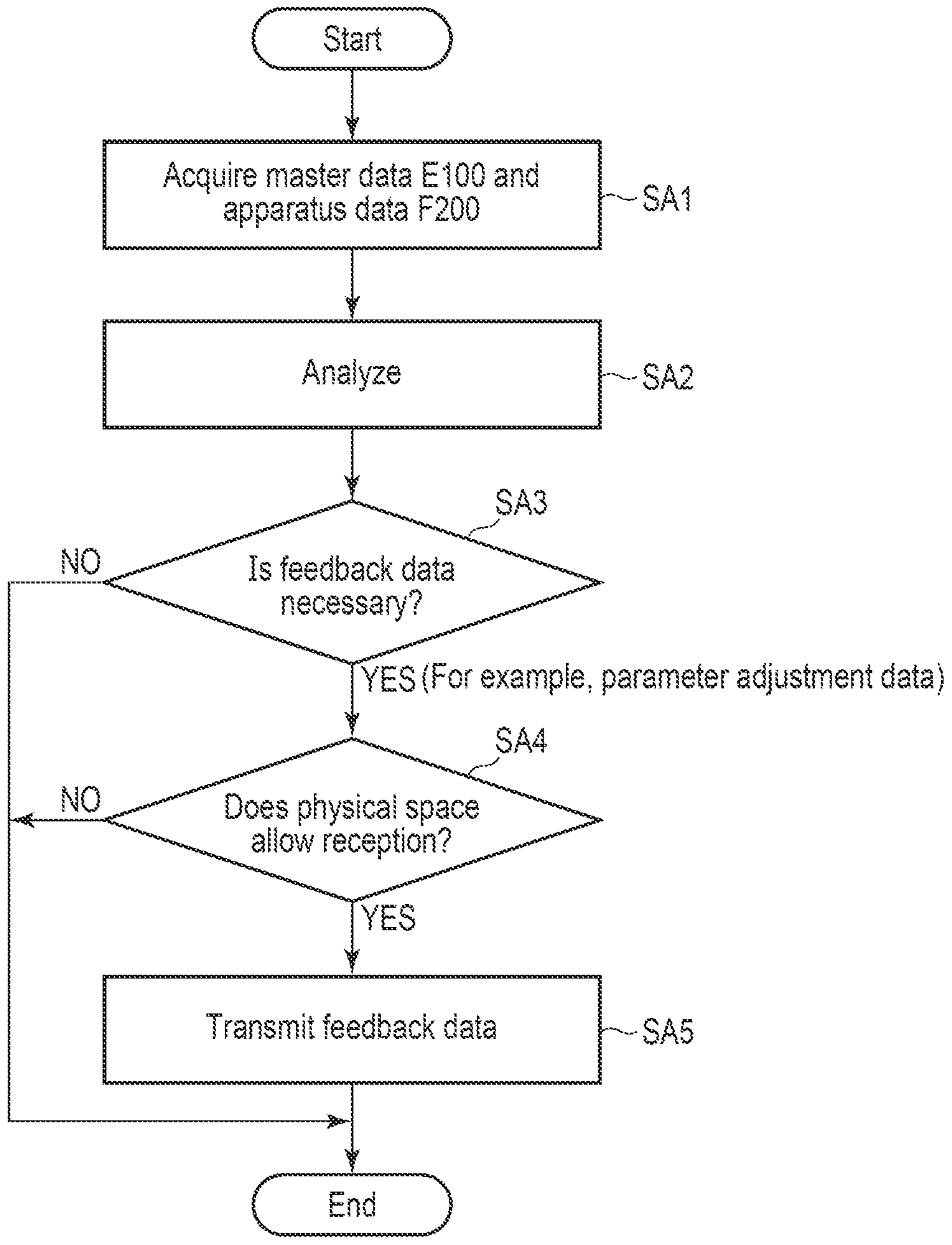
FIG. 13B illustrates an example of a flowchart of a program executed by an autonomous control section E500 of the cyberspace E200.

In a case where the control parameter in the factory data changes, the control section E503 determines that the changed new control parameter is suitable for the factory, and changes the existing control parameter (or default control parameter) in the factory to the new control parameter via the feedback loop. Alternatively, an existing control parameter is corrected and changed to a new control parameter. FIG. 13B illustrates a flowchart of a program executed by the autonomous control section E500 of the cyberspace E200 described above. The autonomous control section E500 acquires (SA1) and analyzes (SA2) the master data F100 and the apparatus data F200. As a result of the analytics, in a case where it is determined that there is feedback data (YES in SA3), it is determined whether or not the physical space allows reception of the feedback data (SA4), and in a case where the physical space allows the reception of the feedback data (YES in SA4), the feedback data is transmitted to the control section of the physical space (SA5). On the other hand, as a result of the analytics, in a case where it is determined that there is no feedback data (NO in SA), the processing ends. In addition, as a result of the analytics, in a case where it is determined that there is feedback data (YES in SA3), but the physical space does not allow the reception (NO in SA4), the processing also ends.

Although the above example describes a simple configuration for clarity, there are actually more factories and more feedback loops thereof.

Figure 14A:
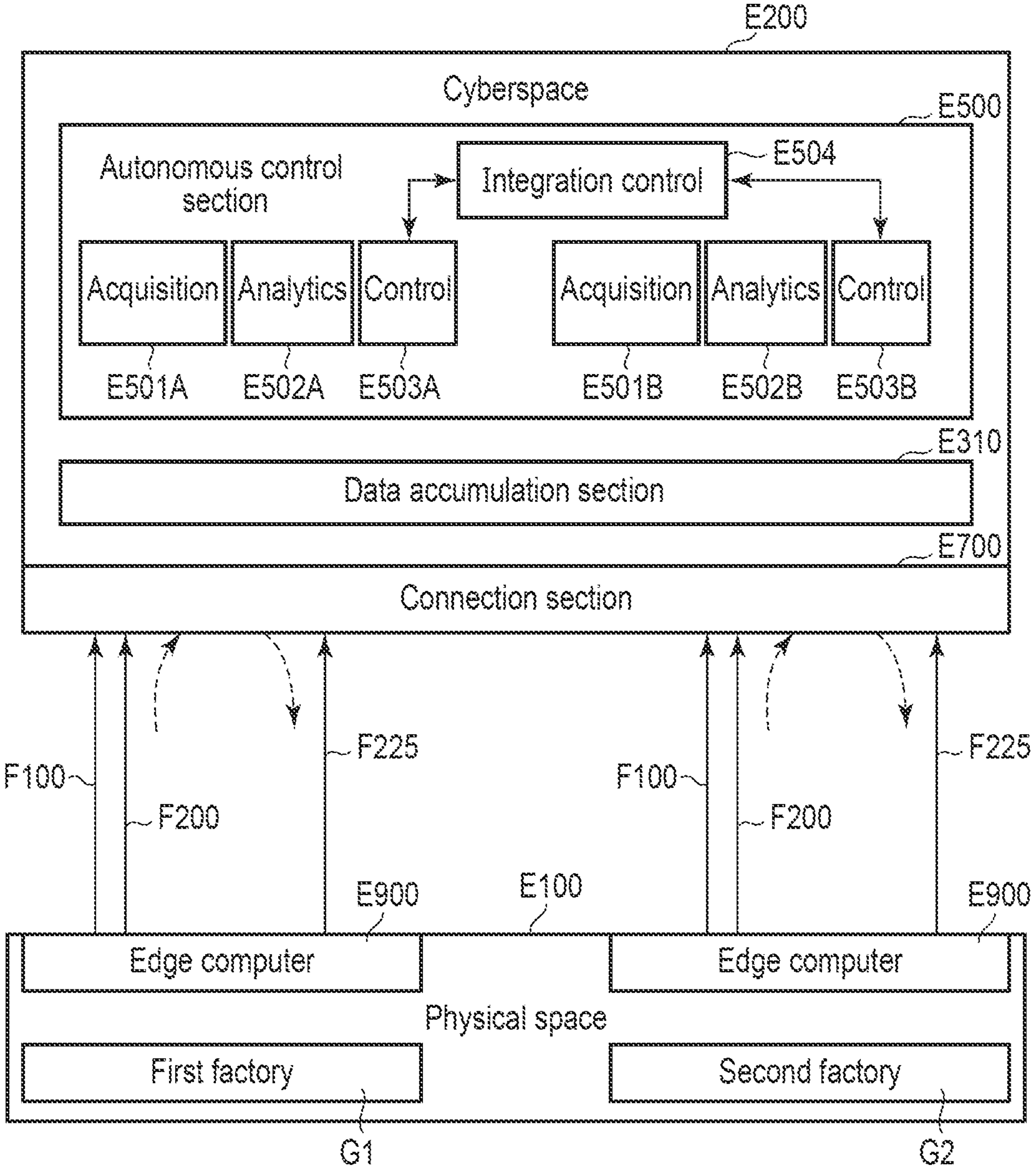
FIG. 14A is a diagram illustrating an example in which a first factory (or a first section) G1 and a second factory (or a second section) G2 exist in the physical space E100.

FIG. 14A illustrates an example in which the first factory (or may be referred to as a first section) G1 and a second factory (or may be referred to as a second section) G2 exist in the physical space E100, for example. The master data F100 and the apparatus data F200 of the first factory G1 and the master data F100 and the apparatus data F200 of the second factory G2 are transmitted to the cyberspace E200 and analyzed. As described above, the cyberspace E200 has a function of creating feedback data for the first factory G1 and a function of creating feedback data for the second factory G2.

Furthermore, the autonomous control section E500 of the cyberspace E200 includes an integration control section E504 between a control section E503A for the first factory G1 and a control section E503B for the second factory G2. The integration control section E504 corresponds to the loop cooperation control section formed by the loop connection section (specifically, the system of systems K213) described in FIGS. 2A to 2E, 3A, and 3B, or includes the loop cooperation control section. The integration control section E504 can automatically detect cooperation control and relating control between the first factory G1 and the second factory G2. The integration control section E504 periodically exchanges information with the control section E503A and the control section E503B. Then, in a case where the integration control section E504 detects the cooperation control and the relating control between the control section E503A and the control section E503B, the integration control section E504 can give a command for feedback control, for example, to the control section E503A and the control section E503B.

A content of the feedback control varies, and the content of the control varies depending on a relationship between the first factory G1 and the second factory G2. For example, exchange of part procurement information and worker information is performed, and operation speed control of a production line, switching control of an operated portion, and the like are performed. It is a matter of course that the same configuration as in the case described in FIGS. 2B to 2F can be applied. That is, the loop control section in the cyberspace includes the loop cooperation control section that constructs or releases a new feedback loop in response to a new analytics result of the autonomous operation control section. For example, it is also possible to implement control for instructing one factory to purchase new software from a software development office or cooperative control for instructing the factory to purchase appropriate parts of the manufacturing line from a parts company.

Figure 14B:
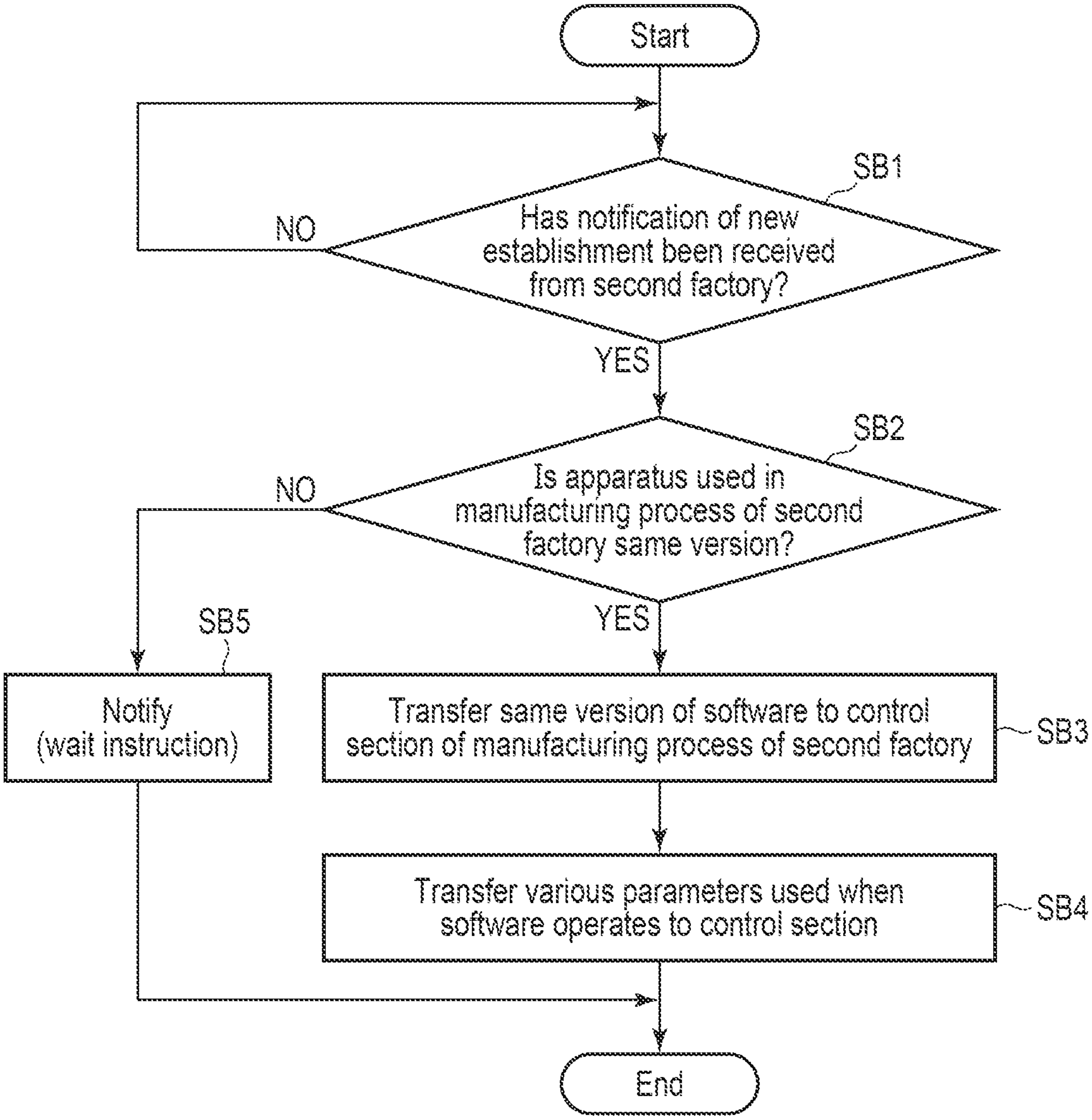
FIG. 14B is a diagram illustrating an operation flow in a case where an integration control section E504 receives information regarding a program (software) used in the second factory G2 from a control section E503B that manages a manufacturing process of the second factory G2.

FIG. 14B illustrates an operation flow in a case where the integration control section E504 receives information regarding a program (software) used in the second factory G2 from the control section E503B that manages the manufacturing process of the second factory G2. It is assumed that the integration control section E504 has now received a notification that the second factory G2 has been newly established (SB1). Here, the integration control section E504 inquires of the control section E503B whether or not the apparatus or program used in the manufacturing process of the second factory is the same as that in the first factory G1 (SB2). Upon receiving a notification of a version (first version) of the program from the control section E503B, in a case where it is determined that the version is different from its own version (a second version for the first factory G1) (NO in SB2), the control section E503B is notified of the fact. The control section E503B notifies an administrator of the second factory G2 that, for example, an available program has not been found, and waits for the next instruction (SB5).

In a case where it is determined in step SB2 that the version of the program used in the second factory G2 is the same as the version of the program used in the first factory G1 (second version) (YES in SB2), the program is automatically transferred to the control section E503B (SB3). Then, the control section E503B transfers the program (second version) to a control apparatus of the second factory G2. At this time, in a case where there is master data (various parameters or the like) used in the program, the master data is also transferred (SB4).

Figure 14C:
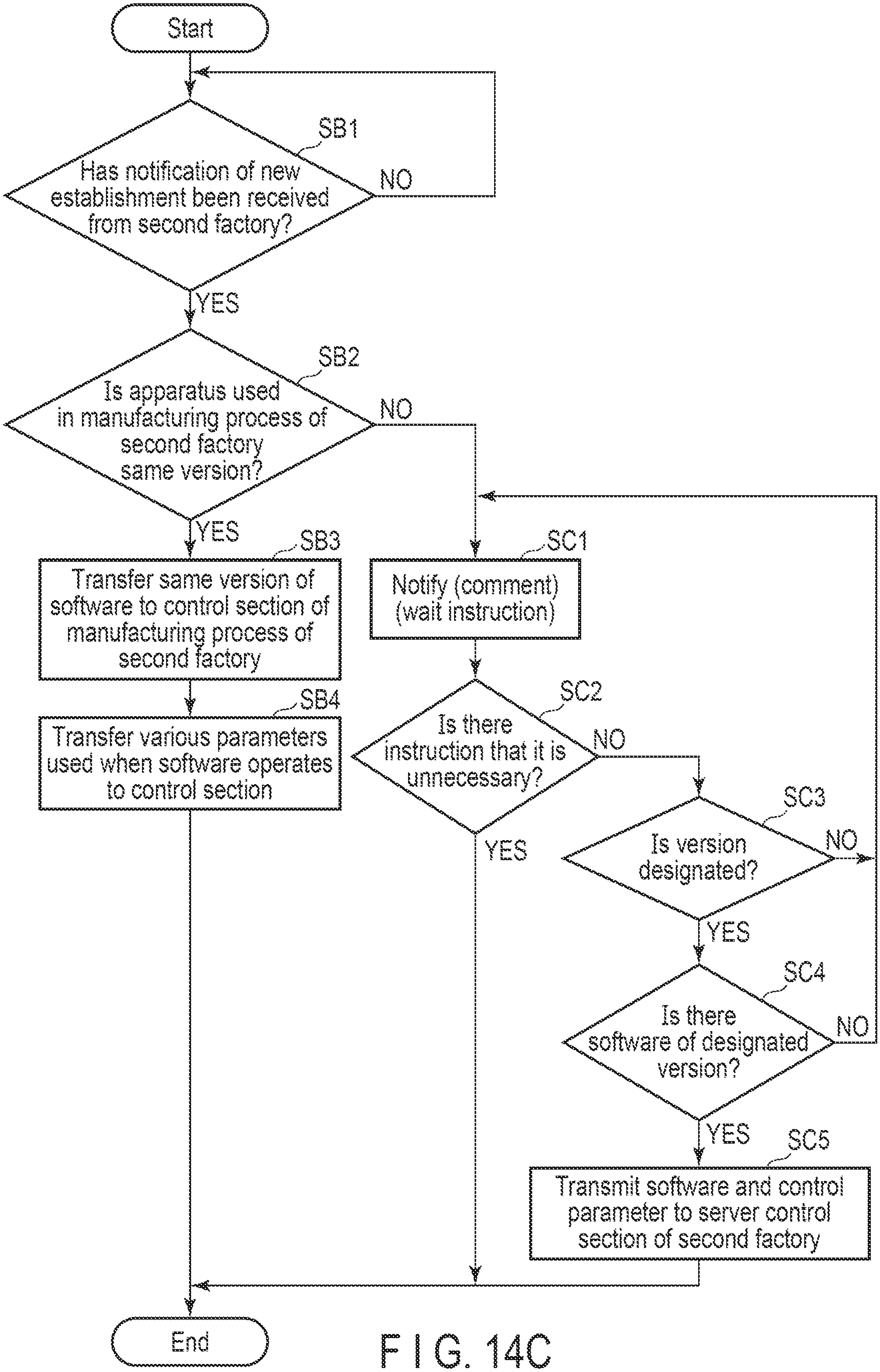
FIG. 14C is a diagram illustrating an operation flow in a case where the integration control section E504 receives information of a different version of the program (software) used in the second factory G2 from the control section E503B that manages the manufacturing process of the second factory G2.

FIG. 14C is a flowchart illustrating processing after the control section E503A for the first factory G1 notifies the administrator of the second factory G2 that an available program has not been found and waits for the next instruction (SB5=SC1). As a result of waiting for the instruction, in a case where there is a response that it is unnecessary from the administrator of the second factory G2 (YES in SC2), the processing ends. On the other hand, in a case where there is no response that it is unnecessary from the administrator of the second factory G2 (YES in SC2) and another version (for example, a third version) of the program is designated (YES of SC3), it is determined whether or not the third version is owned by itself (a database for the first factory G1) (SC4). Here, in a case where the designated version (the third version in this case) exists in the database for the first factory G1 (YES in SC4), the program and the control parameter are transmitted to a server control section of the second factory (SC5). In a case other than the above (NO in SC3 and NO in SC4), the processing returns to an instruction waiting state (SC1).

The techniques in FIGS. 14A to 14C are based on the following idea. That is, the system includes an edge apparatus E900 in a physical space E100, a platform K100 in a cyberspace E200, and a first feedback loop provided between the edge apparatus and the platform. Furthermore, a first information acquisition section K111 acquires first specific information via the first feedback loop. A first information analytics section K112 analyzes the first specific information. A first autonomous operation section K113 causes a first apparatus in the physical space to autonomously perform operation control and/or a service based on a first analytics result obtained by the information analytics section. In the above description, the relationship between the first factory and the second factory has been described, but the same concept is applied even in a case where there are a third factory and a fourth factory.

In addition, the system includes a second feedback loop, a second information acquisition section K111, a second information analytics section K112, and a second autonomous operation section K113 similar to the above. Then, an integration control section E504 determines a difference between the first analytics result and a second analytics result by causing the first and second autonomous control sections cooperate with each other, and obtains control data set according to the difference. The control data is reflected in the first or second apparatus via the first or second feedback loop. The control data is control data and/or a parameter related to a program used by the first apparatus or the second apparatus. Furthermore, as described below, the control data may be data regarding a reusable material, part or apparatus or a recyclable material, part, or apparatus.

In addition, the integration control section E504 may cause the first and second autonomous control sections to cooperate and reflect a part of or the entire first analytics result as the second analytics result in the second apparatus via the second feedback loop.

Figure 15:
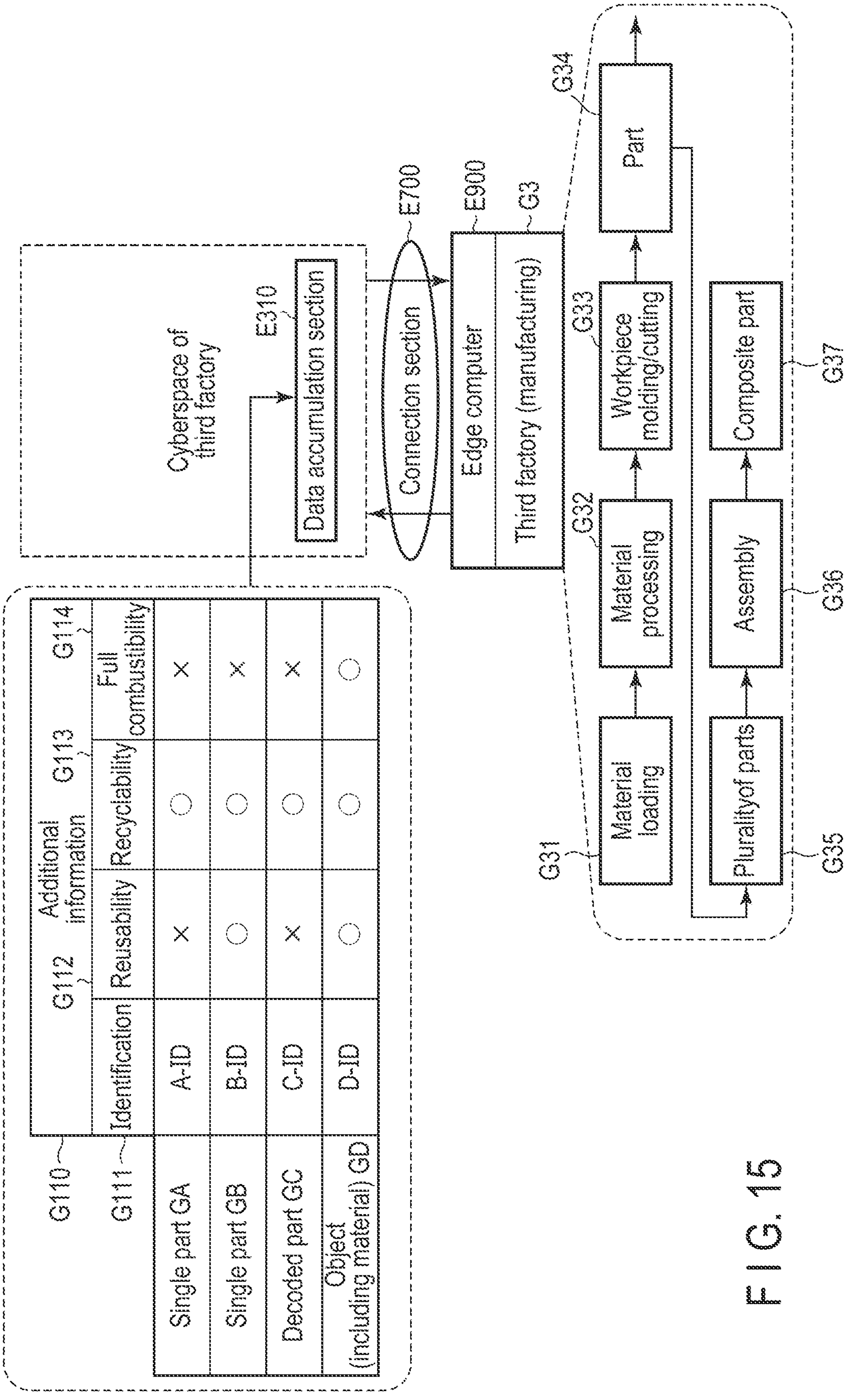
FIG. 15 is an explanatory diagram of a manufacturing process for describing that the CPS is devised to contribute to environmental load reduction and effective use of resources.
Figure 16A:
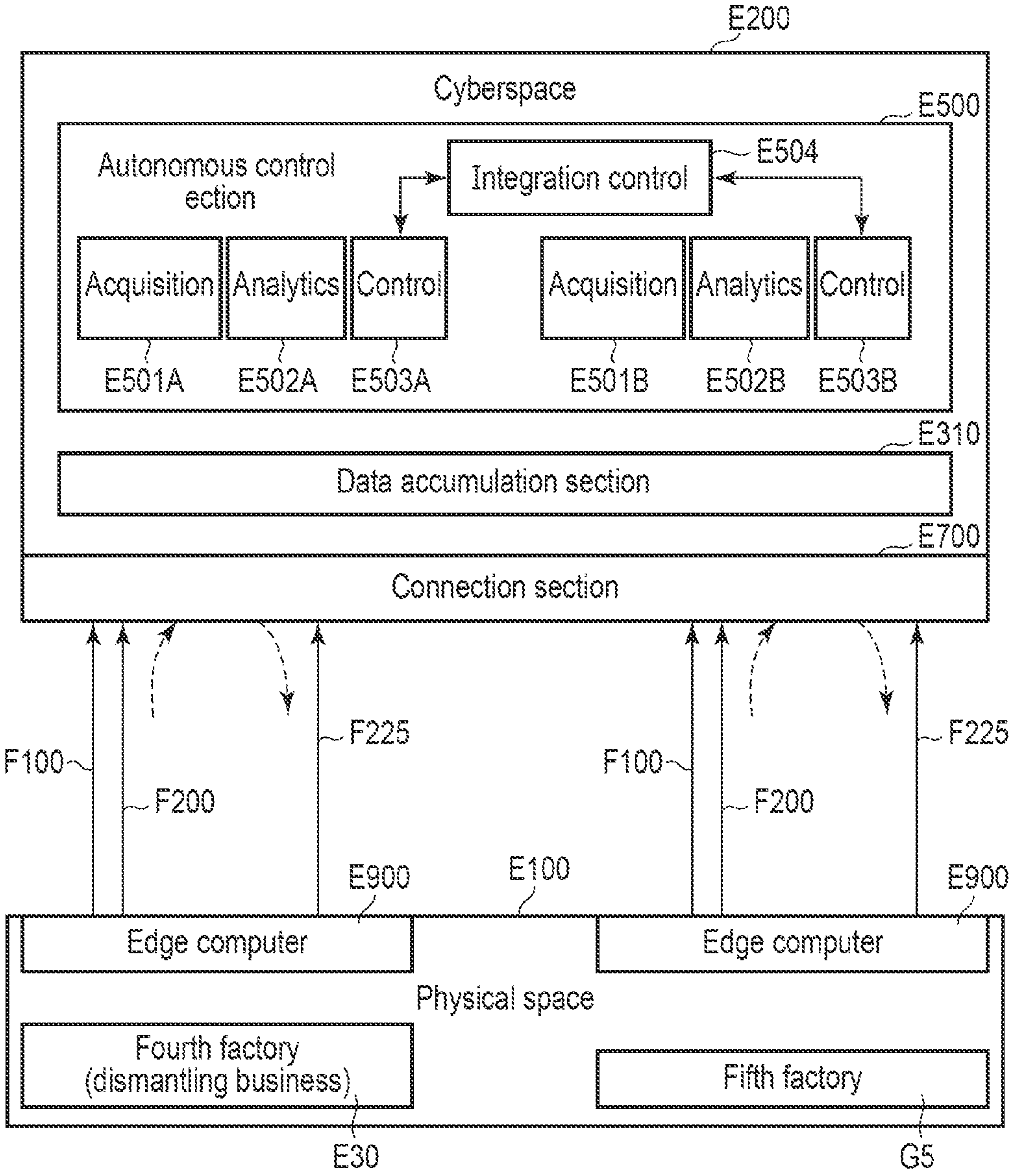
FIG. 16A is also a system diagram for describing that the CPS is devised to contribute to environmental load reduction and effective use of resources.
Figure 16B:
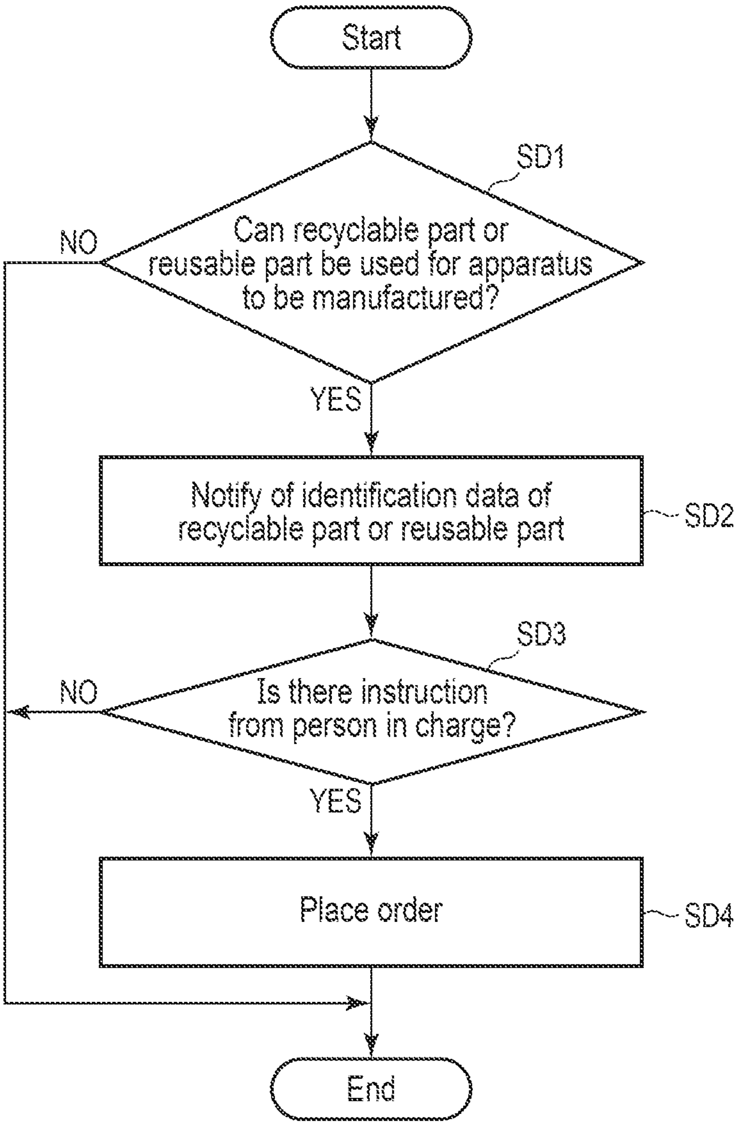
FIG. 16B is also a flowchart for describing that the CPS is devised to contribute to environmental load reduction and effective use of resources.

FIGS. 15, 16A, and 16B are diagrams for describing that the CPS described above is devised to further contribute to environmental load reduction. In FIG. 15, it is assumed that a third factory G3 is a factory that manufactures a composite part by using a material. The manufacturing process includes, for example, the following steps. Material loading G31, material processing G32, workpiece molding/cutting G33, and manufacturing of a part G34 are included. Next, the manufacturing process can take steps of procurement of a plurality of parts G35, assembly G36 of a plurality of parts, and a configuration of a composite part G37. There may also be a packaging step (not illustrated).

In the manufacturing process described above, in the third factory G3, additional information of "reusable" and "unreusable", or identification information of "recyclable" or "unrecyclable", and "fully combustible" or "not fully combustible" is attached to single parts GA and GB, a composite part GC, and/or an object (including a material) GD. The additional information is added by, for example, engraving a QR code (registered trademark) or a bar code or by a printing technique using ink.

In addition, the above-described additional information G110 of the single part and/or the composite part is tabulated and transmitted to and stored in the data accumulation section E310 of the cyberspace E200. The table illustrates an example of an information format for the single parts GA and GB, and the composite part GC. A set of identification data G111, reuse information G112, and recycle information G113 is given to each part. In an example of the tabulated information format,

- the single part GA is given identification data A-ID and information indicating that the single part GA is unreusable and is recyclable,
- the single part GB is given identification data B-ID and information indicating that the single part GB is reusable and is recyclable,
- the composite part GC is given identification data C-ID and information indicating that the composite part GC is unreusable and recyclable, and
- the object (including the material) is given identification data D-ID and information indicating that the object is fully combustible. However, the object classified here emits carbon dioxide when being combusted, but does not emit harmful substances. Therefore, the object becomes a carbon material after combustion.

In a case where the additional information G110 is given as described above, when a dismantling business company dismantles an apparatus including the parts as described above, it is possible to reduce the environmental load that earth resources can be effectively utilized without being wasted based on the additional information G110 as described below.

FIG. 16A illustrates a relationship between a fourth factory (dismantling business) E30 and the cyberspace E200, and a relationship between a fifth factory G5 and the cyberspace E200. For the fourth factory (dismantling business) E30, the cyberspace E200 includes an information acquisition section E501A that acquires specific information necessary for a dismantling process from a feedback loop, an information analytics section E502A that analyzes the specific information, and an autonomous operation control section E503A that autonomously performs operation control based on the analytics result acquired by the information analytics section.

The feedback loop is used, and for example, the control section E503A notifies the worker of skeleton information of an apparatus or structure to be dismantled and a convenient dismantling order via AR or VR, for example. The skeleton information of the apparatus or structure, the convenient dismantling order, and the like are provided as supplementary data by manufacturers.

For the dismantled part, the additional information G110 engraved or printed on the part is read by a camera, an optical reader using a laser beam or an infrared ray, or the like. According to the content of the additional information G110, each part is classified by a belt conveyor group and stored in the form of a reusable part and a recyclable part. Further, information regarding the reusable part and the recyclable part is stored in the form of a table in the data accumulation section E310 of the cyberspace E200.

Here, it is assumed that the fifth factory G5 is manufacturing an apparatus that can use a part generated by, for example, dismantling work in the fourth factory G4.

For the fifth factory G5, the cyberspace E500 includes an information acquisition section E501B that acquires specific information necessary for the manufacturing process from the feedback loop, information analytics sections E502B that analyze the specific information, and an autonomous operation control section E503B that autonomously performs operation control based on the analytics result acquired by the information analytics section E502B.

Here, the information acquisition section E501B also acquires part information to be used in the fifth factory G5. Therefore, the analytics section E502B can determine whether the part information includes information corresponding to the identification data of the reusable part and the recyclable part described in the above table. The determination can be made, for example, because the control section E503B can refer to the table in the data accumulation section E310 via the integration control section E504 and the control section E503A.

Next, the control section E503B asks a person in charge (or worker) of the fifth factory G5 whether to use the reusable part and/or the recyclable part. If the person in charge (or worker) has made a setting to use the reusable part and/or the recyclable part in advance, there is no need to seek an instruction. In this case, the person in charge of the fifth factory G5 is notified of the name, price, amount, and the like of the reusable part and/or the recyclable part. The person in charge designates the type and the quantity of the reusable part and/or the recyclable part to be used, and replies to the cyberspace or notifies that the reusable part and/or the recyclable part is not used, as necessary. When the type and the quantity of the reusable part and/or the recyclable part are determined, the control section E503B can automatically place an order with a dismantling contractor, for example.

Further, the fully combustible object (including the material) (carbon dioxide is released at the time of combustion, but harmful substances are not emitted) is sent to, for example, a power plant to be described later.

It is a matter of course that, in the fourth factory (dismantling business) and the fifth factory, it is possible to take a similar measure to that in the case described in FIGS. 2B to 2F, and in this case, the second feedback loop is actually used. That is, the loop control section in the cyberspace includes the loop cooperation control section that constructs or releases a new feedback loop (second feedback loop) in response to a new analytics result of the autonomous operation control section.

FIG. 16B is a flowchart illustrating an operation example of the control section E503B that manages the fifth factory G5. Whether or not a recyclable part or reusable part can be used for an apparatus or a composite part to be manufactured is determined (SD1). In a case where it is set that the recyclable part or reusable part may be used (YES in SD1), a management room of the factory is notified of identification data of the recyclable part or reusable part (SD2). In a case where the recyclable part or reusable part cannot be used (NO in SD1), combustion is performed as it is without reusing. In a case where the person in charge allows the use of the recyclable part or reusable part in response to the notification from the management room (YES in SD3), an order for the part is autonomously placed with the fourth factory G4 (SD4). On the other hand, in a case where the person in charge (the administrator or master) does not allow the use of the recyclable part or reusable part (NO in SD3), the combustion is performed as it is without reusing.

Figure 17A:
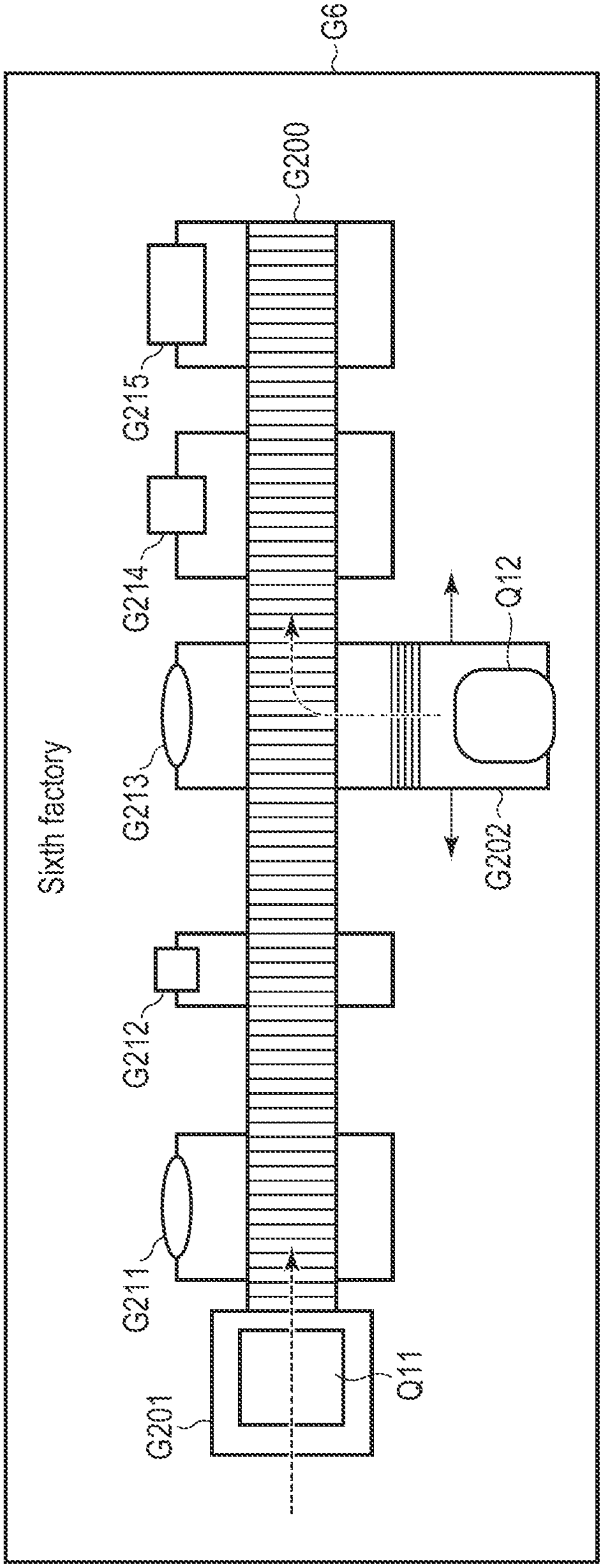
FIG. 17A is a diagram of a factory system for describing that the CPS is devised to further contribute to environmental load reduction and effective use of resources.

FIG. 17A schematically illustrates a manufacturing process of a sixth factory G6. The factory G6 has a plurality of manufacturing steps from upstream to downstream of a manufacturing line. The manufacturing line is controlled by the control section in such a way that each intermediate product in any manufacturing step can be received in a manufacturing step suitable for the intermediate product. Each robot arranged in each manufacturing step is controlled by the first feedback loop. However, in a case where the intermediate product is received on the way, the control is performed by the second feedback loop.

Normally, a manufacturing target product Q11 is taken in by a first taking-in apparatus G201 and placed on a belt conveyor G200. For example, a first part is attached to the target product Q11 to be assembled by a first robot G211, and then a second part is attached to the target product Q11 by a second robot G212. Further, a third part is attached to the target product Q11 by a third robot G213, and then a fourth part is attached to the target product Q11 by a fourth robot G214. Finally, the target product Q11 including the first to fourth parts is packed by a packing robot G215.

Meanwhile, the above-described manufacturing line includes a second taking-in apparatus G202. The second taking-in apparatus G202 can move to any of a plurality of process positions (the second robot G212, the third robot G213, and the fourth robot G214) of the manufacturing line and put the target product (intermediate product) to which the part is attached on the way into the manufacturing line.

In the example of the drawing, the second taking-in apparatus G202 is positioned at the position of the third robot G213, and at this position, a target product Q12 in a semi-finished state can be put into a manufacturing line G200.

Therefore, the sixth factory G6 can process the target product Q12 from an arbitrary process to a packing process.

In a case where, for example, the first and second robots G211 and G212 in another similar factory have failed, the factory having such diversity can support production in another similar factory through the autonomous control section E500. As a result, the supply of products to society is stabilized. In addition, the production efficiency of products of the whole society is improved, which can contribute to the environmental load reduction.

Figure 17B:
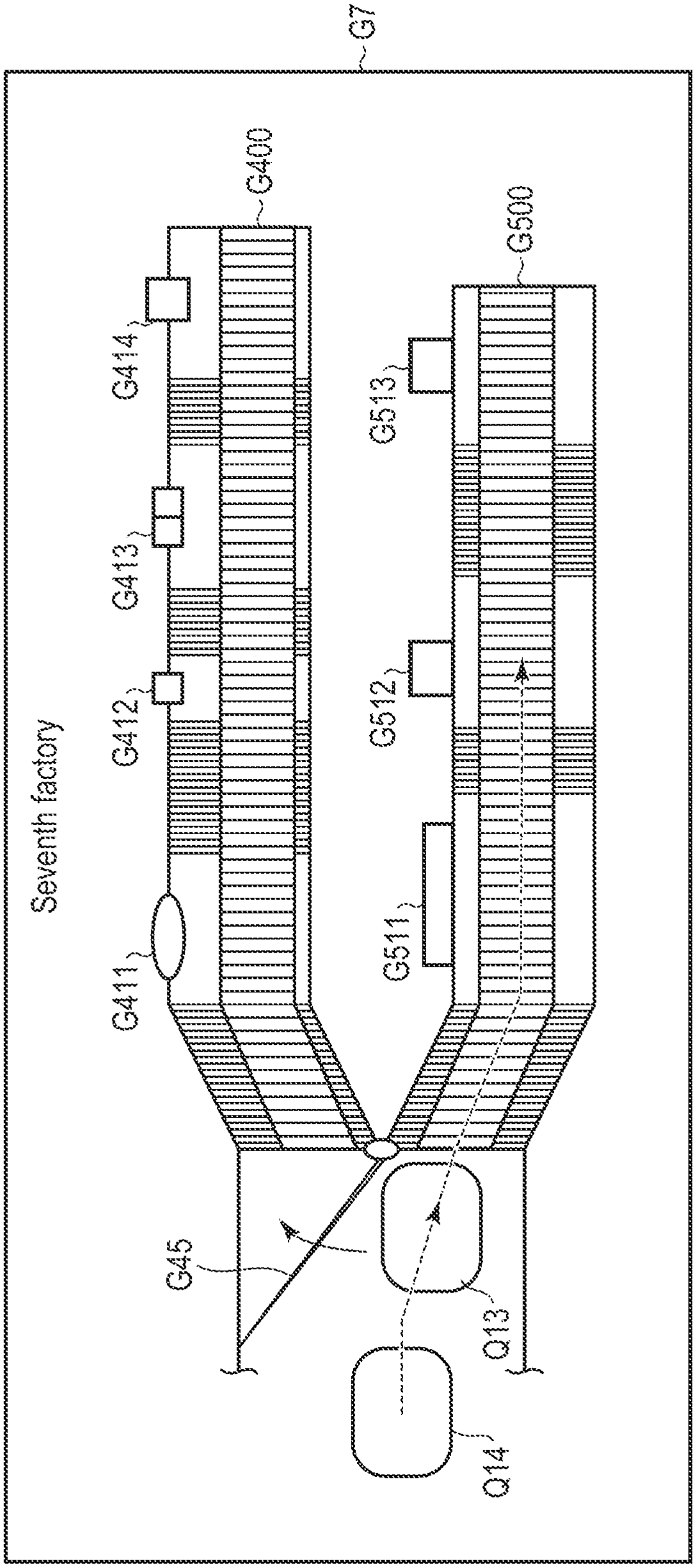
FIG. 17B is a diagram of another factory system for describing that the CPS is devised to further contribute to environmental load reduction and effective use of resources.

FIG. 17B schematically illustrates a manufacturing process of a seventh factory G7. The seventh factory G7 has two manufacturing lines G400 and G500. The manufacturing lines G400 and G500 are arranged in parallel. That is, the seventh factory G7 is a factory having a first manufacturing line and a second manufacturing line, and a control section that controls the manufacturing lines controls each manufacturing process via the first feedback loop. Here, the control section further performs control to distribute a first product and a second product conveyed on a common conveying path to the first manufacturing line and the second manufacturing line. In this case, the control section controls a taking-in apparatus by the second feedback loop, and even if the first product and the second product are conveyed in a mixed manner, the first product and the second product can be appropriately distributed.

A product taking-in apparatus G45 can selectively introduce, for example, an object to be processed or an object to be assembled into one of the manufacturing lines G400 and G500. Work robots G411, G412, G413, and G414 are arranged in order in the manufacturing line G400, and work robots G511, G512, and G513 are arranged in order in the manufacturing line G500.

The work robots G411, G412, G413, and G414 are, for example, robots that perform cleaning G411, color coating agent spraying G412, drying G413, and packing G414, respectively. On the other hand, the work robots G511, G512, and G513 are, for example, robots that perform engraving G511, cleaning G512, and packing G513, respectively.

Also in a case of the factory G7, a factory established in the society can be effectively used through the autonomous control section E500. Moreover, it is possible to utilize a factory in which the skill of the master is reflected in the manufacturing technique. Therefore, the production efficiency of products of the whole society is improved, which can contribute to the environmental load reduction.

Figure 18:
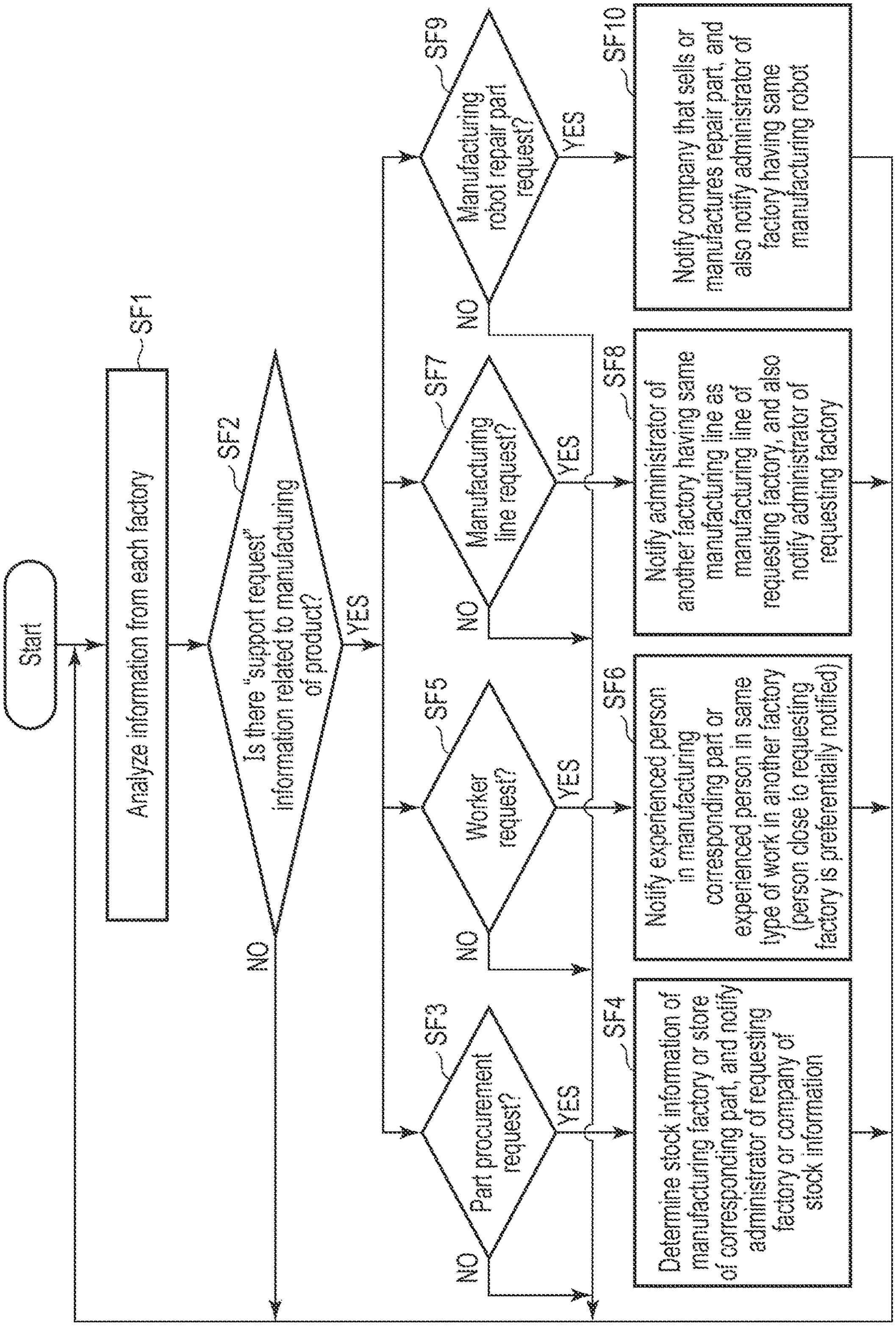
FIG. 18 is a flowchart for describing a function of the CPS that effectively utilizes the factory systems of FIGS. 17A and 17B.

FIG. 18 illustrates an example of a support program included in the autonomous control section E500 of the cyberspace E200. The support program refers to a database in which supportable work information is received from various factories in advance and accumulated. Further, it is possible to refer to support request information from various factories accumulated in the database. The supportable work information and the support request information include a date and time when the support is possible or the support is requested, information such as a date and time or a time zone, a factory region, a work content, and the like. The support program analyzes information from each factory (SF1). For example, it is determined whether or not there is information of a "support request" related to manufacturing of a part (SF2).

In a case where there is a request (YES in SF2), it is determined whether the request is, for example, the "part procurement request" (SF3), the "worker request" (SF5), the "manufacturing line request" (SF7), or the "manufacturing robot repair part request" (SF9).

In a case of the "part procurement request" (SF3), the support program determines stock information of the manufacturing factory or store of the corresponding part, and notifies the administrator of the requesting factory or company of the stock information (SF4).

In a case of the "worker request" (SF5), the support program notifies an experienced person in manufacturing the corresponding part or an experienced person in the same type of work in another factory (a person close to the requesting factory is preferentially notified in this case). In a case of the "manufacturing line request" (SF7), the administrator of another factory having the same manufacturing line as the manufacturing line of the requesting factory is notified, and the administrator of the requesting factory is also notified (SF8). In a case of the "manufacturing robot repair part request" (SF9), a company that sells or manufactures a repair part is notified, and the administrator of a factory having the same manufacturing robot is also notified (SF10).

As described above, the information management system illustrated in FIGS. 17A, 17B, and 18 is an information management system for a manufacturing line in which a plurality of robots are s sequentially arranged in a manufacturing process. The first control section determines the support request information related to manufacturing of a product from edge computers of a plurality of factories. The second control section determines that the content of the first control section is at least one of the part procurement, the worker request, the manufacturing line request, or the manufacturing robot repair part request. In a case where a result of the determination indicates the manufacturing line request, the third control section notifies the administrator of another factory having the same manufacturing line as the manufacturing line of the requesting factory of the request, and also notifies the administrator of the requesting factory of the request.

The same configuration as in the case described in FIGS. 2B to 2F can be applied to the above embodiment in FIGS. 17A, 17B, and 18. That is, the loop control section in the cyberspace has the loop cooperation control section that constructs or releases a new feedback loop in response to a new analytics result of the autonomous operation control section.

Figure 19:
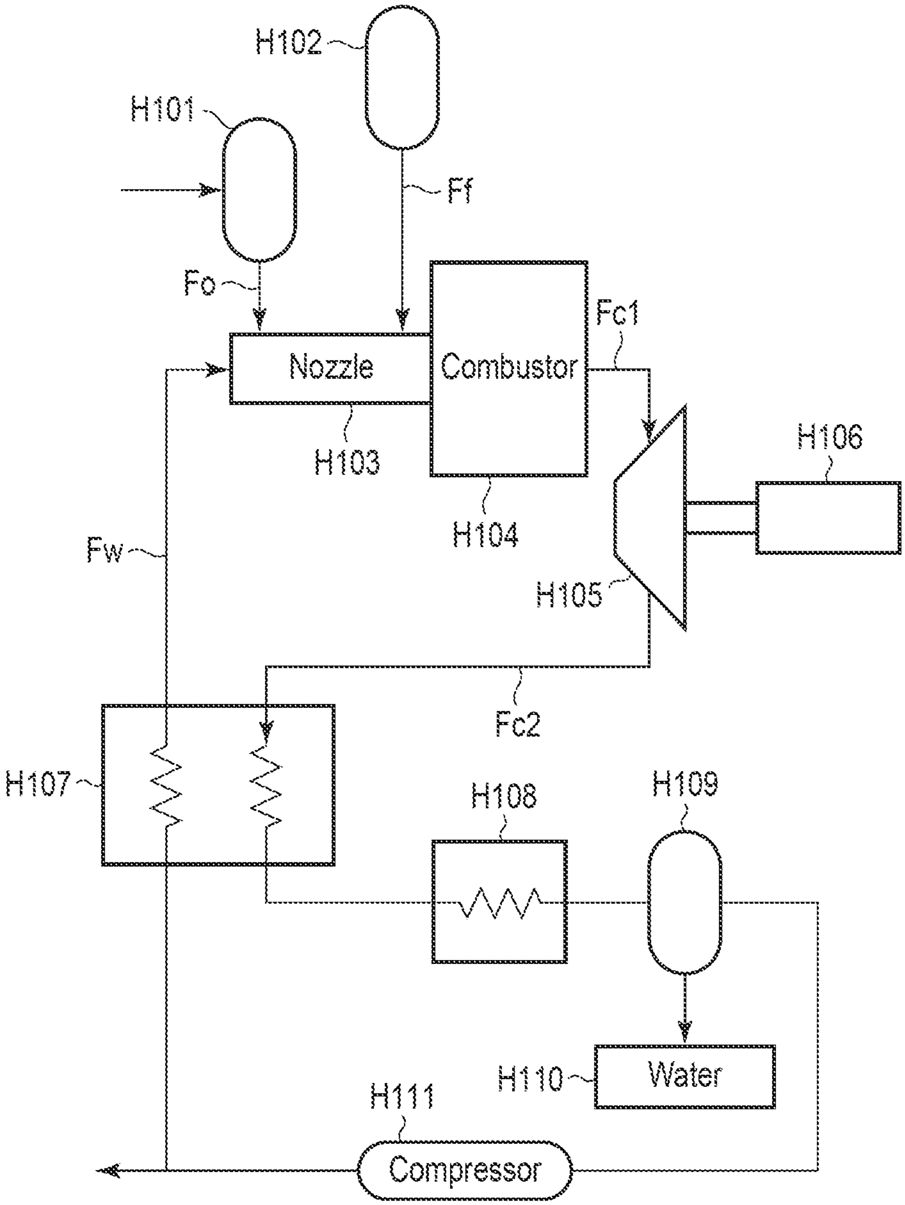
FIG. 19 is a diagram illustrating a basic configuration example of a power plant H100 capable of reducing an environmental load.

FIG. 19 illustrates a basic configuration example of a power plant H100 capable of reducing the environmental load by cyclically using a part of carbon dioxide $CO_2$ without emitting nitrogen oxides.

H101 denotes an oxidant supply source, and H102 denotes a fuel supply source. Supply amounts of an oxidant Fo and a fuel Ff are adjusted by a nozzle H103 and the oxidant Fo and the fuel Ff are supplied to a combustor H104. The oxidant Fo is, for example, supercritical oxygen. The fuel Ff is, for example, a supercritical mixed gas containing natural gas and carbon dioxide. A working fluid Fw is also supplied to the nozzle, and is, for example, supercritical carbon dioxide. The fuel Ff may be, for example, another hydrocarbon such as methane or gas obtained by coal gasification.

The combustor H104 combusts the oxidant Fo and the fuel Ff adjusted by the nozzle H103. Flow rates of the oxidant Fo and the fuel Ff are adjusted to have a theoretical mixing ratio in a state where the oxidant Fo and the fuel Ff are completely mixed. Here, mixing amounts of the oxidant Fo and the fuel Ff may be adjusted by the master (the skilled person or worker). There is also a case where the master adjusts the mixing amounts by using five senses such as the visual sense and the auditory sense while watching a combustion state in a combustion chamber.

The combustor H104 vigorously discharges combustion gas Fc. Combustion gas Fc1 contains carbon dioxide and water vapor generated by combustion, and carbon dioxide which is the working fluid Fw. The combustion gas Fc1 is introduced into a turbine apparatus H105 to rotate a turbine. The rotation of the turbine drives a generator H106 via a rotation shaft. Electricity generated by the generator H106 is used for various purposes.

Combustion gas Fc2 expanded and worked in the turbine apparatus H105 contains carbon dioxide and moisture. The combustion gas Fc2 passes through a first heat exchanger H107. The combustion gas Fc2 whose temperature is decreased in the first heat exchanger H107 is further decreased in temperature in a first heat exchanger H108 and is introduced into a moisture separator H109, where water H110 is separated.

Carbon dioxide is led out from the moisture separator H109, and the carbon dioxide is guided to a compressor H111. In the compressor H111, high-pressure carbon dioxide (dried combustion gas) is output. The high-pressure carbon dioxide is recovered by, for example, a recovery apparatus. The high-pressure carbon dioxide is used as the working fluid Fw described above.

In the power generation system described above, the skill of the master may be involved in the combustion control. In addition, depending on the power generation scale, small, medium, and large sizes may be constructed.

To this end, a relationship similar to the manufacturing process relationship between the first and second plants described in FIG. 14 above occurs as a control process relationship between the first and second power plants. That is, even in the same power generation system, control parameters and the like may be different from each other. Also in this case, the CPS may be flexible and each power generation system may perform efficient operation.

The power plant described above produces energy. The management of the power plant can be handled similarly to the case described with reference to FIG. 2E. That is, the loop connection section in the cyberspace may include the loop cooperation control section that constructs or releases a new feedback loop in response to a new analytics result of the autonomous operation control section.

Figure 20:
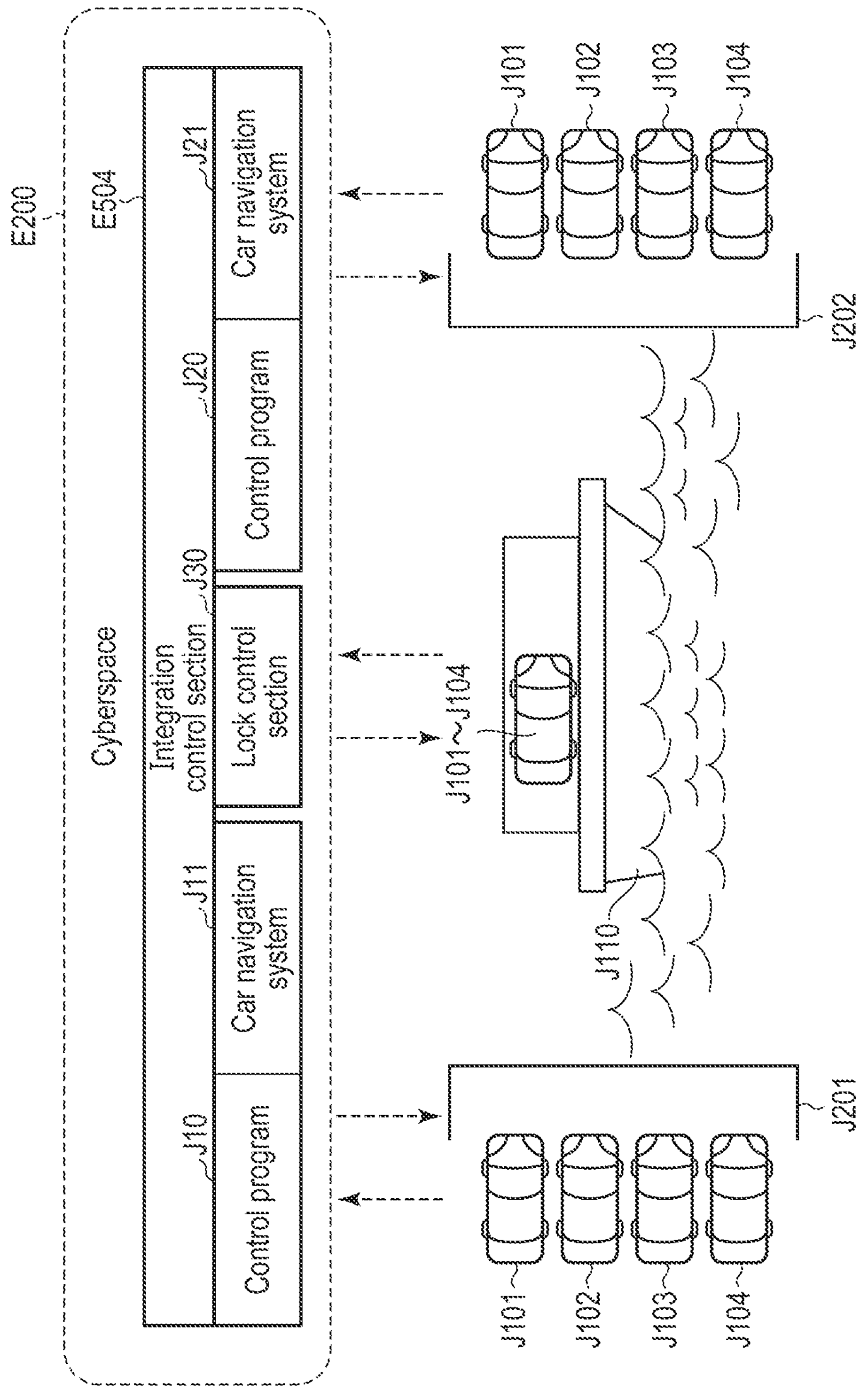
FIG. 20 is an explanatory diagram illustrating an embodiment in a case where a program (software) service is performed by the CPS according to the present embodiment.

FIG. 20 is an explanatory diagram illustrating an embodiment in a case where a program (software) service is performed by the CPS. For example, it is assumed that cars J101 to J104 are sold (or exported) from a region (or country) J201 to another region (or country) J202. The integration control section E504 is provided with a plurality of types of management sections J10, J11, J30, J20, and J21. In this case, a control program <management section J10> and a car navigation system <management section J11> are used for the cars J101 to J104 until being loaded onto a ship J110 in the country J201. On the other hand, in the country J202, a control program <management section J20> and a car navigation system <management section J21> are downloaded from the cyberspace E200 to the cars J101 to J104. This processing is executed autonomously.

For example, in a case where the control program related to driving is configured to maintain a speed limit of the car, when the car is in the country J201, the control program operates to comply with the rules of the country J201. In addition, the car navigation system J11 performs road guidance adapted to the country J201.

In a case where the cars J101 to J104 are loaded, a driving function of the cars J101 to J104 is locked until arrival at the country J202 as an export destination according to a command from a lock control section J30. As a result, car theft can be prevented. Alternatively, a program for driving control may be a program capable of implementing the minimum function to the extent that unloading from a ship or a vehicle can be performed until arrival at the country J202 as the export destination.

When the ship J110 arrives at an intended port of the country J202, the cars J101 to J104 transmit identification data to the cyberspace E200. Then, the control program and the car navigation system adapted to the country J202 are downloaded from the cyberspace E200 to the respective cars J101 to J104. As a result, the respective cars J101 to J104 can be subjected to speed limit control complying with the rules of the country J202 and car navigation (road guidance).

In the above example, an example in which the cars J101 to J104 are transported by the ship J110 has been described. However, even when being transported by a freight train or a large truck, the cars J101 to J104 can be handled in the same manner as in the above example.

Although the car has been described above by way of example, the program update can also be performed in some home appliance. Therefore, the loop cooperation control section included in the loop connection section of the cyberspace E200 can also work on the cars and home appliances. The loop cooperation control section can control an embedded program. For example, during transportation, it is also possible to set the embedded program of the car or home appliance to be in a sleep state and start the program when sales are determined.

As described above, the CPS in the present embodiment can be easily applied not only to the manufacturing process but also to various service businesses (an export business, a transportation business, a dismantling business, or the like). Although the above example is a description related to export of a car, for example, a technique similar to the technique described with reference to FIG. 20 is possible as long as a local control program is installed also for a composite part. For example, at the time of departure, only a basic program may be installed and the local control program is not installed in the composite part or the apparatus, and the local control program may be automatically installed only when the composite part or the apparatus arrives at an intended site.

That is, a first control program management section is an information management system for an apparatus to be exported and imported, is arranged in the cyberspace, receives position information and information regarding a control program used in the apparatus from an edge computer of the apparatus arranged in the physical space, and sets the first control program in the apparatus. When the apparatus arrives at an intended import destination, a second control program management section sets a second control program different from the first control program in the apparatus.

<Regional Contribution in Emergency>

Figure 21:
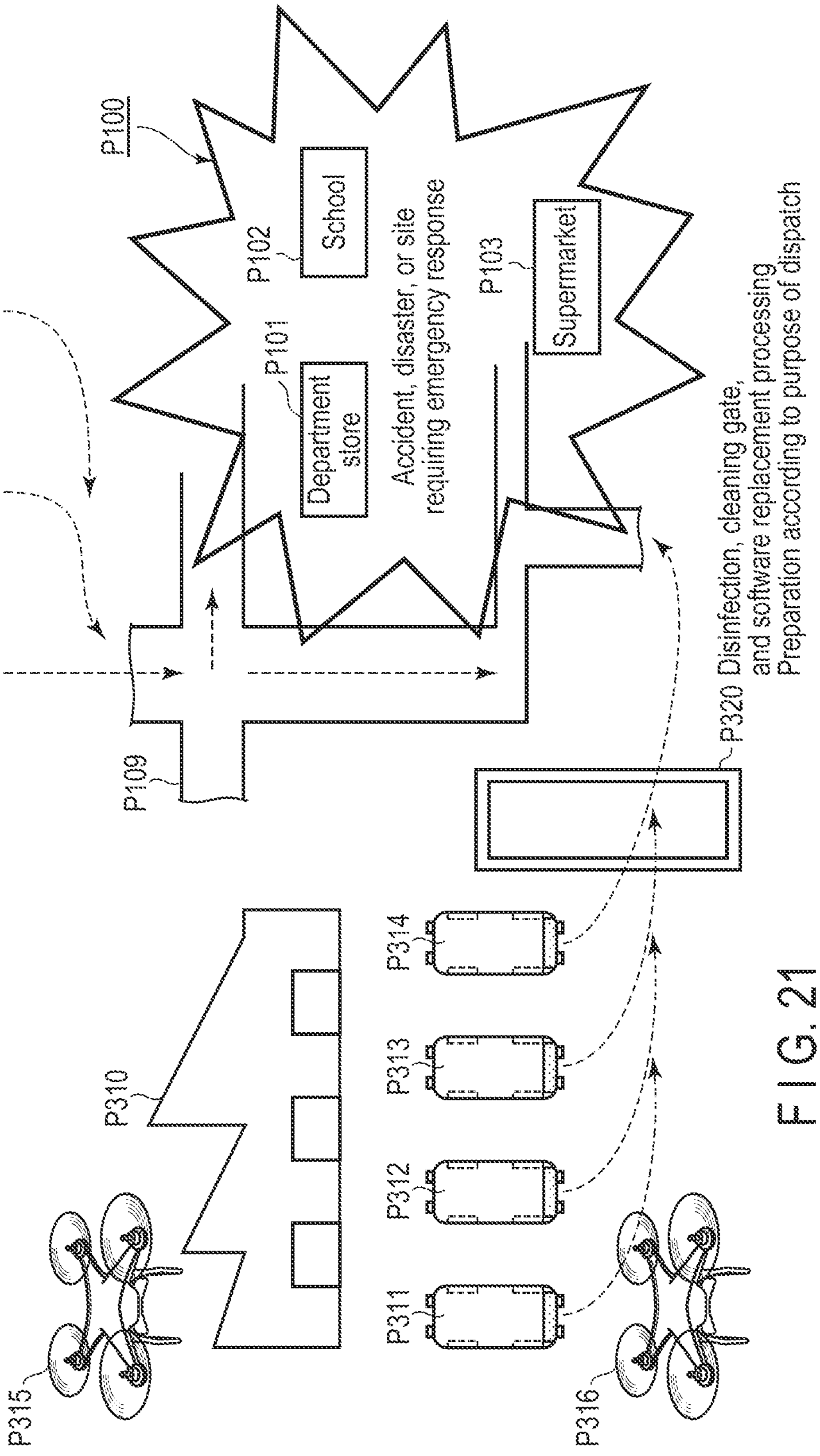
FIG. 21 is a diagram for describing a system in which various pieces of equipment (autonomous traveling robot/drone) and the like in a factory can be dispatched when an accident or a disaster occurs in a peripheral area (a downtown, a station, or the like).

FIG. 21 is a diagram for describing a system in which various pieces of equipment (automated traveling robot/drone) and the like in a factory can be dispatched when an accident or a disaster occurs in a peripheral area (a downtown, a station, or the like). The state of the physical space is managed and watched in the cyberspace.

In a factory P310, automated traveling robots P311, P312, P313, and P314 are used for material conveyance, part conveyance, and the like. Further, drones P315 and P316 may be used. The automated traveling robots P311, P312, P313, and P314, the drones P315 and P316, and the like are dispatched in a case where an injury or a disaster occurs in a peripheral area P100, and are prepared to contribute to the peripheral area. In a case where the automated traveling robots P311, P312, P313, and P314, the drones P315 and P316, and the like go out of a factory site or return from the outside, the automated traveling robots P311, P312, P313, and P314, the drones P315 and P316, and the like are obliged to pass through a disinfection/cleaning gate P320.

Here, it is assumed that an accident, a disaster, or a situation requiring an emergency response has occurred in the peripheral area P100. Here, it is assumed that there are a department store P101, a school P102, a supermarket P103, a private house, and the like in the peripheral area P100, and for example, an emergency situation requiring lifesaving, such as a fire, a flood, or snow damage, has occurred.

The cyberspace is notified of the situation by IoT equipment such as an edge computer or a surveillance camera installed in the department store P101, the school P102, the supermarket P103, the private house, or the like, and a police station P201, a fire station P202, or a hospital P203 is also automatically notified. This notification may be directly made from the edge computer to the police station P201, the fire station P202, or the hospital P203, or may be notified via the cyberspace.

An emergency response manual is set in advance. For example, a police officer rushes to an emergency site, determines the scale (the number of necessary persons such as fire fighters, doctors, or workers, and necessary equipment) of a rescue party, and secures a track (road) for the rescue party to rush to the site. Police headquarters are notified of these pieces of emergency information, and these pieces of emergency information are automatically transmitted to the cyberspace. Then, the emergency information is analyzed by the autonomous control section E500, is transmitted to the fire station P202 and the hospital P203, and is also transmitted to the edge computer of the factory P310 in the area.

In a case where the emergency information issued by the police officer is information by a skilled police officer, it can be said that the emergency information is equal to so-called master skill data (five-sense data). That is, the manual information may be further revised, and rather, the manual information is often revised.

The factory P310 can set in advance the automated traveling robots P311, P312, P313, and P314, and the drones P315 and P316 that can be used in an emergency. In a case where an emergency call occurs from the edge computer, a work command is transmitted from the cyberspace to the automated traveling robots P311, P312, P313, P314, and the drones P315 and P316 via a feedback loop. In this case, the robot or drone is also notified of parameters such as map information of an emergency site and road information of a track secured by the police officer, and it is also possible to allocate conveyed supplies (food, water, medical instruments, or the like), on-site shooting, TV broadcasting, and the like. Furthermore, the worker in the factory can also accompany the robot as necessary. Further, in a case where there is a large amount of rainfall, a flood occurs, and the factory is building a ship, the autonomous control section E500 of the cyberspace E200 can also use a feedback loop to instruct to dispatch a rescue boat or the like.

Furthermore, based on a command from the autonomous control section E500 of the cyberspace E200, the drones P315 and P316 equipped with cameras can monitor, for example, a frozen state of a road in a jurisdiction area. In addition, the autonomous control section E500 can acquire weather forecast information at all times and predict the weather in a manageable area, and can also perform work such as spraying an anti-freezing agent on a road based on the prediction.

The above function can be easily performed not only in the area P100 but also in a case where a plurality of users suddenly get sick in a station or the like, for example. For example, the number of automatic external defibrillators (AED) provided in a station may be insufficient. In such a case, the control section of the cyberspace has a function of grasping a usage status of the AED in a predetermined area (in the station), and in a case where it is determined that the number of AEDs is insufficient, the factory P310 in the area can automatically issue a command by performing feedback to replenish the AED.

In this case, the drone may be used as transportation means from the factory P310 to the predetermined area (in the station). For example, as described above, a station staff can also communicate with the remote medical institution L124. Through the communication, the on-side station staff can also receive advice from a doctor employed in the remote medical institution L124 when treating an emergency patient.

Furthermore, an automated traveling robot that always carries a freight may also exist in the station. The automated traveling robot can communicate with, for example, a mobile terminal of a traveler. When the traveler registers device identification data of the mobile terminal in the control section of the automated traveling robot and presses a "transport" command button on the mobile terminal, the automated traveling robot can track the back of the traveler holding the mobile terminal. Therefore, if a heavy freight is carried on the automated traveling robot, the traveler can move in the station without carrying the freight. When the traveler unloads his/her freight at an intended place (a platform or a train entrance) and presses a "release" command button on the mobile terminal, the automated traveling robot can automatically return to a standby area. Such control can be implemented by cooperation between the edge computer in the station and the control section E500 of the cyberspace. The above freight may be a baby carriage.

The automated traveling robot has a camera and a person recognition function. When the traveler registers the device identification data of the mobile terminal in the control section of the automated traveling robot, the automated traveling robot can capture and recognize a posture of the entire body of the traveler, a shape and color of clothes, a face, shoes, and the like with the camera. When tracking the traveler, the autonomous traveling robot constantly tracks the traveler while checking the posture of the entire body of the traveler, the shape and color of clothes, the face, the shoes, and the like. In addition, a microphone and a speaker are provided, and when the traveler gives a track number, a train name, a vehicle number to get on, and the like, it is also possible to guide the traveler to an intended track (Platform) with reference to map data.

Various events in the physical space described above are grasped in the cyberspace, and the cyberspace can autonomously implement countermeasures against the events. As the countermeasure, it is further possible to properly notify an insurer of information provision (for example, the situation of the accident, the scale of the disaster, and the like). Furthermore, the autonomous control section of the cyberspace can manage securement, reservation, and the like of accommodation facilities such as hotels in order to evacuate a disaster victim according to the situation of the disaster victim.

Figure 22:
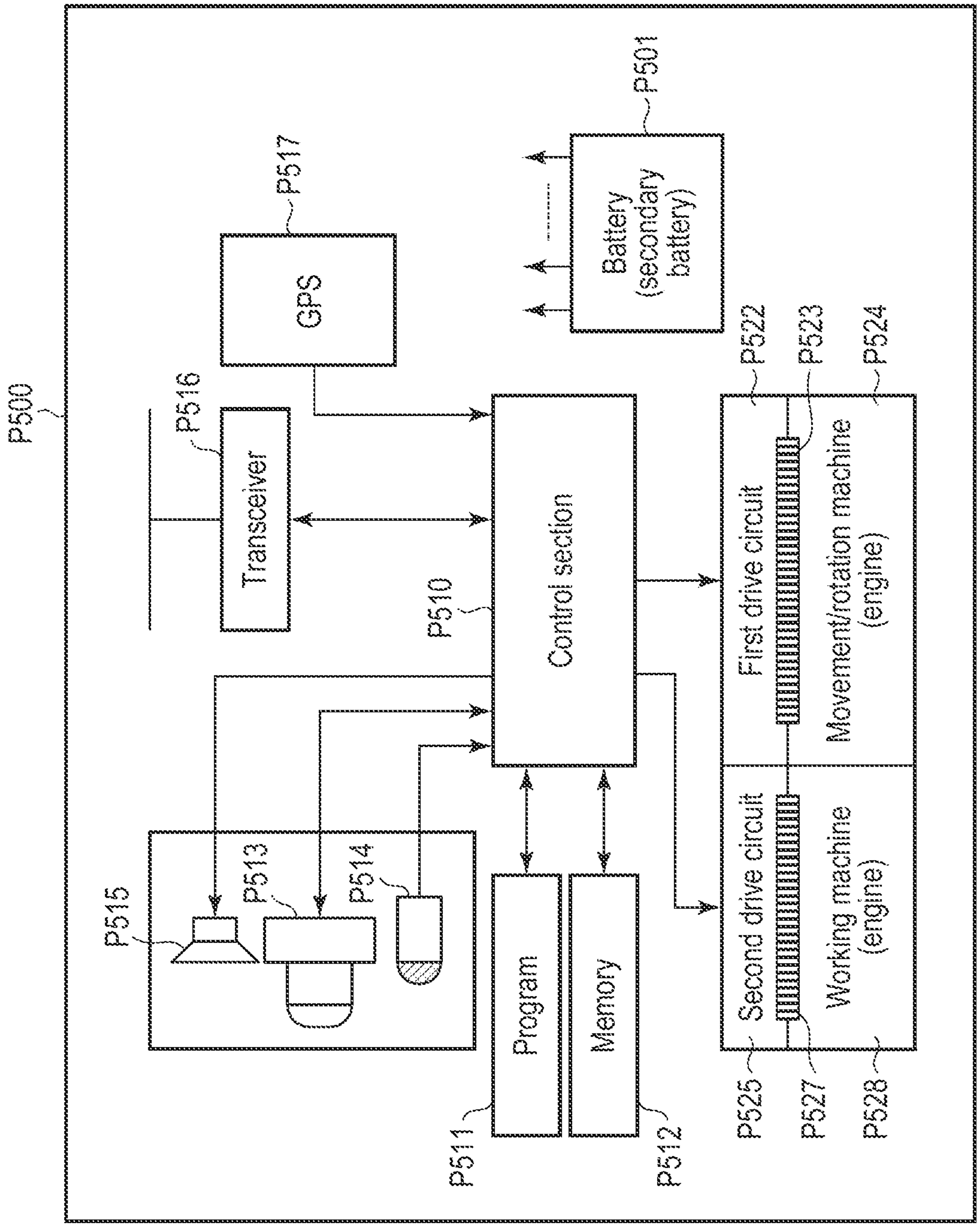

FIG. 22 illustrates a basic configuration of an automated traveling vehicle and drone (hereinafter, simply referred to as a robot) P500. For automated traveling or automated flight, for example, a rechargeable secondary battery is used as a battery P501 that is a power energy source. A control section P510 controls the entire operation. The control section P510 controls the entire program of a program section P511 according to a reading program procedure. The control section P510 controls, for example, a video camera P513, and stores captured video data in a memory P512 or transmits the captured video data to the administrator of the cyberspace and/or the robot via a transceiver P516. Furthermore, information such as the remaining power of the battery P501 or a predicted work time in the future is also transmitted to the cyberspace and the administrator. The transceiver P516 also has a short-distance wireless communication function, Wi-Fi (registered trademark), and a beacon wireless communication function. Therefore, the robot can also communicate with the mobile terminal.

Furthermore, the control section P510 receives a signal from a GPS function P571 and grasps its own traveling position or flight position. The position information is also transmitted to the cyberspace and/or the administrator, for example, at intervals of five seconds to 10 seconds. The control section P510 controls a first drive circuit P522 and controls a movement/rotation mechanism (engine) P524. By the control, the robot P500 can freely move according to the program or by autonomous determination.

The autonomous determination is, for example, determination that the robot moves in a direction away from a dangerous area when the ambient temperature obtained by a temperature sensor (not illustrated) becomes abnormally high and a danger approaches the robot itself. Such an operation based on the autonomous determination is stored in the program section P511 in advance as a basic program (which may also be referred to as a reflex type program). In addition, there is a basic program that moves in an intended movement direction while avoiding an obstacle in a case where the obstacle appears in the movement direction and is detected by the camera P513.

Furthermore, an execution program (which may also be referred to as a thought type program) for causing the robot P500 to perform an activity according to the purpose is in the program section P511, and can be rewritten. For example, in a factory, an execution program for performing assigned work is installed in the program section P511, and when going out (at the time of dispatch), an execution program corresponding to the dispatch purpose is installed in the program section P511. For example, an execution program such as monitoring the surroundings to perform traffic control, delivering a medical product to an injured person, or delivering a life-saving tool to a disaster victim, or a combination program thereof is installed in the program section P511.

Examples of the movement/rotation mechanism P524 include a wheel for automated traveling, a walking leg, a caterpillar, and the like, and there are various types of movement/rotation mechanisms P524. Therefore, the type of the movement/rotation mechanism P524 can be replaced depending on the work site. When the replacement is performed, an adapter mechanism P523 is used between a robot main body and the movement/rotation mechanism P524.

The control section P510 can control a working machine P528 via a second drive circuit P525. For example, since there are various types of working machines P528 according to a work content, replaceable measures are taken. When the replacement is performed, an adapter mechanism P527 is used between the robot main body and the working machine P528.

Figure 23:
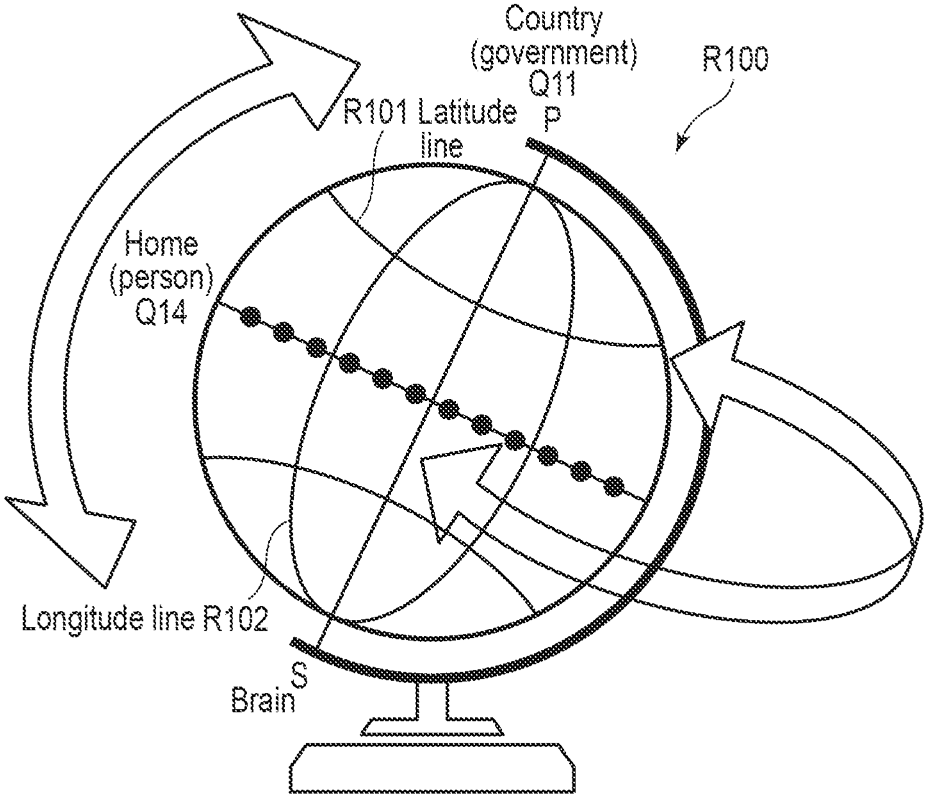
FIG. 23 is an explanatory diagram illustrating an example of a management method for an edge computer (which may also be referred to as a gateway).
Figure 24:
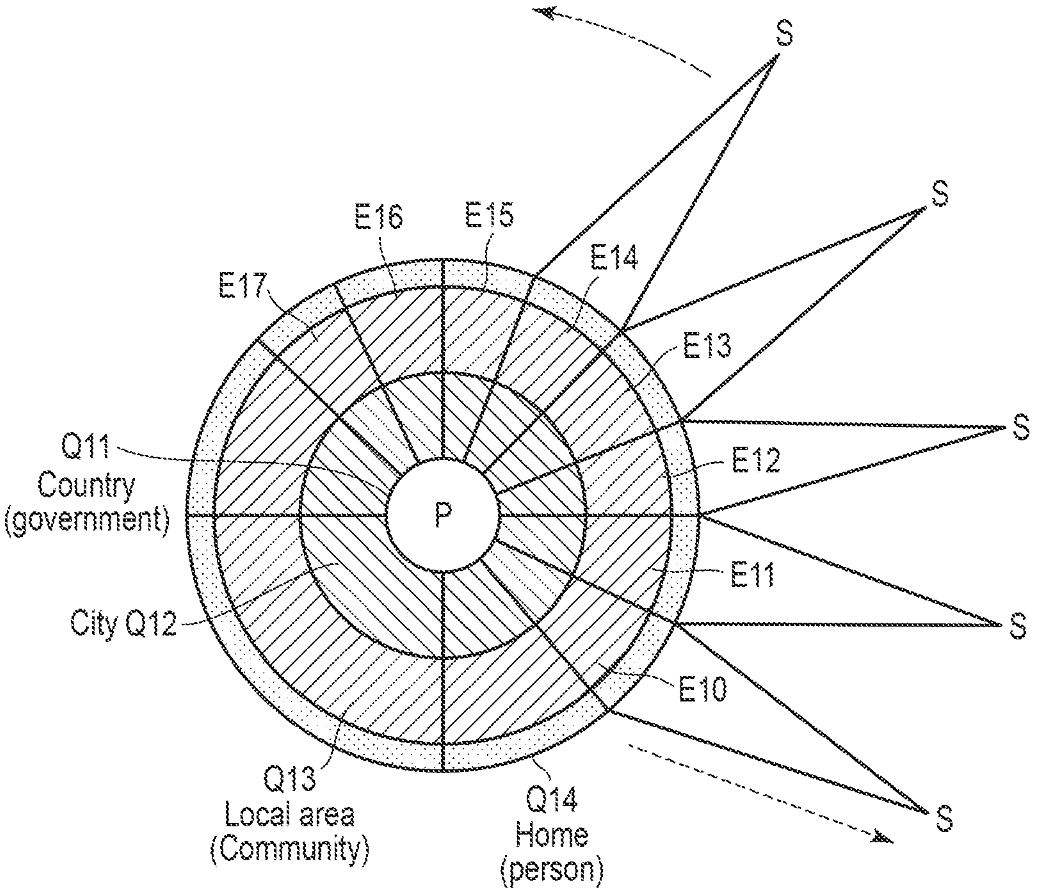
FIG. 24 is also an explanatory diagram illustrating the example of the management method for the edge computer, and continues from FIG. 23.

FIGS. 23 and 24 illustrate an example of an edge computer management method. Various data from a large number of edge computers in the physical space E100 are uploaded to the cyberspace E200. For this reason, in the cyberspace E200, it is necessary to manage the edge computer and properly manage a source of the data or a transmission destination of feedback data.

A basic concept will be described with reference to FIGS. 23 and 24. First, a globe R100 is divided into the northern hemisphere and the southern hemisphere with the equator as a boundary. Next, the surface of the globe R100 is two-dimensionally divided into a horizontal line (latitude line R101) and a vertical line (longitude line R102).

That is, a portion of the north pole P is set as a country (government) P. On the other hand, a portion of the south pole S is set as a human brain. Furthermore, a portion corresponding to the equator is set as a home (person) Q14.

Then, with a plurality of latitude lines from the equator to the north pole P (the country (government) Q11), the surface can be divided into a plurality of stepwise regions of the home (person) Q14, a group of people (local area (community)) Q13, a city Q12, and the country Q11. In addition, with a plurality of latitude lines from the equator to the brain S, the surface can be divided into stepwise regions such as a career, sex, age, and skin, arm, foot, muscle, bone, organ, or brain of a human body. This type of information can be personal information and thus is treated as confidential information.

Next, as illustrated in FIGS. 23 and 24, a plurality of regions divided by a plurality of longitude lines can be allocated to information sources of the various types of businesses described above (the skill E10 of the master, the energy business E11, the information/communication business E13, the transportation business E14, the building management business E15, the advanced medical care/preventive medical care (including precision medical care) business E17, the infrastructure (including roads, bridges, or the like) business E20, the agriculture business E23, the commercial (including distribution) business E29, the factory-related business E30, or the like).

In a case of the management as described above, when it is necessary to identify the edge computer and make the feedback loops between the same business type or different business types cooperate with each other, the management and control become easy.

As described above, the CPS can be effectively utilized for various service businesses in addition to various manufacturing processes.

Figure 25:
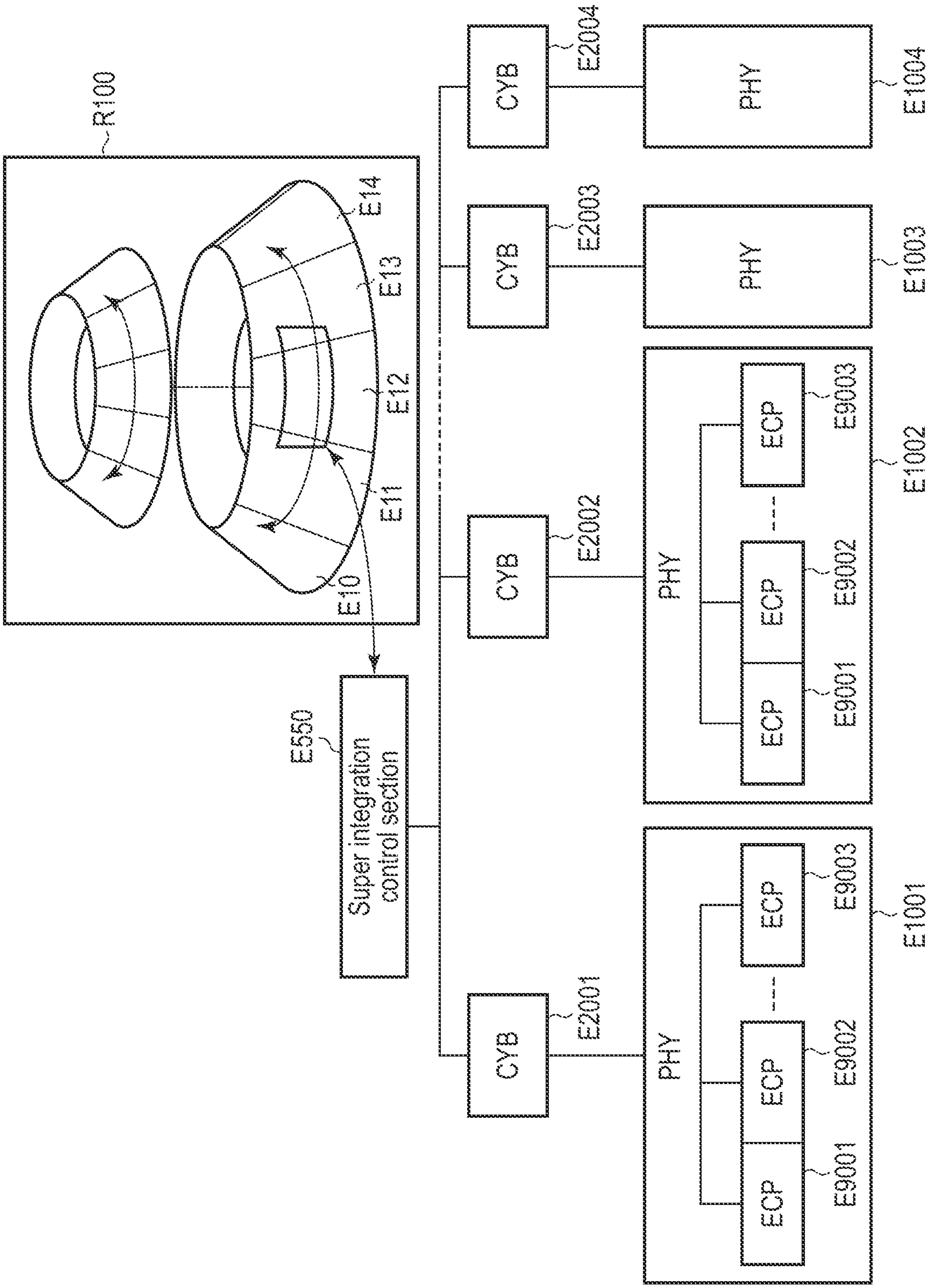
FIG. 25 is an explanatory diagram for describing an application example of a management system for the edge computer.

FIG. 25 is an explanatory diagram of a system that make pieces of data of a large number of cyberspaces cooperate with each other. In the business classification described above, the edge computer is used. For this reason, even if a large number of cyberspaces are generated, it is easy to make a large number of data in the cyberspaces cooperate with each other. That is, the cyberspace may be formed on a factory basis, on a regional basis, or on a country basis. As described above, in a case where a plurality of cyberspaces are generated, a super integration control section that mediates between a cyberspace and another cyberspace is required.

Therefore, as illustrated in FIG. 25, a super integration control section E550 that integrates cyberspaces E2001, E2002, E2003, E2004, and the like is installed.

The cyberspaces E2001, E2002, E2003, E2004, and the like manage edge computers E9001, E9002, E9003, and the like classified by the business type in the respective fields (see FIG. 24).

The super integration control section E550 is positioned at a higher level than the cyberspaces, and integrally manages the edge computers E9001, E9002, E9003, and the like managed by the cyberspaces E2001, E2002, E2003, E2004, and the like.

The super integration control section E550 can search for a factory that has achieved excellent environmental load suppression among factories of the same type or similar types (for example, an eighth factory and a ninth factory) in the cyberspaces E2001, E2002, E2003, E2004, and the like. For example, although the production efficiency is almost the same between the eighth factory and the ninth factory, when an average value of power consumption for several days is monitored, in a factory with a large power consumption and low production efficiency (for example, the ninth factory), the environmental load is not well suppressed.

In this case, the super integration control section E550 can compare a program and a parameter thereof used for a manufacturing process in an excellent factory (the eighth factory) with a program and a parameter thereof in another factory (a factory in which the suppression of the environmental load is poor (the ninth factory)) and detect different elements. Then, the ninth factory is notified of the different elements, and the suppression of the environmental load can be requested.

Figure 26:
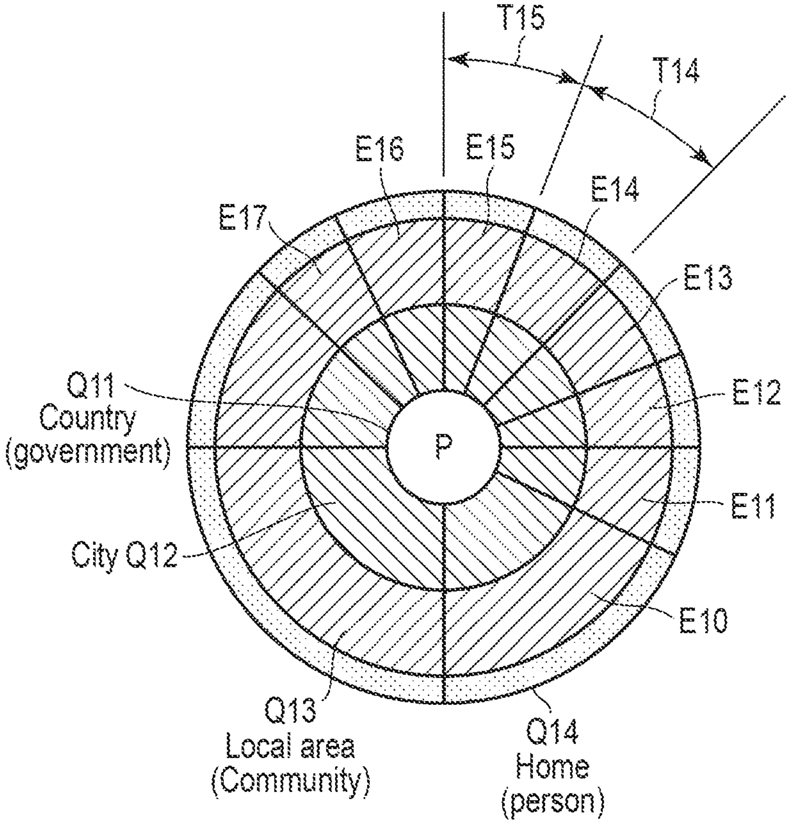
FIG. 26 is an explanatory diagram for describing another application example of the management system for the edge computer.

FIG. 26 is an explanatory diagram for describing another application example of a management system for the edge computer. The super integration control section E550 and the local integration control section E504 (see FIGS. 14A and 16A) belonging to a local cyberspace identify and manage the edge computer for each business type. For this reason, for example, power consumption for each business type can be classified as an aspect (or axis), the number of related workers can be classified as an aspect (or axis), and a related region can be classified as an aspect (or axis). Then, as illustrated in FIG. 26, for example, it is possible to visualize a power consumption amount for each business type, for example, by an image diagram of the northern hemisphere. As in the example of the drawing, power consumption amounts T14 and T15 are shown, and for example, it is possible to visually check which one of the transportation business E14 and the building management business E15 uses more power. In addition, it is also possible to compare the power consumption between the businesses at a local level or a global scale level. Furthermore, by devising the use of the integration control section, it is also possible to observe the distribution of the power consumption for each of the plurality of stepwise regions of the home (person) Q14, the group of people (local area (community)) Q13, the city Q12, and the country Q11. The super integration control section E550 and the local integration control section E504 may be integrated. Alternatively, there may be a control section for energy information processing for each business type.

That is, the system is an information management system that manages a plurality of cyberspaces and an edge computer of a physical space connected to each cyberspace, in which the first control section classifies the edge computer into classification categories by which a business type to which the edge computer belongs is identified. In addition, the second control section executes data processing of identifying the power consumption information transmitted from the edge computer for each business type.

Although an energy use amount is observed in the above description, it is also possible to estimate distribution of the number of workers, distribution of occupied areas (sizes), capital distribution with reference to external information, and the like. Furthermore, the above idea is also applicable to a relationship between a single cyberspace and a plurality of edge computers.

Figures 27A, 27B:
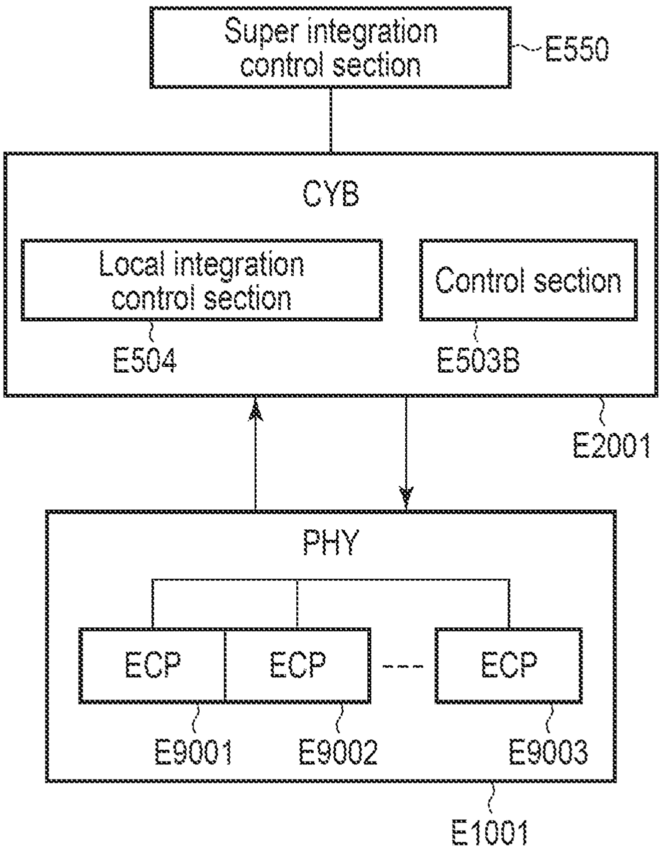
FIG. 27A is an explanatory diagram illustrating an example of a management method for a sensor and/or the edge computer.
FIG. 27B is an explanatory diagram illustrating an example of a management table for the sensor and/or the edge computer.

FIG. 27A is an explanatory diagram illustrating an example of a management method for a sensor and/or the edge computer. Each of the edge computers E9001, E9002, and E9003 in a physical space E1001 transmits information of a sensor (IoT device) to the cyberspace E2001. At this time, identification information of the sensor (IoT device) is also transmitted. Therefore, the local integration control section E504 of the cyberspace E2001 can grasp what type of sensor is used in the physical space E1001, and can classify and manage the sensor for each edge computer.

FIG. 27B illustrates an example of a table TA1 with which, for example, the local integration control section E504 manages the sensors used in the physical space E1001. The local integration control section E504 can detect a case where a new edge computer is added or a case where the edge computer is removed by using the table TA1. In addition, the local integration control section E504 can easily manage a case where the sensor controlled by the edge computer is removed or a case where a new sensor is added.

As described above, in a case where a disaster occurs in an urban area, the edge computer may disappear from management information, and in a case where the urban area recovers, a new edge computer may be added to the management information. As described above, by accurately managing the states of the edge computer and the sensor, it is possible to create manufacturing and sales information of a product (for example, the sensor) in terms of service, and it is possible to stably manage an increase and decrease in environmental load information in terms of environment.

As described above, the system focuses on various feedback loops used in various businesses. It has been described that various feedback loops can be combined or some feedback loops can be opened from a combination of feedback loops.

Hereinafter, a feedback loop manager that enables more effective and efficient use of the feedback loop is described. The feedback loop manager is provided in the platform K100 (FIG. 2A) of the cyberspace (in the system control section E300 in FIG. 4).

In a manufacturing/assembling facility or a distribution facility, the feedback loop is most utilized for robots. The feedback loop is employed in a servo mechanism of a robot.

In a facility at a product manufacturing/assembly site, the performance of a robot (that is, a feedback loop assembly) affects product manufacturing/assembly efficiency, product quality, and worker safety. In a product distribution facility, product distribution efficiency and worker safety are affected by performance of a robot (that is, a feedback loop assembly). Furthermore, the performance of a feedback loop used for a mobile object (that is, a robot) such as an unmanned vehicle or a drone used in a service field affects the stability, safety, and accuracy of control of the mobile object.

Therefore, the following description specifically describes the feedback loop manager that can evaluate performance of a feedback loop and select a capable feedback loop.

The feedback loop manager can use data generated and used in a feedback loop to evaluate the feedback loop.

The data generated in the feedback loop includes various types of sensor output data used in the feedback loop, control data (for example, a difference value between a target value and the sensor output data) generated based on the sensor output data and the target value, and the like. The data used in the feedback loop includes the target value.

Figure 28A:
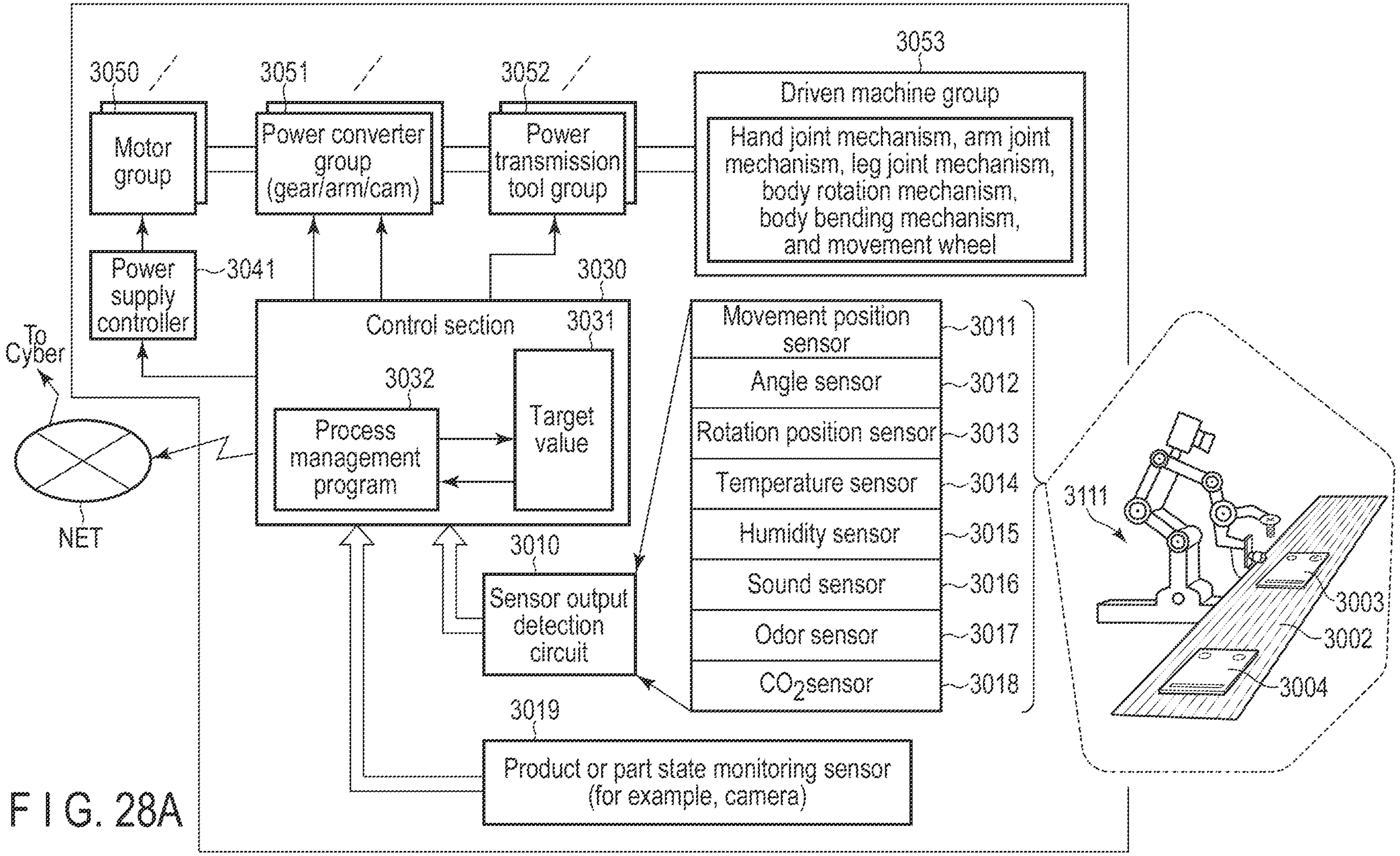
FIG. 28A is an explanatory diagram illustrating an example of a control system for a robot operating in a factory in the physical space.

FIG. 28A illustrates a state in which a robot 3111 attaches screws to substrates 3003 and 3004 conveyed by a belt conveyor 3002. In order to control a posture of the robot 3111, various sensors are arranged on and around the robot 3111. In this example, a movement position sensor 3011, an angle sensor 3012, a rotation position sensor 3013, a temperature sensor 3014, a humidity sensor 3015, a sound sensor 3016, an odor sensor 3017, and a Co2 sensor 3018 are illustrated as examples. A state monitoring sensor (for example, a camera) 3019 is also provided.

The movement position sensor 3011 detects a standing position of the entire robot 3111, for example, and detects whether or not the robot 3111 is positioned at a predetermined movement position with a mark on the floor, for example. As the movement position sensor 3011, for example, a position detection unit using mark detection by a camera, a GPS, a beacon, Wi-Fi (registered trademark), pedestrian dead reckoning (PDR), an indoor messaging system (IMES), ultrasonic wave, or the like is used.

The angle sensor 3012 is arranged on a head, an arm, a foot, a body, and the like of the robot, and is used to detect an angle indicating an orientation (upward, downward, left, right, or front) of the head (face), a flexion angle of each joint of the finger, the wrist, the arm, or the foot, a bending angle of the body, and the like.

The rotation position sensor 3013 is used to detect a rotation angle of each joint of the wrist, the arm, or the foot, a rotation angle of the body, and the like.

The temperature sensor 3014 and the humidity sensor 3015 are used to detect the temperature and humidity around the robot, the temperature and humidity of the work room, and the temperature around a motor used in the robot.

The sound sensor 3016 is used to pick up a spatial sound of a workplace around the robot 3111 and a sound generated near a part controlled in each feedback loop. The odor sensor 3017 is used to detect an odor generated in a space in the workplace around the robot 3111 and an odor generated near the part controlled by each feedback loop.

The detection output from the sensor is transmitted to a robot control section 3030 via a sensor output detection circuit 3010. The sensor output detection circuit 3010 and the control section 3030 are connected in a wired or wireless manner.

The control section 3030 includes a process management program processing section 3032 and a target value memory 3031. The process management program 3032 sets a procedure of behavior of the robot 3111. In order to control the behavior of the robot 3111, the control section 3030 controls a motor group 3050 provided in the robot 3111 via a power supply controller 3041. Rotation of the motor group 3050 is performed by converting rotational power into power in a desired direction by a power converter group 3051. The power converter group 3051 thus includes a gear, a belt, an arm, a cam, and the like. The converted power is transmitted to a driven machine group 3053 (a hand joint mechanism, an arm joint mechanism, a leg joint mechanism, a body rotation mechanism, a body bending mechanism, and a movement wheel of the robot) via a power transmission tool group 3052 (an arm, a belt, a pulley, a wire, a hinge, and the like).

With the control loop described above, it is possible to freely control the behavior such as the posture, orientation, and movement of the robot 3111.

When the robot 3111 moves, feedback data from a sensor group that detects the state is processed by the process management program 3032. The process management program 3032 reads the target value of each sensor from the target value memory 3031, compares the target value with the feedback data (sensor output), and obtains the difference value. If the difference value is equal to or smaller than an allowable value, it means that the posture is controlled to a target posture. However, in a case where the difference value exceeds the allowable value, the motor group 3050, the power converter group 3051, and the power transmission tool group 3052 are controlled, and the control is continued in such a way that the difference value becomes equal to or smaller than the allowable value (the feedback loop group is controlled).

Various pieces of data handled by the control section 3030 are transmitted to the cyberspace E200 via a network NET.

Figure 28B:
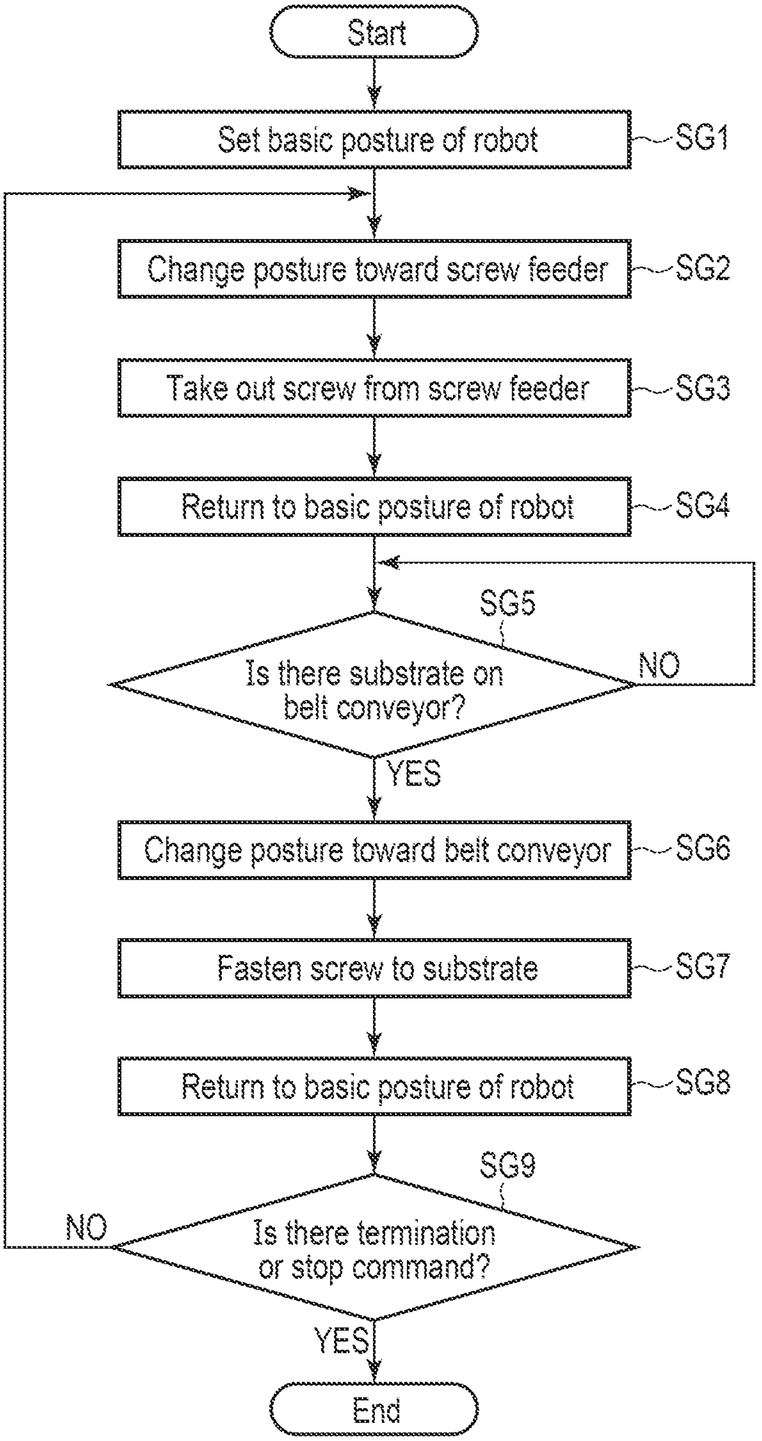
FIG. 28B is a flowchart illustrating an operation process of the robot.

FIG. 28B is a flowchart for describing basic behavior of the robot 3111.

SG1: When the process management program 3032 starts, the robot 3111 is first set to be in a basic posture (initial posture). For this purpose, the process management program 3032 reads and prepares the target value from the target value memory 3031, compares initial data of each sensor with the target value, controls the motor group 3050, the power converter group 3051, and the power transmission tool group 3052 according to the difference value, and performs control in such a way that the difference value is equal to or smaller than the allowable value (performs feedback loop control).

SG2: Next, the process management program 3032 performs control for changing posture control in such a way that the robot 3111 faces a screw feeder (not illustrated).

SG3: Next, the process management program 3032 performs control in such a way that the robot 3111 grips and takes out a screw from the screw feeder (not illustrated).

SG4: Next, the process management program 3032 performs control in such a way that the robot 3111 returns to the basic posture.

SG5: Next, the process management program 3032 performs processing of determining whether or not there is a substrate on the belt conveyor by using the camera mounted on the robot 3111.

SG6: In a case where it is determined that there is a substrate on the belt conveyor, the process management program 3032 controls the posture of the robot 3111 toward the belt conveyor, and performs robot state control in such a way that the hand is positioned near the substrate by extending the arm.

SG7: Next, the process management program 3032 rotates the arm of the robot 3111 to perform screw tightening control on the substrate.

SG8: Next, the process management program 3032 performs control in such a way that the robot 3111 returns to the basic posture.

SG9: Next, the process management program 3032 determines whether or not there is a termination or stop command. In a case where there is no termination or stop command, the processing returns to step SG2, and the robot 3111 is caused to perform the next screw tightening operation.

In a case where there is a termination or stop command, screw tightening work for the robot 3111 is terminated. The termination or stop command is designed to be generated when the process management program 3032 receives an input from the outside or when a substrate image from the camera cannot be acquired within a certain period of time.

In each of the steps SG1, SG2, SG3, . . . , and SG9 described above, a state in which the feedback loops (bundled feedback loops) of the plurality of sensors operates integrally to control the robot has been described.

Figure 28C:
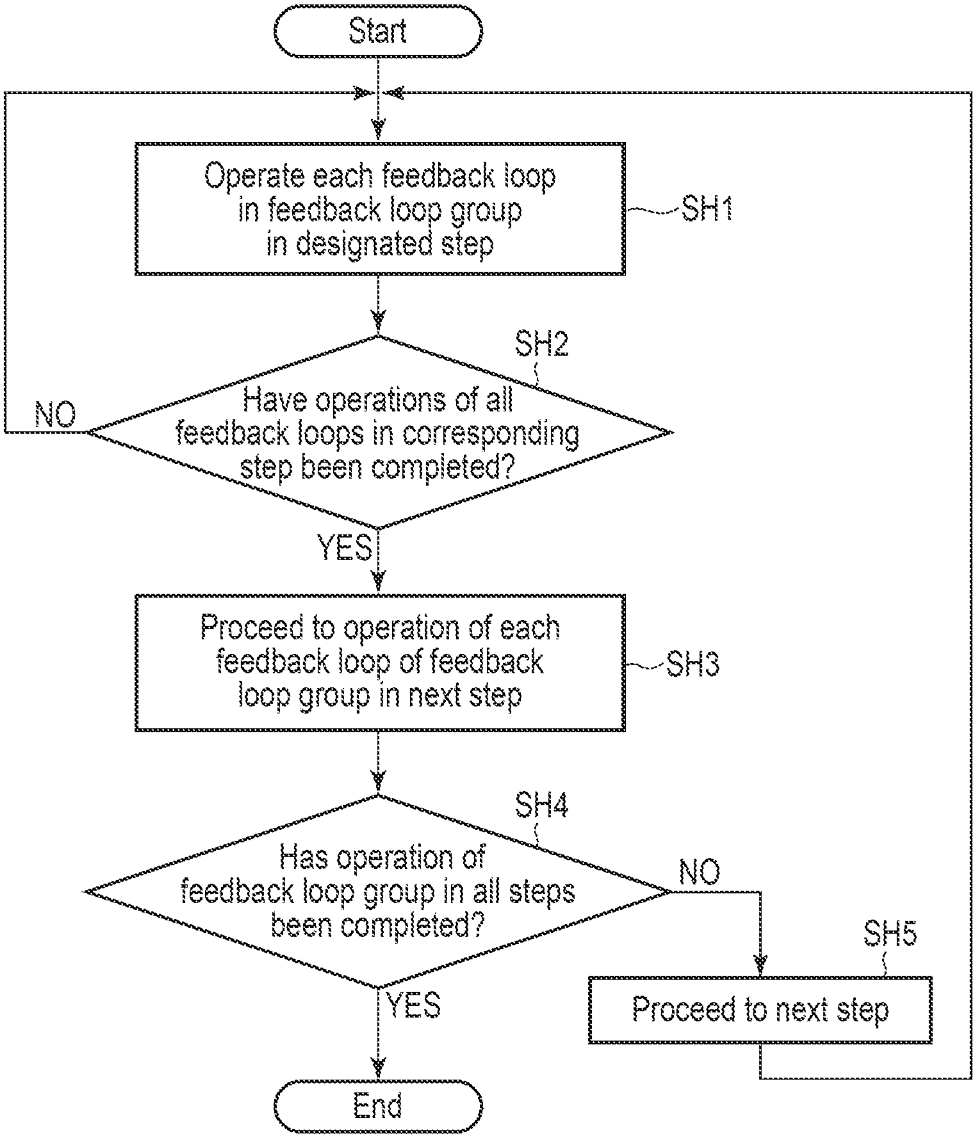
FIG. 28C is an explanatory diagram illustrating an example of a data processing process for the feedback loop for controlling the operation of the robot.

FIG. 28C illustrates an operation in a further intermediate layer of the process management program 3032. That is, FIG. 28C illustrates a state in which operations of a plurality of feedback loops that operate based on outputs of a plurality of sensors are performed in a plurality of steps.

SH1: There is an operation start command, and the operation of the feedback loop group in a designated step (SG1, SG2, . . . , or SG9 in the above example) is started. In order to control the robot, a plurality of feedback loops with various sensors are operated simultaneously or with a time lag.

SH2: Determination is made as to whether the operation of the necessary feedback loop group has been completed in the current step. In a case where the operation has not been completed, SH1 and SH2 are repeated. The determination in SH2 corresponds to, for example, determination as to whether or not the basic posture described above has been set or whether or not the posture of the robot has been changed toward the screw feeder.

SH3: If YES in SH2, the processing proceeds to the operation of each feedback loop of the feedback loop group in the next step.

Furthermore, at this time, a required time for the processing of one of steps SG1, SG2, SG3, . . . , and SG9 is also measured and recorded.

SH4: It is determined whether or not the operation of the feedback loop group has been completed in all steps (SG1, SG2, SG3, . . . , and SG9), and in a case where the operation has not been completed, the processing proceeds to the next step in SH5. However, in a case where the processing in the last step is completed (in the above example, in a case where the stop command is input in SG9), the operation stops.

Figure 28D:
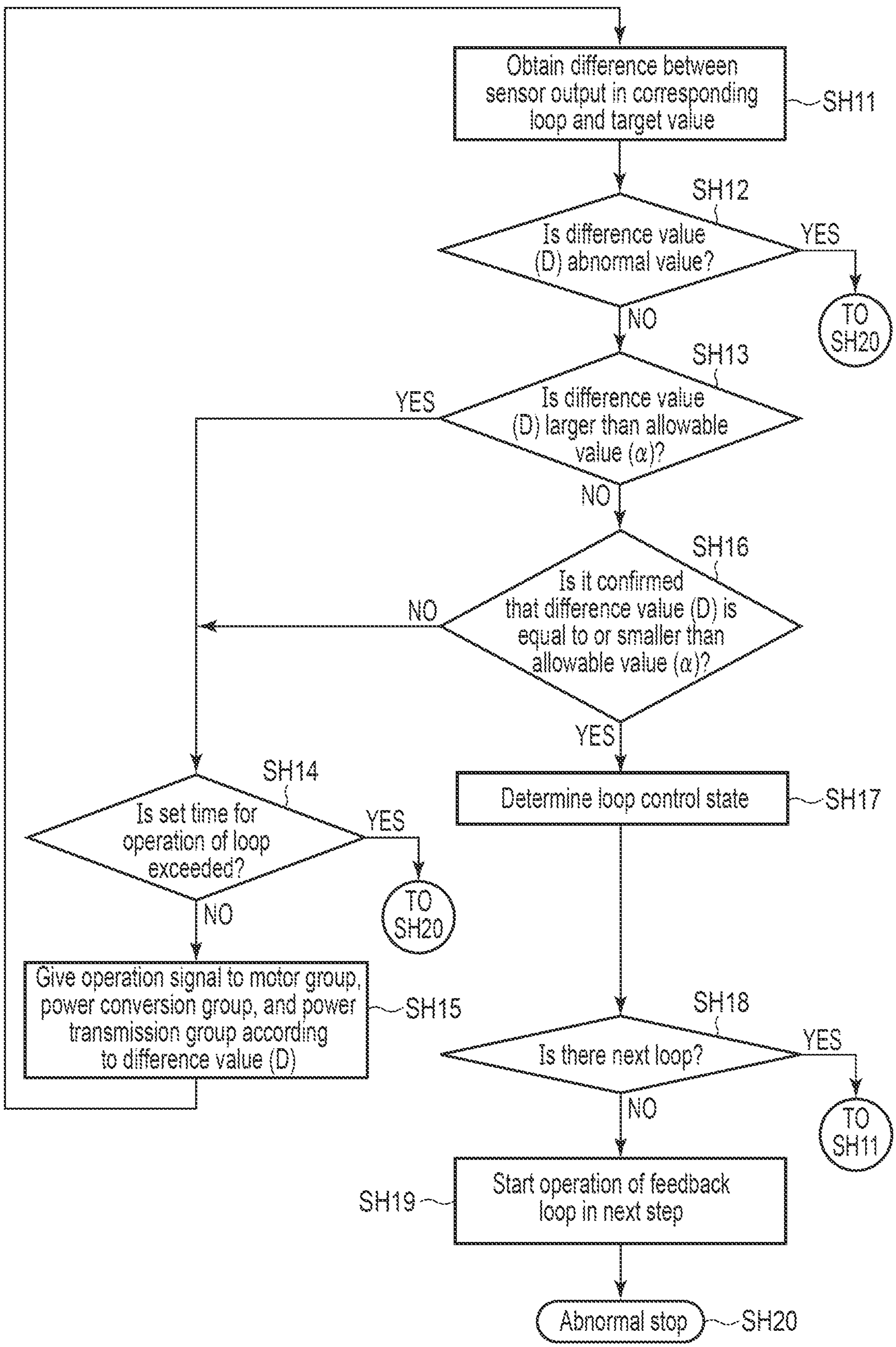
FIG. 28D is an explanatory diagram illustrating an example of an operation in lower layers SH1 and SH2 of a process management program 3023 of FIG. 28C.

FIG. 28D illustrates an operation in a lower layer of the process management program 3032. That is, steps SH11 to SH20 included in steps SH1 and SH2 described above are illustrated.

SH11: A difference between a sensor output of a feedback loop to be currently operated and a target value thereof is obtained.

SH12: Abnormal (emergency) stop is performed (SH20) in a case where the difference value (D) is significantly larger than an allowable value ($\alpha$) and is an abnormal value (greatly deviated from the target value).

SH13: In a case where the difference value (D) is not an abnormal value but is larger than the allowable value ($\alpha$), the loop processing of SH13, SH14, SH15, SH11, and SH12 is repeated to set the difference value (D) to the allowable value ($\alpha$). However, in a case where a set time for the operation of the loop is exceeded (determined in SH14), abnormal stop is performed (SH20). This means that the feedback loop is abnormal.

SH16: In a case where it is found that the difference value (D) is smaller than the allowable value (α) in SH13, it is reconfirmed that the difference value (D) is equal to or smaller than the allowable value (α). The allowable value (α) is not a fixed value but a value having a slight variation range (variation level) to some extent, and various values in the slight variation range are values that can be used to determine the performance of the loop or the state of the robot.

SH17: In a case where the reconfirmation is made in SH16, the control state of the loop is determined, and the difference value (D) is stored.

SH18: Whether or not there is a next feedback loop for which the difference value needs to be obtained is determined, and in a case where there is a next feedback loop, the processing proceeds to SH11.

SH19: In a case where there is no next feedback loop, the operation of the feedback loop group in the next step (SG2, . . . , or SG9) is started in SH19.

As described above, the operation of the feedback loop group in each step is executed, so that the robot implements a desired motion.

Figure 29:
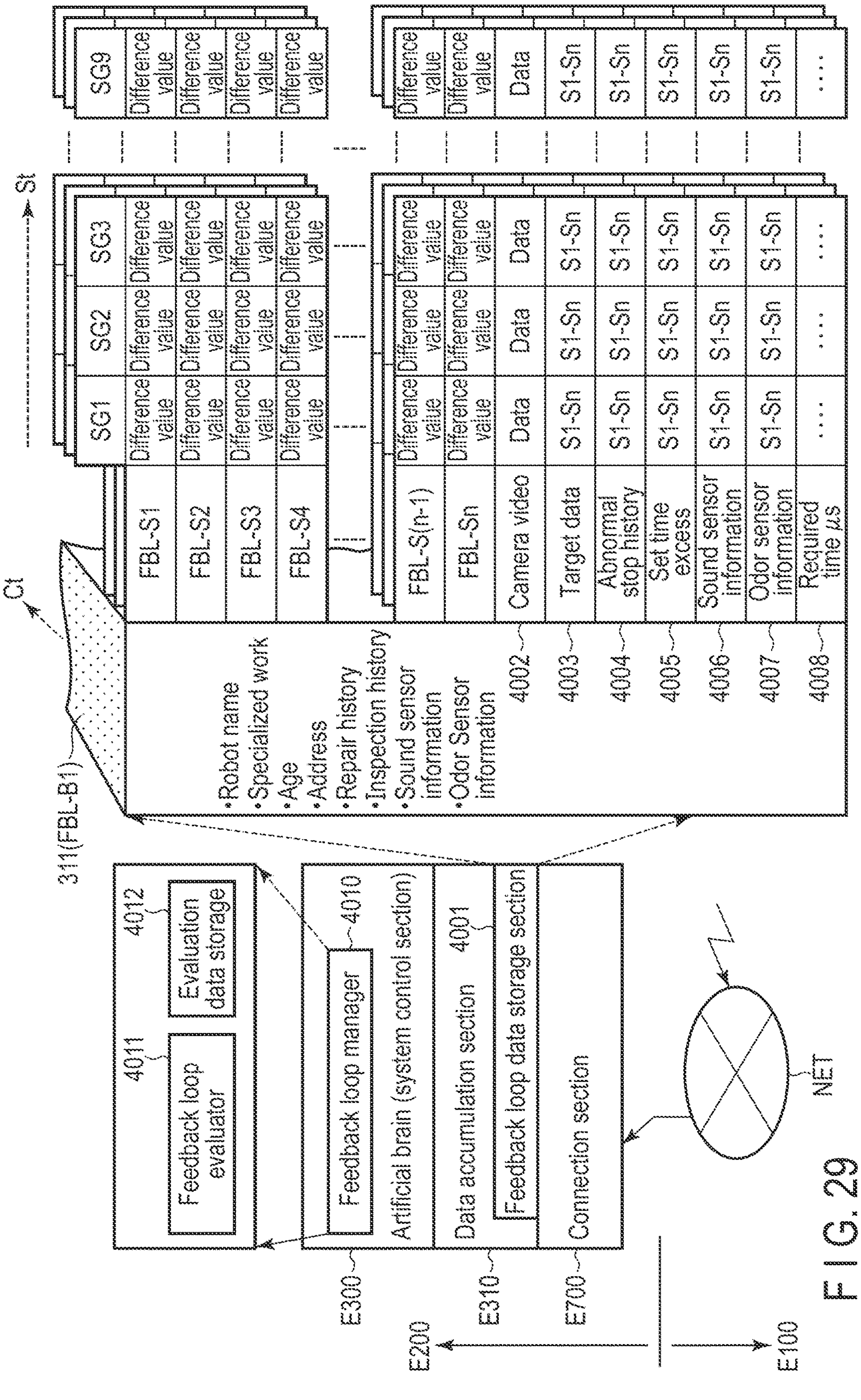
FIG. 29 is an explanatory diagram illustrating a state in which data of the feedback loop of the robot is stored in a data accumulation section of the cyberspace E200.

FIG. 29 illustrates a state in which the feedback loop data is accumulated in a feedback loop data storage section 4001 of the data accumulation section E310 of the cyberspace E200 based on the robot control described above. In a table illustrated on the right side of FIG. 29, the types of various feedback loops are indicated as FBL-S1, FBL-S2, FBL-S3, . . . , and FBL-Sn in the vertical direction, and steps SG1 to SG9 for the motion of the robot are indicated in the horizontal direction.

The feedback loop data (also referred to as accumulated data or specific information) includes a robot name, specialized work of the robot, an age (years of use), an address (an arranged factory address and a place in the factory), a repair history, and an inspection history. Furthermore, a difference value (a specific value equal to or less than the allowable value α, an abnormal value, or the like) during operation of each feedback loop (FBL-S1, FBL-S2, FBL-S3, . . . , or FBL-Sn) obtained in steps SG1 to SG9 described above is described. An arrow St in the drawing indicates a direction of steps SG1 to SG9 in FIG. 28, and an arrow Ct in the drawing indicates repetition (for example, repeating a process of gripping the screw at the basic posture, attaching the screw to the substrate, and returning to the basic posture) of the basic operation of the robot.

Therefore, the accumulated data (specific information) includes, for which robot, at which step and which feedback loop has abnormally stopped, which feedback loop has exceeded the set time, which sound has been generated in which feedback loop, which odor has been generated in which feedback loop, and the like. In addition, the "difference value" obtained in each feedback loop is also included in the accumulated data. The "difference value" is data at a time point when it is detected that the difference value is equal to or smaller than the allowable value α.

Furthermore, a camera video 4002 of the robot, a target value 4003 described above, an abnormal stop history 4004, and a set time excess history 4005 in a case where the maximum time (set time) of the operation of the loop is exceeded are also stored.

Furthermore, a required time for the processing of one of steps SG1 to SG9 is also recorded in the table.

FIG. 29 illustrates the inside of the artificial brain E300 in a simplified manner for the sake of explanation. In FIG. 2A, a feedback loop manager 4010 is provided in the platform and corresponds to the information acquisition section K111 that acquires specific information via a feedback loop, the information analytics section K112 that analyzes the specific information, and the like. In addition, in FIG. 4, the feedback loop manager 4010 corresponds to the acquisition section E501, the analytics section E502, the control section E503, and the like inside the autonomous control section E500.

The feedback loop manager 4010 reads data in the storage section 4001 and evaluates the feedback loop. An evaluation content and an evaluation method differ depending on the purpose of using the result.

<Determination of Robot Characteristics Based on Evaluation of Feedback Loop>

The above accumulated data is effective data for evaluating the feedback loop and determining, for example, the characteristics of the robot based on the evaluation result. As the "difference value" decreases, the control accuracy of the robot (the operation position of the robot is extremely close to a planned position) is high and relatively stable. It is necessary to consider that the larger the "difference value", the rougher the control of the robot is, or the set target value deviates, or the sensor output value or the sensor attachment position deviates. In a case where the "difference value" changes from small to large with the lapse of time, it is necessary to consider that the control accuracy of the robot changes from high to low.

Furthermore, a robot whose required time for one of steps SG1 to SG9 is short can be determined to have favorable work efficiency.

The feedback manager 4010 of the artificial brain (system control) E300 includes a feedback loop evaluator 4011 and an evaluation data storage 4012.

The feedback loop evaluator 4011 refers to data of the feedback loop data storage section 4001 described above, evaluates the characteristics of each robot, and stores the evaluation data in the evaluation data storage 4012. The characteristics of the robot can be evaluated, for example, according to a work content of the robot. That is, it is possible to cause the robot to perform various types of work and to prepare the target value according to the work.

The accumulated data described above can also be effectively used when robots of the same model are compared.

For example, as a test case, a target value when one robot is operated is used as a target value when another robot is operated. Then, the two robots are caused to perform the same work. Thereafter, the pieces of feedback loop data (accumulated data) of the respective robots are compared.

In a case where there is a difference in accumulated data between the first robot and the second robot, it can be found in which work step a difference occurs in the difference value of which feedback loop. This may be an influence of a robot mechanism to which the feedback loop relates, for example, in the second robot in which the feedback loop in which a difference in difference value has occurred is deployed. Therefore, in a case where repair or inspection of the second robot is performed, the "difference in difference value" is effective reference data. In addition, the "difference in difference value" can be used as reference data in a case of manufacturing the next third robot.

As another example, the target value of the feedback loop of the first robot may be adjusted by the master. The adjusted target value may be used as the target value of the feedback loop of the second robot. Thus, the skill of the master can be implanted from the first robot to the second robot.

As still another example, there are many cases where the feedback loops are bundled and used or the bundled feedback loops are separated and used according to the work content of the robot. In this case, the accumulated data of each feedback loop and the target value corresponding to the accumulated data are variously provided according to the use environment of the robot, so that switching of the work of the robot and the use of a combination of a plurality of robots become smooth.

As described above, in the feedback loop in the system, the data (target value) used in the feedback loop, the difference value between the sensor of the feedback loop and the target value, the required time for one step of the machine (robot) operation including the control of a plurality of feedback loops, and the like are accumulated as reference data, which enables evaluation of at least one feedback loop.

The CPS described above has many useful features in various aspects. The summary is described below.

A1) An information management system that autonomously performs operation control in a manufacturing process and/or a service, the information management system including:

a loop connection section that constructs a first feedback loop of a cyber-physical system;

an information acquisition section that acquires specific information necessary for the manufacturing process from the first feedback loop;

an information analytics section that analyzes the specific information;

an autonomous operation control section that autonomously performs the operation control based on an analytics result acquired by the information analytics section; and a loop cooperation control section that forms a new second feedback loop constructed by cooperation of the loop connection section and the autonomous operation control section, in response to the analytics result that is new.

The new second feedback loop may be a restarted feedback loop that has existed so far but has not been used. Alternatively, the new second feedback loop may be a feedback loop in which a new feedback loop that has not existed so far is formed. Alternatively, the new second feedback loop may be a feedback loop formed by bundling a plurality of feedback loops. Alternatively, the plurality of feedback loops may be any one of a bundle of an existing feedback loop and a new feedback loop, a bundle of a plurality of existing second feedback loops, or a bundle of a plurality of new feedback loops.

A2) The information management system according to (A1), in which the information analytics section and the loop connection section construct the first feedback loop as a first control loop for controlling a first control target that is the manufacturing process, and the information analytics section and the loop cooperation connection section construct the second feedback loop as a second control loop for controlling a second control target different from the manufacturing process.

A3) The information management system according to (A2), in which the information analytics section and the loop cooperation control section release the second feedback loop in a case where a control purpose of the second feedback loop is completed.

A4) The information management system according to (A2) or (A3), in which the information analytics section and the loop cooperation control section analyze a result of control by the second feedback loop, and further construct a third feedback loop as a third control loop for controlling a third control target different from the control targets of the first control loop and the second control loop according to a content of the analytics.

A5) The information management system according to any one of (A1) to A4), in which loop control by at least the first feedback loop and the second feedback loop is applied to a power generation control system of a power plant.

A6) The information management system according to any one of (A1) to (A4), in which the loop control by at least the first feedback loop and the second feedback loop is applied to a control system of any one of a car and a home appliance.

A7) The specific information further includes skilled person adjustment data obtained by experience and/or skill with respect to basic data.

A8) The specific information includes human five-sense information, is generated by analyzing data acquired from a biological sensor attached to a human, or includes at least one of renewable energy production information, consumption information, or environmental load information, the feedback loop includes a digital twin (digital double) constructed with personal information, the information analytics section analyzes the specific information based on a master data model that models ability and experience of a human, the autonomous operation control section selects a manufacturing line optimum for manufacturing a target product based on the analytics result, the manufacturing line has at least a 3D printing function and manufactures the product based on the specific information including at least a product manufacturing request from a remote source, or the manufacturing process includes a first manufacturing process and a second manufacturing process, and the autonomous operation control section includes a unit configured to reflect first specific information obtained in the first manufacturing process in a feedback loop of the second manufacturing process, or includes a combination of the above items.

B1) A method for forming an apparatus that forms a cyberspace of a cyber-physical system, the method including:

a loop connection step of connecting a first feedback loop of the cyber-physical system;

an information acquisition step of acquiring specific information necessary for a manufacturing process and/or a service from the first feedback loop;

an information analytics step of analyzing the specific information;

an autonomous operation control step of autonomously performing the operation control based on an analytics result acquired by the information analytics section; and a loop cooperation control step of constructing a new second feedback loop in response to a new analytics result of the autonomous operation control step, the loop cooperation control step being included in the loop connection step.

C1) An apparatus that forms a cyberspace of a cyber-physical system. A loop connection section that connects a feedback loop of the cyber-physical system, an information acquisition section that acquires specific information necessary for a manufacturing process and/or a service business of a factory or a facility from the feedback loop, an information analytics section that analyzes the specific information, and an autonomous operation control section that autonomously performs operation control based on an analytics result acquired by the information analytics section are included. An integration control section of the autonomous operation control section has a function of issuing a command to cause the robot standing by in the factory or the facility to be dispatched to the outside of the factory or the facility.

C2) The integration control section of the autonomous operation control section refers to information from a police officer who is a skilled person as guidance information of a movement system path of the dispatched robot.

D1) An apparatus that forms a cyberspace of a cyber-physical system. A loop connection section, an information acquisition section, an information analytics section, and an autonomous operation control section are included, and the loop connection section is connected to a plurality of edge computers or gateways in a physical space and includes an integration control section that detects identity or difference between a first program obtained from a first edge computer or gateway and a second program obtained from a second edge computer or gateway.

D2) A unit configured to implant a parameter of a program used on one edge computer side to the other edge computer side according to the difference is included. D3) The implantation is performed from a first power plant to a second power plant. D4) The first and second power plants are plants using nuclear power, thermal power, and renewable energy.

E1) An apparatus that forms a cyberspace of a cyber-physical system. A loop connection section, an information acquisition section, an information analytics section, and an autonomous operation control section are included, and the loop connection section is connected to a plurality of edge computers or gateways in a physical space. A control section capable of autonomously providing different programs to the edge computers or the gateways according to movement positions of the plurality of edge computers or gateways is included.

E2) Each of the plurality of edge computers is mounted on an apparatus to be exported or imported. E3) A regional law for the movement position is different between a first movement position and a second movement position, and the different programs control a control target to conform to respective rules of the first movement position and the second movement position.

F1) An apparatus that forms a cyberspace of a cyber-physical system. A loop connection section, an information acquisition section, an information analytics section, and an autonomous operation control section are included, and the loop connection section is connected to a plurality of edge computers in a physical space. An integration control section that classifies and manages the plurality of edge computers according to a business type to which the edge computers belong. F2) The integration control section generates visualization data for comparing power consumption amounts transmitted from the plurality of edge computers. F3) The integration control section includes a unit configured to receive sensor identification data uploaded from the plurality of edge computers, arrange identification data of the plurality of edge computers and the identification data of the sensor managed by each of the plurality of edge computers in a table, and monitors the identification data to determine plug-in and plug-out.

G1) An apparatus that forms a cyberspace of a cyber-physical system. A loop connection section, an information acquisition section, an information analytics section, and an autonomous operation control section are included, and the loop connection section is connected to a plurality of edge computers in a physical space. An integration control section that classifies and manages the plurality of edge computers according to a business type to which the edge computers belong. A unit configured to calculate an amount of energy used for each business type and perform control for visualization is further included.

J1) (Vertical Integration) (FIG. 2A)

An information management system including:

an edge apparatus E900 of a physical space (E100);

a platform K100 of a cyberspace (E200);

a feedback loop provided between the edge apparatus and the platform;

an information acquisition section K111 that is provided in the platform and acquires specific information via the feedback loop;

an information analytics section K112 that analyzes the specific information; and an autonomous operation section K113 that causes an apparatus in the physical space to autonomously perform operation control and/or a service based on an analytics result obtained by the information analytics section.

J2) (Environmental Load Reduction)

In J1 described above, data obtained from the analytics result is data for reducing an environmental load caused by the operation of the apparatus, and is data for controlling any one or a combination of an air volume, a temperature, and a humidity of a surrounding environment of the apparatus. J3) (FIG. 12A) (Environmental Load Reduction) In J1 described above, data obtained from the analytics result is data for reducing an environmental load caused by the operation of the apparatus, and is data for controlling a power consumption amount of the apparatus. J4) (FIG. 12B) (Environmental Load Reduction) In J1 described above, data obtained from the analytics result is data for requesting an apparatus different from the apparatus to cooperate for reducing a power consumption amount to suppress the total power consumption caused by the operation of the apparatus and the different apparatus.

J5) (FIG. 2C) (Use of Five-Sense Information)

In J1 described above, data obtained from the analytics result is data for maintaining a quality of a product manufactured by the apparatus and/or for controlling a stable operation of the apparatus, and is data reflecting a part of five-sense information of a worker operating the apparatus. J6) (Flexibility (Including Use of Five-Sense Information and Environmental Load Reduction)) In J1 described above, data obtained from the analytics result is data for switching of a program used in the apparatus. J7) (FIGS. 2C and 5B) In J5 described above, the five-sense information of the worker is at least one or a combination of visual sense information, auditory sense information, tactile sense information, or olfactory sense information.

K1) (Vertical Integration+Service-Independent) (FIGS. 2A to 2E) (First Feedback Loop and Second Feedback Loop)

An edge apparatus E900 of a physical space E100, a platform K100 of a cyberspace E200, a service section K200 of the cyberspace E200, a first feedback loop provided between the edge apparatus and the platform, a second feedback loop provided between the edge apparatus and the service section, an information acquisition section K111 that is provided in the platform and acquires specific information via the first feedback loop, an information analytics section K112 that analyzes the specific information, an autonomous operation section K113 that causes an apparatus in the physical space to autonomously perform operation control and/or a service based on an analytics result obtained by the information analytics section, and a system-of-systems section K213 that is provided in the service section, receives detection information from the edge apparatus and/or information of the analytics result from the autonomous control section, and returns adjustment information regarding adjustment based on the detection information and/or the information of the analytics result into the edge apparatus via the second feedback loop are included.

K2) Any one or a combination of J2 to J7 described above can be applied to K1 described above. K3) (FIG. 2D) In (K1) described above, the second feedback loop K510 includes a user domain (K300) and the service section (K200) in the middle of the second feedback loop K510, and the adjustment information is affected by data input from the user domain (K300).

L1) (Horizontal Integration) (FIGS. 1B and 1C) and (FIGS. 14A to 14C)

An information management system including:

an edge apparatus E900 of a physical space E100;

a platform K100 of a cyberspace E200;

a first feedback loop provided between the edge apparatus and the platform;

a first information acquisition section K111 that is provided in the platform and acquires first specific information via the first feedback loop;

a first information analytics section K112 that analyzes the first specific information;

a first autonomous operation section K113 that causes a first apparatus in the physical space to autonomously perform operation control and/or a service based on a first analytics result obtained by the information analytics section;

a second feedback loop provided between the edge apparatus and the platform;

a second information acquisition section K111 that is provided in the platform and acquires second specific information via the second feedback loop;

a second information analytics section K112 that analyzes the second specific information;

a second autonomous operation section K113 that causes a second apparatus in the physical space to autonomously perform operation control and/or a service based on a second analytics result obtained by the information analytics section; and integration control sections E504 and E505 that determine a difference between the first analytics result and the second analytics result by causing the first and second autonomous control sections cooperate with each other, and reflect control data set according to the difference in the first apparatus or the second apparatus via the first or second feedback loop.

L2) (FIG. 14C) The control data is control data and/or a parameter related to a program used by the first apparatus or the second apparatus. L3) (Environmental Load Reduction) (FIGS. 15, 16A, and 16B) The control data is data regarding a reusable material, part or apparatus or a recyclable material, part, or apparatus. L4) (FIGS. 17A, 17B, and 18) In a case where the second apparatus further transmits information regarding a support request related to manufacturing of a product, the integration control section determines a content of the information regarding the support request, and outputs the control data for controlling a manufacturing process of a manufacturing line configured by the second apparatus. L5) (FIG. 18) In a case where the second apparatus further transmits information regarding a support request related to manufacturing of a product, the integration control section determines whether or not the information regarding the support request is any one or more of a "part procurement request", a "worker request", a "request related to control of the manufacturing process of the manufacturing line", and a "manufacturing robot repair part request".

L6) Any one or a combination of J2 to J7 described above can be applied to the first analysis result and/or the second analysis result of L1 described above. L7) In L1 described above, the obtained first analysis result is data for reducing an environmental load caused by the operation of the apparatus, and is data for controlling any one or a combination of an air volume, a temperature, and a humidity of a surrounding environment of the first apparatus. L8) In L1 described above, the obtained first analysis result is data for maintaining a quality of the product manufactured by the first apparatus, and is data reflecting a part of an operation sound of the first apparatus and/or five-sense information of a worker operating the first apparatus. L9) In L1 described above, the first specific information is a first program and a first parameter used in the program, and the second specific information is a second program and a second parameter used in the program.

M1) (FIG. 19) An information management system for a power plant, the information management system being arranged in a cyberspace and including: a first control section that receives first information regarding a control program for a first power plant and second information regarding a control program for a second power plant from edge computers of the first power plant and the second power plant, respectively, and analyzes the first information and the second information; and a second control section that autonomously feeds back adjustment data regarding the control program to the edge computer of the second power plant according to the analytics result.

N1) (FIG. 2F) An information management system for distribution management of a distribution center, the information management system being arranged in a cyberspace and including:

a first control section E521 that receives, from an edge computer arranged in a physical space, data indicating a control state of each robot that performs each work of unloading, transporting of a freight, storing of a freight, taking out of a freight, and loading of a freight, and performs feedback in such a way that each robot functions according to a set robot control program;

a second control section E522 that identifies a freight suitable for work of a robot from among freights stored in the distribution center and notifies the robot control program of information for performing the unloading; and a third control section E523 that receives information regarding a work performance via notification data C15 from the first control section E521 and the second control section E522, and feeds back information for stock management and storing and unstoring management of the freights in the distribution center to the second control section E522 according to the work performance.

O1) (FIG. 20) An information management system for an apparatus to be exported and imported, the information management system being arranged in a cyberspace and including:

a first control program management section that receives position information and information regarding a control program used in the apparatus from an edge computer of the apparatus arranged in a physical space, and sets a first control program in the apparatus; and a second control program management section that sets a second control program different from the first control program in the apparatus when the apparatus arrives at an intended import destination.

P1) (FIGS. 17A, 17B, and 18) An information management system for a manufacturing line in which a plurality of robots are sequentially arranged in a manufacturing process, the information management system being arranged in a cyberspace and including:

a first control section that determines support request information regarding manufacturing of a product from edge computers of a plurality of factories;

a second control section that determines that a content of the first control section is at least one of part procurement, a worker request, a manufacturing line request, or a manufacturing robot repair part request; and a third control section that notifies, in a case where a result of the determination indicates the manufacturing line request, an administrator of another factory having the same manufacturing line as the manufacturing line of the requesting factory of the request and also notifies an administrator of the requesting factory of the request.

Q1) (FIG. 21) An information management system that manages a robot working in a factory, the information management system being arranged in a cyberspace, and including:

a control section that changes, in a case where there is a support request from an edge computer in a region different from the factory, a control program for the robot of the factory and dispatches the robot to the different region.

R1) (FIG. 25) An information management system that manages a plurality of cyberspaces and an edge computer of a physical space connected to each cyberspace, the information management system including:

a first control section that classifies the edge computer into classification categories by which a business type to which the edge computer belongs is identified; and a second control section that executes data processing of identifying power consumption information transmitted from the edge computer for each business type.

Z1) A cyber-physical system and cyber-physical method having a combination of J to R described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Furthermore, in each constituent element of the claims, a case where a constituent element is divided and expressed, a case where a plurality of constituent elements are expressed together, or a case where a plurality of constituent elements are expressed in combination is also within the scope of the present invention. In addition, a plurality of embodiments may be combined, and examples configured by this combination are also within the scope of the invention.

In addition, in order to make the description clearer, the drawings may be schematically represented as compared with an actual aspect. The apparatus of the present invention is also applied to a case where a claim is expressed as a control logic, a case where a claim is expressed as a program including an instruction for executing a computer, and a case where a claim is expressed as a computer-readable recording medium describing the instruction. In addition, names and terms used are not limited, and even other expressions are included in the present invention as long as they have substantially the same content and the same purpose. For example, the FA E300 in the cyberspace E200 may configure, by software, the loop connection section, the information acquisition section, the information analytics section that analyzes specific information, the autonomous operation control section that autonomously performs operation control based on an analytics result, and the loop cooperation control section in which the loop connection section and the autonomous operation control section cooperate to construct a new second feedback loop in response to a new analytics result. These pieces of software may be stored in a recording medium (memory).

What is claimed is:

1. An information management system that autonomously performs operation control in a manufacturing process and a service, the information management system comprising:

a loop connection processor configured to construct a first feedback loop of a cyber-physical system;

an information acquisition processor including at least one hardware processor and a memory, the information acquisition processor configured to acquire specific information necessary for the manufacturing process from the first feedback loop;

an information analytics engine implemented by one or more hardware processors, the information analytics engine configured to analyze the specific information;

an autonomous operation control unit comprising circuitry configured to autonomously perform the operation control based on an analytics result acquired by the information analytics engine; and a loop cooperation control processor configured to form a second feedback loop constructed by cooperation of the loop connection processor and the autonomous operation control unit, in response to the analytics result that is new.

2. The information management system according to claim 1, wherein the second feedback loop is a restarted feedback loop that has existed so far but has not been used.

3. The information management system according to claim 1, wherein the second feedback loop is a feedback loop in which a new feedback loop that has not existed so far is formed.

4. The information management system according to claim 1, wherein the second feedback loop is a feedback loop formed by bundling a plurality of feedback loops.

5. The information management system according to claim 4, wherein the plurality of feedback loops are any one of a bundle of an existing feedback loop and a new feedback loop, a bundle of a plurality of existing second feedback loops, or a bundle of a plurality of new feedback loops.

6. The information management system according to claim 1, wherein the information analytics engine and the autonomous operation control unit construct the first feedback loop as a first control loop for controlling a first control target that is the manufacturing process, and the information analytics engine and the loop cooperation control processor construct the second feedback loop as a second control loop for further controlling the first control target.

7. The information management system according to claim 6, wherein the information analytics engine and the autonomous operation control unit construct the first feedback loop as a first control loop for controlling a first control target that is the manufacturing process, and the information analytics engine and the loop cooperation control processor construct the second feedback loop as a second control loop for further controlling a second control target.

8. The information management system according to claim 6, wherein the information analytics engine and the autonomous operation control unit bundle and continue the second control loop of the second feedback loop together with the first control loop of the first feedback loop.

9. The information management system according to claim 6, wherein the information analytics engine and the autonomous operation control unit temporarily bundle and continue the second control loop of the second feedback loop together with the first control loop of the first feedback loop, and release the second control loop of the second feedback loop under a predetermined condition.

10. The information management system according to claim 6, wherein the information analytics engine and the autonomous operation control unit construct the first feedback loop as a first control loop for controlling a first control target that is the manufacturing process, and the information analytics engine and the loop cooperation control processor construct the second feedback loop as a second control loop for controlling a second control target different from the manufacturing process.

11. The information management system according to claim 8, wherein the information analytics engine and the loop cooperation control processor release the second feedback loop in a case where a control purpose of the second feedback loop is completed.

12. The information management system according to claim 6, wherein the information analytics engine and the loop cooperation control processor analyze a result of control by the second feedback loop, and further construct a third feedback loop as a third control loop for controlling a third control target different from the control targets of the first control loop and the second control loop according to a content of the analytics.

13. The information management system according to claim 1, wherein loop cooperation control by at least the first feedback loop and the second feedback loop is applied to a control system that performs equipment management of a building.

14. The information management system according to claim 1, wherein loop cooperation control by at least the first feedback loop and the second feedback loop is applied to a control system that controls a robot.

15. The information management system according to claim 1, wherein in loop control by at least the first feedback loop and the second feedback loop, the second feedback loop uses information from a user domain using a product produced in a factory.

16. The information management system according to claim 1, wherein loop cooperation control by at least the first feedback loop and the second feedback loop is applied to a robot control system that performs storing, unstoring, sorting, conveying, and panning of freights in a distribution center.

17. The information management system according to claim 1, wherein loop cooperation control by at least the first feedback loop and the second feedback loop is applied to a control system that calculates power consumption of a plurality of business entities and requests cooperation for an amount of the power consumption.

18. The information management system according to claim 1, wherein loop cooperation control by at least the first feedback loop and the second feedback loop is applied to a control system for a plurality of pieces of power transmission and distribution equipment.

19. The information management system according to claim 1, wherein loop cooperation control by at least the first feedback loop and the second feedback loop is also applied to the autonomous operation control unit, wherein the autonomous operation control unit is further configured to detect a difference in version of software used by a first factory and a second factory.

20. The information management system according to claim 1, wherein loop cooperation control by at least the first feedback loop and the second feedback loop is also applied to the autonomous operation control unit, wherein the autonomous operation control unit is further configured to determine whether or not at least one of a recyclable part or a reusable part is used in a manufacturing factory.

21. The information management system according to claim 1, wherein loop cooperation control by at least the first feedback loop and the second feedback loop is applied to the autonomous operation control unit, wherein a manufacturing line of a manufacturing factory comprises a plurality of manufacturing steps from upstream to downstream, and the autonomous operation control unit is further configured to perform control in such a way that each intermediate product in any manufacturing step is receivable in a manufacturing step suitable for the intermediate product.

22. The information management system according to claim 1, wherein loop cooperation control by at least the first feedback loop and the second feedback loop is applied to the autonomous operation control unit, wherein the autonomous operation control unit is further configured to:

control manufacturing lines in a factory having a first manufacturing line and a second manufacturing line, and the perform control to distribute a first product and a second product conveyed on a common conveying path to the first manufacturing line and the second manufacturing line.

23. The information management system according to claim 1, wherein loop cooperation control by at least the first feedback loop and the second feedback loop is applied to a power generation control system of a power plant.

24. The information management system according to claim 1, wherein loop cooperation control by at least the first feedback loop and the second feedback loop is applied to a control system of any one of a car and a home appliance.

25. The information management system according to claim 1, wherein the specific information includes human five-sense information.

26. The information management system according to claim 1, wherein the specific information is generated by analyzing data acquired from a biological sensor attached to a human.

27. The information management system according to claim 1, wherein the specific information includes at least one of renewable energy production information, consumption information, or environmental load information.

28. The information management system according to claim 1, wherein at least one of the loop connection processor or the loop cooperation control processor changes a configuration of a program of an apparatus to be controlled or replaces the program.

29. The information management system according to claim 28, wherein the apparatus to be controlled is a control apparatus of a power plant, a control apparatus of a factory, a car, or a home appliance.

30. The information management system according to claim 1, wherein the cyber-physical system forms a plurality of cyber-physical systems, each of the plurality of cyber-physical systems grasps data indicating an energy use amount of a business managed by each of the plurality of cyber-physical systems, and an integration control processor generates display data obtained by visualizing the data indicating the energy use amount for each business type.

31. An information management method for forming an apparatus that forms a cyberspace of a cyber-physical system, the information management method comprising:

connecting, by a loop connection processor corresponding to a connection section, a first feedback loop of the cyber-physical system;

acquiring, by an information acquisition processor corresponding to an acquisition section, specific information necessary for a manufacturing process from the first feedback loop;

analyzing, by an information analytics engine corresponding to an analytics section, the specific information;

autonomously performing, by an autonomous operation control unit corresponding to a control section, operation control based on an analytics result acquired by the information analytics engine; and constructing, by a loop cooperation control processor corresponding to an integration control section, a second feedback loop in response to a new analytics result, the second feedback loop being formed by cooperation between the loop connection processor and the autonomous operation control unit.

* * * * *